(12) United States Patent
Vasylyev

(10) Patent No.: US 11,435,516 B2
(45) Date of Patent: Sep. 6, 2022

(54) DAYLIGHT RESPONSIVE LED LIGHTING FIXTURE WITH DIMMING AND COLOR TEMPERATURE CONTROL

(71) Applicant: Sergiy Vasylyev, Elk Grove, CA (US)

(72) Inventor: Sergiy Vasylyev, Elk Grove, CA (US)

(73) Assignee: S.V.V. TECHNOLOGY INNOVATIONS, INC., Sacramento, CA (US)

( * ) Notice: Subject to any disclaimer, the term of this patent is extended or adjusted under 35 U.S.C. 154(b) by 0 days.

(21) Appl. No.: 17/128,105

(22) Filed: Dec. 19, 2020

(65) Prior Publication Data

US 2021/0149104 A1    May 20, 2021

Related U.S. Application Data

(63) Continuation of application No. 15/481,386, filed on Apr. 6, 2017, now Pat. No. 10,877,201, which is a continuation of application No. 13/682,004, filed on Nov. 20, 2012, now abandoned.

(60) Provisional application No. 61/648,236, filed on May 17, 2012, provisional application No. 61/563,018, filed on Nov. 22, 2011.

(51) Int. Cl.
   *F21V 8/00* (2006.01)
   *F21S 10/00* (2006.01)

(52) U.S. Cl.
   CPC .......... *G02B 6/0045* (2013.01); *F21S 10/005* (2013.01); *G02B 6/001* (2013.01); *G02B 6/005* (2013.01); *G02B 6/0038* (2013.01); *G02B 6/0053* (2013.01); *G02B 6/0055* (2013.01); *G02B 6/0061* (2013.01); *G02B 6/0065* (2013.01); *G02B 6/0085* (2013.01); *G02B 6/0041* (2013.01); *G02B 6/0043* (2013.01)

(58) Field of Classification Search
   CPC .......................... F21S 10/005; F21V 2200/20
   See application file for complete search history.

(56) References Cited

U.S. PATENT DOCUMENTS

| | | | |
|---|---|---|---|
| 4,539,625 A * | 9/1985 | Bornstein | F21S 11/00 362/145 |
| 5,396,350 A | 3/1995 | Beeson et al. | |
| 5,485,291 A | 1/1996 | Qiao et al. | |
| 5,521,725 A | 5/1996 | Beeson et al. | |
| 5,739,931 A | 4/1998 | Zimmerman et al. | |
| 5,761,355 A | 6/1998 | Kuper et al. | |
| 5,838,403 A | 11/1998 | Jannson et al. | |
| 5,914,759 A | 6/1999 | Higuchi et al. | |
| 5,949,933 A | 9/1999 | Steiner et al. | |
| 6,129,439 A | 10/2000 | Hou et al. | |
| 6,130,730 A | 10/2000 | Jannson et al. | |

(Continued)

*Primary Examiner* — Sean P Gramling

(57) ABSTRACT

A daylight responsive lighting fixture employing two or more groups of light emitting diodes (LEDs) configured to emit light in different color temperatures, an optically transmissive light distribution sheet, and an LED driver electrically connected to the LEDs and having two or more LED intensity control channels and one or more pulse width modulation (PWM) circuits. The LED driver is configured to independently control the light output from the LED groups so as to vary the color temperature of the lighting fixture and to provide dimming of the LEDs in response to a change of the intensity of natural daylight incident onto an area of the lighting fixture.

20 Claims, 22 Drawing Sheets

(56) References Cited

U.S. PATENT DOCUMENTS

| | | |
|---|---|---|
| 6,256,447 B1 | 7/2001 | Laine |
| 6,295,104 B1 | 9/2001 | Egawa et al. |
| 6,322,225 B1 | 11/2001 | Koike |
| 6,347,874 B1 | 2/2002 | Boyd et al. |
| 6,422,713 B1 | 7/2002 | Fohl et al. |
| 6,425,675 B2 | 7/2002 | Onishi et al. |
| 6,454,452 B1 | 9/2002 | Sasagawa et al. |
| 6,497,939 B1 | 12/2002 | Obuchi et al. |
| 6,528,954 B1 | 3/2003 | Lys et al. |
| 6,608,961 B2 | 8/2003 | Travis |
| 7,012,660 B1 | 3/2006 | Umemoto |
| 7,052,168 B2 | 5/2006 | Epstein et al. |
| 7,056,005 B2 | 6/2006 | Lee |
| 7,090,389 B2 | 8/2006 | Parker et al. |
| 7,125,131 B2 | 10/2006 | Olczak |
| 7,303,323 B2 | 12/2007 | Choi et al. |
| 7,364,343 B2 | 4/2008 | Keuper et al. |
| 7,452,120 B2 | 11/2008 | Lee et al. |
| 7,532,800 B2 | 5/2009 | Iimura |
| 7,573,642 B2 | 8/2009 | Lubart et al. |
| 7,614,775 B2 | 11/2009 | Iwasaki |
| 7,665,865 B1 | 2/2010 | Hulse et al. |
| 7,732,753 B2 | 6/2010 | Greiner |
| 8,248,554 B2 | 8/2012 | Qi et al. |
| 8,292,467 B2 | 10/2012 | Vissenberg et al. |
| 8,324,823 B2 | 12/2012 | Choi et al. |
| 8,783,898 B2 | 7/2014 | Coleman et al. |
| 2003/0095400 A1 | 5/2003 | Kashima et al. |
| 2003/0103344 A1 | 6/2003 | Niida et al. |
| 2005/0122745 A1 | 6/2005 | Sugiura |
| 2007/0025121 A1 | 2/2007 | Harada et al. |
| 2007/0274093 A1* | 11/2007 | Haim ................ G02F 1/133603 362/561 |
| 2007/0274098 A1 | 11/2007 | Wheatley et al. |
| 2009/0184662 A1 | 7/2009 | Given et al. |
| 2010/0014315 A1 | 1/2010 | Fujimoto |
| 2010/0020566 A1 | 1/2010 | Teng |
| 2010/0033948 A1 | 2/2010 | Harbers et al. |
| 2010/0135038 A1 | 6/2010 | Handschy et al. |
| 2010/0142222 A1 | 6/2010 | Vahabzadeh |
| 2010/0157615 A1 | 6/2010 | Gruhlke |
| 2010/0254121 A1* | 10/2010 | Zhou .................... G02B 6/0055 362/147 |
| 2011/0051041 A1 | 3/2011 | Yashiro |
| 2012/0062133 A1 | 3/2012 | Cubias |
| 2012/0236530 A1 | 9/2012 | Parker et al. |

* cited by examiner

DAYLIGHT RESPONSIVE LED LIGHTING FIXTURE WITH DIMMING AND COLOR TEMPERATURE CONTROL

CROSS-REFERENCE TO RELATED APPLICATIONS

This application is a continuation of application Ser. No. 15/481,386 filed on Apr. 6, 2017, which is a continuation of application Ser. No. 13/682,004 filed on Nov. 20, 2012. This application also claims priority from U.S. provisional application Ser. No. 61/563,018 filed on Nov. 22, 2011, incorporated herein by reference in its entirety, and from U.S. provisional application Ser. No. 61/648,236 filed on May 17, 2012, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

The present invention relates to light emitting waveguides such light pipes, optical fibers or planar waveguides provided with a series of light-deflecting features distributed along the optical path and configured to create a controlled illumination pattern emitted from a major waveguide's surface. This invention also relates to optical illuminators and light distribution systems employing such waveguides, for example, panel luminaires, side-emitting optical fibers, edge-lit LED front lights and backlights, lighting panels, LCD display backlights, daylighting luminaires, diffusers, computer screens, advertising displays, road signs, and the like, as well as to a method for redistributing light from various-type light sources.

2. Description of Background Art

Conventionally, light emitting devices employing a waveguide include a series of optical features distributed along the light propagation path in the waveguide and configured to extract light from the waveguide in a perpendicular direction. The optical features are conventionally formed by small cuts, notches or grooves in the waveguide surface which extract light by means of reflection, refraction and/or scattering.

FIG. 1 depicts an example of the prior-art planar slab waveguide which employs an array of surface microstructures formed in a major surface of the waveguide. FIG. 2 depicts a prior-art planar slab waveguide having an array of linear V-grooves formed in the waveguide's surface. FIG. 3 depicts an example of the conventional side-emitting optical fiber which includes a series of notches formed in the fiber's surface along its longitudinal axis.

FIG. 4 generalizes the optical operation of the prior-art devices shown in FIG. 1, FIG. 2 and FIG. 3 and depicts a cross-section of the waveguide and an individual light extracting feature formed in the waveguide's surface. The light extracting feature commonly has the cross-sectional shape of a prismatic cavity and employs a reflective face inclined at a considerable slope angle to the surface of the waveguide, usually about 45° or so. Since the light is confined within the waveguide by means of a total internal reflection (TIR) from waveguide's longitudinal walls, this slope angle generally needs to be sufficiently high in order to overcome TIR and allow the reflected light to exit from the light emitting surface opposing the light extracting feature. As illustrated FIG. 4, at least some light rays may be reflected from the reflective face of the light extracting feature and then exit from the opposing surface of the waveguide. Accordingly, when a large array of such light extracting feature is distributed along a major surface of the waveguide, the waveguide can emit luminous flux from the opposing surface in a broad angular range.

The reflective face usually has an optically transmissive surface and provides reflection by means of TIR when the incidence angles are greater than the TIR angle with respect to a normal to the reflective face. However, since the light rays propagating in the waveguide have essentially random angular distribution within the acceptance angle of the waveguide, at least a portion of the rays can strike the reflective face at angles being lower than the TIR angle. In this case, TIR will not occur and the respective rays may exit from the waveguide through the unwanted face (see FIG. 4), resulting in light loss and reduced system efficiency. The reflective faces can be selectively mirrored to eliminate this light spillage. However, doing so will introduce reflection losses at the mirrored surface compared to the lossless TIR and will also add fabrication steps, such as fabricating a mask, applying the mask to the waveguide surface with precision alignment, vacuum metallization, etc.

In conventional edge-lit waveguide illumination devices, the light extracted from the waveguide by the sloped reflective faces generally has a high angular dispersion from the waveguide's surface normal. Particularly, the divergence of light emitted by prior-art waveguide-based devices often approximates that of a lam bertian source with a full 180° angular spread. The lack of beam directionality hampers the utility of conventional waveguide illumination systems in the applications requiring at least some degree of light collimation.

Furthermore, the sloped reflective surfaces of light extracting features refract light propagating along the line of sight perpendicular to the waveguide's surface. This makes the conventional devices ill suited for the front light applications in which an edge-lit lighting panel is positioned in front of a viewable screen or image print. Each of the light extracting features alters the light path from the viewer to the print and bends the light towards other portions of the print compared to the neighboring smooth areas of the front light panel. As a result, the visual appearance and resolution of the print may deteriorate. Considering than at least some light propagating in the waveguide may also escape from the waveguide toward the viewer, the print contrast may also be affected.

Also, when the front and rear surfaces of the planar waveguide generally have the same optical properties, e.g., being characterized by the same stepped drop in the refractive index, the light ray which obtains a non-TIR propagation angle within the waveguide may escape from either surface. Various mechanisms may contribute to such light leakage. The rays which propagate at less-than-TIR angles (with respect to surface normal) may include high-incidence-angle portions of the initial light beam injected at the waveguide's edge, light scattered by impurities in the waveguide, stray light from light extraction elements, stray light resulting from natural divergence or leakage from the waveguide, light which propagation angles are altered by the non-parallelism of waveguide walls, light reflected from the opposing wall by means of a Fresnel reflection, etc. Since such light has about equal chance to escape through either front or rear surface, at least a substantial portion of it will exit from the unwanted side of the waveguide resulting in energy loss and considerable glare. The prior-art lighting panels employing light extraction features based on light scattering rather than on reflection typically introduce even more unwanted glare and light spillage due to the uncontrolled nature of light scattering mechanism. Additionally, such lighting panels are usually characterized by a relatively high level of opacity and either substantially opaque or can be translucent at best, but not fully transparent, which inhibits the basic light guiding function of the panel. Yet further, when the conventional planar waveguide employing light extracting features (such as surface microstructure or scattering elements) is lit from an edge, at least a portion of light extracted by these features is emitted towards the viewer which substantially degrades the contrast and visibility of the bodies or images disposed behind the waveguide. This prevents using these panels for front lights where the perceptible quality of the background to be lit is important.

Besides sometimes being characterized by reduced optical qualities or light spillage, the conventional systems employing relatively deep cuts, notches or grooves may also be affected by at least some loss of structural strength and rigidity compared to a smooth-surface panel having no such microstructures.

It is therefore an object of this invention to provide an improved waveguide illumination system providing an efficient light extraction with a minimum light loss and without using excessively deep (relatively to the transversal size) microstructures in the waveguide's surface. It is another object of this invention to eliminate or at least substantially reduce the light spillage through the unwanted side of the waveguide. It is yet another object of this invention to provide an improved waveguide illumination system which can be configured for enhanced light collimation and controlled directionality of the emitted beam. It is yet another object of this invention to provide a waveguide illumination system capable of distributing light from a compact source over a large area and emitting the distributed light from said area in the form of a collimated beam with a prescribed angular spread or pattern. It is yet another object of this invention to provide an improved waveguide illumination system which can effectively used as a backlight or a front light panel that will not substantially alter the light paths and apparent image fidelity for the viewer. Other objects and advantages of this invention will be apparent to those skilled in the art from the following disclosure.

BRIEF SUMMARY OF THE INVENTION

Accordingly, the present invention is directed to waveguide illumination systems which may be employed to emit directional light beams or uniformly illuminate a designated area with a very low light loss. More particularly, at least some embodiments of this invention are directed to planar light-emitting waveguides and at least some embodiments are directed to cylindrical side-emitting waveguides and optical fibers. This invention is also directed to directional (collimating) illumination systems which employ light-emitting waveguides, such as lighting luminaires, backlights, front lights and the like.

The present invention solves a number of light distribution and illumination problems within a compact optical system which is not hindered by the limitations of conventional waveguides employing various kinds of light extraction features used to decouple light from the waveguide mode.

An advantage of the present system is to provide controlled light extraction through a designated surface of the waveguide while minimizing light loss and controlling the angular distribution of the extracted light. Light is extracted from the waveguide into an intermediate layer by means of incremental deflections from the prevailing propagation direction after which it is further redirected out of the waveguide. A two-stage light extraction process enables the directionality of the emitted light and minimizes light spillage into non-functional directions.

In at least one embodiment, the invention features a multi-layer optical structure having a waveguide layer, an intermediate buffer layer and a light extraction layer. Various implementation of the invention include a planar configuration of the waveguide and a cylindrical configuration of the waveguide.

The buffer layer has a lower refractive index than the waveguide layer and preserves the waveguiding function of the waveguide layer at least for a range of incidence angles. The waveguide includes light deflecting elements distributed along the intended path of light propagation configured to incrementally deflect light rays by relatively small angles upon each interaction. According to an aspect of the present invention, the differential between the refractive indices at the opposing surfaces or sides of the waveguide and the smallness of the deflection angles ensure light extraction into the buffer layer while generally preventing light escape through the surface portion which is not disposed in optical contact with buffer layer. The light extraction layer further extracts and redirects light out of the illumination system.

In at least one embodiment, the light deflecting elements include relatively low-profile surface relief features deflecting light by means of a total internal reflection (TIR). Each surface relief feature may have at least one facet which forms a relatively low dihedral angle with a surface plane. According to an aspect, the dihedral angle may be sufficiently low to prevent premature light leakage from waveguide through the respective facet. According to another aspect, each interaction of light with the facet results in light deflection from its original propagation path by means of TIR and bends further away from a prevailing plane or axis of the waveguide. According to a further aspect, this process may continue until TIR is suppressed at least at one surface of the waveguide and light exits from the waveguide and may be further redirected by the light extraction layer. In at least one implementation, the surface relief features include low-profile prismatic surface relief features. In at least one implementation, the surface relief features include shallow surface undulations or corrugations.

In at least one implementation, the dihedral angle of the facets varies across the surface as a function of a distance from a light input area of the waveguide. In at least one implementation, the waveguide includes two symmetrically disposed segments each having a light input edge or end and each provided with an array of light-deflecting surface relief features. In at least one implementation, the waveguide includes a linear array of surface relief features extending parallel to a reference line. In at least one implementation, the waveguide includes a two-dimensional array of discrete surface relief features. In at least one implementation, the waveguide illumination system is configured for a generally unimpeded transversal light passage through its body. In at least one implementation, the waveguide illumination system is substantially transparent at least along a direction normal to its waveguiding surface.

In at least one embodiment, the light deflecting elements include an internal corrugated boundary between two optically transmissive materials having different refractive indices. In at least one embodiment, the light deflecting elements include light scattering particles distributed throughout the body of the waveguide and configured to continuously change the light propagation direction by means of forward scattering. In at least one embodiment, the light deflecting elements include an internal corrugated boundary between two optically transmissive materials having different refractive indices.

In at least one embodiment, the waveguide illumination system of this invention includes at least one light source configured to input light into the waveguide. In at least one embodiment, the light source is optically coupled to a light input edge or a light input end of the waveguide. Various implementations of the light source include light emitting diodes (LEDs), LED arrays, fluorescent lamps, incandescent lamps, cold-cathode or compact fluorescent lamps, halogen, mercury-vapor, sodium-vapor, metal halide, electroluminescent lamps or sources, lasers, etc. In at least one embodiment, the light source may include various light-collimating or beam shaping elements. In at least one implementation, the light extraction layer includes a light turning film or structure. In further implementations, the light turning film or structure may include one or more microstructured surfaces, one or more optically transmissive layers, one or more inter-layer corrugated boundaries or a reflective layer. In at least one implementation, the light turning film or structure includes a plurality of reflective or refractive facets inclined at an angle to the layer's surface. The reflective or refractive surfaces may be formed by prismatic grooves, notches, undercuts or other type of surface modification. Alternative implementations of the light extraction layer include a screen comprising a scattering layer or image print.

In at least one embodiment, the waveguide illumination system of this invention is incorporated into a daylighting system. According to an aspect, the waveguide illumination system is configured and used as a hybrid luminaire combining natural and artificial illumination. Such waveguide illumination system has a layered panel structure which transmits sunlight delivered from a skylight in a transversal direction with respect to the prevailing plane of the panel and distributes and emits light received from an array of LEDs coupled to an edge of the waveguide. In at least one embodiment, the waveguide illumination system of this invention is configured as an edge-lit front light for an image screen which provides high optical transparency and image fidelity while efficiently illuminating the underlying image. In at least one embodiment, the waveguide illumination system of this invention is configured as an edge-lit backlight. In at least one embodiment, the waveguide illumination system of this invention is incorporated into a lighting luminaire with improved beam directionality. According to an aspect, the edge-lit waveguide panel distributes and emits light from a broad-area surface of the panel in the form of a collimated beam.

BRIEF DESCRIPTION OF THE SEVERAL VIEWS OF THE DRAWING(S)

The invention will be more fully understood by reference to the following drawings which are for illustrative purposes only:

DETAILED DESCRIPTION OF THE INVENTION

Figure 1:
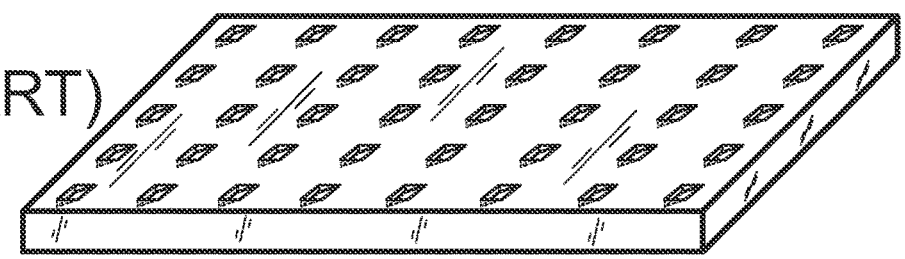
FIG. 1 is a schematic perspective view of a conventional light emitting waveguide employing surface microstructures for light extraction.

Referring more specifically to the drawings, for illustrative purposes the present invention is embodied in the apparatus generally shown in the preceding figures. It will be appreciated that the apparatus may vary as to configuration and as to details of the parts without departing from the basic concepts as disclosed herein. Furthermore, elements represented in one embodiment as taught herein are applicable without limitation to other embodiments taught herein, and in combination with those embodiments and what is known in the art.

A wide range of applications exist for the present invention in relation to the collection of electromagnetic radiant energy, such as light, in a broad spectrum or any suitable spectral bands or domains. Therefore, for the sake of simplicity of expression, without limiting generality of this invention, the term "light" will be used herein although the general terms "electromagnetic energy", "electromagnetic radiation", "radiant energy" or exemplary terms like "visible light", "infrared light", or "ultraviolet light" would also be appropriate.

The present invention seeks to provide waveguide illumination systems capable of progressively extracting at least a substantial portion of light propagating in a waveguide and emitting the extracted light from a waveguide's side wall towards one or more predetermined directions in a controlled manner and without substantial changing of the waveguide surface smoothness and/or continuity, such as introducing high-aspect-ratio cuts, notches or grooves.

According to the present invention, there is provided an illumination system employing a waveguide. The waveguide is configured to guide light toward a predetermined direction by means of a Total Internal Reflection (TIR) from its opposing walls having substantially smooth surfaces and defining a waveguide core. The waveguide core should preferably be made from a material having good broadband optical clarity and transmission. When the illumination system is designed to operate in a specific spectral range, the material should be highly transmissive at least in that spectral range. The waveguide core may be manufactured from glass or a suitable polymeric material including but not limited to optical quality PMMA (acrylic), silicone, polycarbonate, PET (polyethylene terephthalate), polystyrene, polyolefin, polyesters, APET, PETG, or PVC, as well as any optically clear resin which is obtainable by polymerization and curing of various compositions. The waveguide may be formed by a single layer of the appropriate optically transmissive material or it may also include any number of additional layers made from the same or different materials having sufficient optical clarity for light guiding purposes.

In one exemplary case of an edge-lit lighting waveguide panel, the waveguide may be configured to receive light from a light source on one edge and guide the light toward an opposing terminal end or edge. In another exemplary case of a planar waveguide having an axisymmetrical or freeform configuration, light may me input through an opening in the central area of the waveguide and subsequently propagate radially from the input area towards the outer edge. In a further exemplary case of an optical fiber or a cylindrical-configuration light pipe, the waveguide may be configured to guide light from a first terminal end to an opposing second terminal end. Once light is input into the waveguide and its propagation angles permit for TIR to occur at waveguide's one or more major surfaces, it becomes trapped within the core boundaries and can propagate considerable distances until it is extracted, absorbed or it reaches the opposing edge, outer edge or terminal end of the waveguide.

The present invention is generally directed to edge-lit planar waveguides emitting from a broad-area surface and to end-lit, side-emitting cylindrical waveguides. Accordingly, when the waveguide has a planar configuration with parallel walls, each of the opposing major surfaces of the waveguide as well as the body of waveguide may be characterized by a plane which may be referred to as a prevailing plane of the respective element. Likewise, the illumination system based on the waveguide may also have a well defined planar shape and may thus also be characterized by a prevailing plane. It will be appreciated that, in case of the parallelism of the opposing broad-area waveguide surfaces, the prevailing planes of the surfaces and the prevailing plane of the waveguide will be generally parallel to each other. Thus, when a particular plane or a reference line makes an angle with respect to one of those prevailing planes, it will also make the same angle with the other parallel prevailing planes. Particularly, when the term like "out-of-plane angle" is used to describe the angular relationship a light ray or reference geometry object such as plane or axis with one of the above reference planes, such term may also be generally applied to the other parallel reference planes without limitations.

A cylindrical waveguide may be characterized by a prevailing axis, such as a longitudinal axis of the cylindrical body forming the waveguide. In the context of the present inventions, as well as for the purpose of illustrating the operation of the presently preferred embodiments, a side-emitting waveguide having a cylindrical configuration may also be characterized by a prevailing plane. However, unlike the case of a planar waveguide having well defined planes based on geometrical dimensions, the prevailing plane of a cylindrical waveguide may be defined as a plane which is extending parallel to the prevailing axis and which is also generally separating the emitting and non-emitting sides of the waveguide.

The waveguide of the illumination system includes a light emitting region associated with light deflecting elements distributed throughout the waveguide's body or throughout at least one of its major surface along the intended light propagation path. The function of the light deflecting elements is to cause a continuous change of the out-of-plane angle of a ray with the distance which the ray has propagated along the waveguide. The light deflecting elements distributed along the optical path gradually deflect light from the original propagation direction in an incremental manner and eventually communicate such light a greater angle with respect to a surface normal than the critical TIR angle thus causing the light to exit from the waveguide at different locations along the extent of the waveguide. It is preferred that the deflecting elements are substantially non-absorbing so that the repetitive interaction of light rays with such elements does not cause perceptible ray attenuation along the propagation path. Suitable lossless or near-lossless mechanism which may be employed for deflecting light rays include but are not limited to TIR and/or refraction at a boundary between two dielectric materials having different refractive indices.

The distance which a light ray may travel within the waveguide before it is extracted by overcoming TIR at the waveguide surface largely depends on the initial propagation angle. Generally, rays having greater initial out-of-plane (in case of a planar waveguide) or also out-of-axis (in case of a cylindrical waveguide) angle will travel shorter longitudinal distances than rays initially propagating at more oblique angles with respect to the waveguide's prevailing plane or axis, as they require less interactions with the light deflecting elements to overcome TIR. However, it should be understood that the actual light path of each ray as well as its distance traveled within the waveguide may depend on other factors as well, particularly in view of the random character of light propagation within the waveguide and random ray interactions with deflecting elements.

In at least some embodiments of the present invention, the illumination system includes a buffer layer or cladding layer attached to a major waveguide surface with a good optical contact. The buffer layer has a lower refractive index than the waveguide but higher than that of the outside medium. The buffer layer provides a differential in refractive index drop at the opposing major surfaces or sides of the waveguide and suppresses TIR at least for some uttermost incidence angles compared to the opposing boundary contacting with low-index medium (such as air). This causes the controlled leakage of the deflected out-of-plane rays primarily through the designated major surface of the waveguide contacting with the buffer layer rather than through both opposing surfaces of the waveguide. Suitable materials for the buffer layer can advantageously be selected for low-n fluoropolymers or resins, such as, for example, FEP, ETFE (both having a refractive index of 1.34-1.35), PFTE AF 1600 (n≈1.31), PFTE AF 2400 (n≈1.29), certain silicones, and the like.

According to at least some embodiments, the light deflecting elements include shallow surface relief features formed in the waveguide surface. The surface relief features are configured to slightly alter the angular distribution of light upon each interaction and cause small portions of light to overcome TIR and leak out of the waveguide's core into the buffer layer while the main portion of can remain trapped within the waveguide.

The surface relief features may be formed by shallow (low aspect ratio) recesses or depressions in the light guiding surface of the waveguide. Each surface relief feature may comprise a reflective face inclined to the surface plane at a sufficiently low dihedral angle and configured to reflect light by means of TIR. The TIR surface of the reflective face should generally face the light input edge or end of the waveguide so that it can be illuminated by a light source attached to that edge or end. The dihedral angle or slope of each reflective face with respect to the waveguide surface should be substantially less than 45° and may ordinarily be less than 20° and, more preferably, less than 10°. According to at least one embodiment, the dihedral angle may take an angular value between 1° and 3°. According to at least one embodiment, the dihedral angle may be between 0.1° and 1°.

The upper practical limit for the dihedral angle of the reflective face may be selected from various considerations depending on the intended application of the illumination system. According to some embodiments employing the buffer layer, each reflective face should preferably be configured to reflect, by means of TIR, substantially the entire light beam impinging onto the reflective face back into the waveguide. This means that the dihedral angle of the reflective face should be smaller than a predetermined value defined by the differential between the refractive indices of the waveguide and the outside medium so as not to cause considerable light leakage through the reflective faces of respective surface relief features. According to some embodiments configured for emitting collimated light from a major surface of the waveguide, the dihedral angle of reflective faces may be selected based on the desired degree of collimation.

The lower practical limit for the dihedral angle of the reflective faces may be selected, for example, based on the desired rate of light extraction that would ensure that most light injected into the waveguide can be removed along the propagation path. Various other factors may also be considered, such as the spacing between individual light extracting elements, the refractive index of the waveguide the adjacent layers, and whether or not the uniformity of light emission from the waveguide's surface is needed.

While each surface relief feature may have a very low aspect ratio (e.g., the ration between the feature's depth or height to its width or base at the surface, it should be understood that the light deflecting portions of each reflective should still be essentially non-parallel to the light guiding surface of the waveguide at least in a cross-section perpendicular to the prevailing direction of light propagation. Therefore, it will be appreciated that each of the reflective faces of respective light deflecting features will alter the light propagation angles upon each interaction with the guided light. Particularly, each interaction of light with the reflective face will broaden the angular distribution of light propagating in the waveguide and cause at least a portion of reflected light to obtain greater out-of-plane angles and thus smaller incidence angles with respect to the TIR surface(s) of the waveguide.

For the purpose of this discussion, the term "incidence angle" of a light ray in relation to a surface generally refers to an angle that this ray makes with respect to a normal to that surface. It will be appreciated by those skilled in the art of optics that, when referring to light or other waves passing through a boundary formed between two different refractive media, such as air and glass, for example, the ratio of the sines of the angles of incidence and of refraction is a constant that depends on the ratio of refractive indices of the media (the Snell's law of refraction). The following relationship can describe light bending property of an interface between two refractive media: $n_I \sin \phi_I = n_R \sin \phi_R$, where $n_I$ is the refractive index of the material where the light is incident from, $n_R$ is the refractive index of the material where the light refract to, and $\phi_I$ and $\phi_R$ are the angle of incidence and the angle of refraction, respectively. It will be further appreciated that such optical interface can also be characterized by the angle of a Total Internal Reflection (TIR) which is the value of $\phi_I$ for which $\phi_R$ equals 90°. Accordingly, for a surface characterized by a stepped drop in refractive index along the ray propagation path, the incidence angle may be less than, equal to, or greater than the TIR angle at the given surface.

A TIR angle $\phi_{TIR}$ can be found from the following expression: $\phi_{TIR}=\arcsin(n_R/n_I \cdot \sin 90°)=\arcsin(n_R/n_I)$. In an exemplary case of the interface between acrylic with the reflective index $n_I$ of about 1.49 and air with $n_R$ of about 1, $\phi_{TIR}$ is approximately equal to 42°.

Since each reflective face of the surface relief features broadens the angular distribution of light propagating in the waveguide, at least some uttermost out-of-plane rays may obtain incidence angles with respect to the boundary between the waveguide core and the buffer layer which are less than the TIR angles for the respective boundary. Therefore, these rays will refract into the buffer layer and thus exit from the waveguide core.

It will be understood that, due to the nature of incremental deflection of light rays by relatively small angles using the light deflecting features, the rays escaping from the waveguide due to less-than-TIR incidence angles will generally have a relatively narrow angular spread. Additionally, the rays emerging from the major surface of the waveguide and refracting into a smaller-index medium at near-TIR incidence angles will have relatively low angles with respect to the waveguide surface and relatively high refraction angles. The angular spread of the emerging rays can be controlled by the appropriate configuration of the light deflecting means and their distribution density along the prevailing light path in the waveguide. Particularly, by way of example and not limitation, the dihedral angle of reflective faces may be advantageously selected to result in the refracted rays emerging at grazing angles with respect to the waveguide surface (corresponding to refraction angles close to 90°) and having a fairly narrow angular spread. Accordingly, the subsequent surface relief featured distributed along the waveguide will respectively deplete the remaining light from the waveguide and eventually extract it at grazing angles with respect to the surface plane. As the maximum deviation angle from the plane of the waveguide can be limited to a sufficiently low value, the resulting light beam may have a high degree of collimation while propagating nearly parallel to the longitudinal axis of the waveguide.

The shallow surface relief features may be formed by a variety of suitable means and may comprise any surface irregularities, undulations or corrugations that slightly alter the reflection properties of the surface and cause light reflection at different angles compared to a perfectly flat or straight surface. When the surface relief features have a linear or cylindrical geometry, the longitudinal axis of each such feature should generally extend perpendicular to the prevailing direction of light propagation on the waveguide.

The surface relief features may be fabricated together with the waveguide where the waveguide core may be cast or molded using a negative replica of the surface relief features. Alternatively, the waveguide may be fabricated first and the surface relief features may be formed in it by any suitable method for structural surface modification. Suitable methods may include laser ablation, chemical etching, embossing, grinding, polishing, molding, extrusion, material expansion or contraction, bending, etc. The surface relief features may also be formed in an external layer of optically transmissive material which may be then attached to a major surface of the main waveguide's body with a good optical contact. Suitable surface relief features may also be formed by corrugations or bends of the waveguide as a whole, as well as by any other means causing portions of the surface to reflect light at a greater out-of-plane angle compared to an ideally-flat, smooth surface.

According to at least some embodiments of the present invention, the light deflecting elements are formed by light scattering features distributed throughout the body of the waveguide at least in its light emitting region. Particularly, the light scattering features can be formed by small dielectric particles or by any other form of optical irregularities in the otherwise homogenous body of the waveguide. By way of example, the light scattering features may be formed by very small proportions of imbedded, finely divided, spherical or aspherical particles made from a transparent plastic or glass material which refractive index differs from that of the waveguide by a predetermined amount.

The light scattering particles can be homogenously distributed in the volume of the waveguide's body. Each particle can have a plain structure or a core-shell structure such as, for example that of known core-shell particles obtainable by emulsion polymerization. The light scattering features are configured to deflect light propagating in the waveguide from the original propagation path by means of forward scattering and communicate greater angles to said light with respect to a normal to the waveguide surface. Each light scattering feature should be designed to limit the scattering angle within a relatively narrow cone. Thus, a series of light scattering features on the optical path may thus provide function of incremental light deflection somewhat similar to the function of shallow surface microstructures explained above. Single or multiple interactions of light propagating by means of TIR in the waveguide with such light scattering features will result in the extraction of relatively small portions of light from the waveguide core at different locations across the waveguide's surface. The structure and optical properties of the light scattering features should be preferably selected to result in light out coupling from the waveguide's core at oblique angles with respect to the surface. When the buffer layer is employed, light should primarily leak out of the waveguide into this layer rather than exit from the opposing surface of the waveguide.

According to at least some embodiments of the present invention, the illumination system may be further provided with a light extraction or light distribution layer adjacent to a major surface of the waveguide. The main function of the light extraction or distribution layer is to further direct or distribute the light extracted by the light deflecting elements. When the buffer or cladding layer is employed, the light extraction or distribution layer may be externally attached to the buffer layer with a good optical contact or made an integral part of the buffer layer.

By way of example and not limitation, the light extraction layer may comprise a light turning film or structure. The light turning film may redirect the collimated light beam emerging from the waveguide towards a perpendicular of the waveguide surface thus providing a useful source of directional light emitted along the entire length of the light emitting region of the waveguide. At least some types of light turning or light redirecting films that may be incorporated into the light extraction layer of the present invention are disclosed in co-pending, co-owned application Ser. No. 13/662,311 which is incorporated by reference in its entirety herein.

In a non-limiting example, the light turning film may be of a refractive type configured for turning the collimated light emerging from the waveguide by approximately 90° away from the waveguide surface. In an alternative non-limiting example, the light turning film may be of a reflective type and may direct light through the waveguide and also perpendicular to its surface.

According to at least some embodiments, the light extraction layer may include a screen comprising a scattering layer or image print. The image print may be printed or otherwise deposited directly on the external surface of the buffer layer. Alternatively, the image print may be provided on a transparent substrate which can be attached to the buffer layer. The screen may reflect and/or scatter light propagating in the buffer layer toward an observer located at a distance from the waveguide. According to different variations of this invention, the light scattering screen may be configured to provide forward scattering, back scattering or any combination of the two. Particularly, the screen may be made opaque with back-scattering properties only, in which case the illumination system may be used as a front light. Alternatively, the screen may be made at least partially transmissive with the forward scattering function, in which case the illumination system may be used as a backlight. Furthermore, the transmissive properties of the screen may be adjusted so that the screen can be lit by the light emerging from the waveguide and made visible from both sides, thus forming a two-sided illumination system. Useful examples of the light extraction or distribution layer may also include light scattering surfaces or films, phosphorescent or fluorescent films, light filtering films or layers, diffusers, and the like.

When the light extraction layer includes a viewable screen and the waveguide is positioned between the screen and the viewer in a front-light configuration, the surface relief features may be made substantially smooth and shallow so that they will not substantially alter the smoothness and continuity of the waveguide surface and will not notably bend the path of light propagating at near-normal angles with respect to the waveguide surface.

Various layers employed in the waveguide illumination system, may be attached to each other or to the respective surfaces using any suitable method providing a good optical contact. For example, any two layers may be simply laminated onto each other with no air gaps. Alternatively, any intermediate layers may be used such as optical adhesives or two-sided transparent adhesive films to promote optical and physical contact. The respective layers of the illumination system may also be attached to each other by chemical bonding, heat bonding, ultrasonic bonding, welding, etc.

According to at least some embodiments of this invention, the waveguide illumination system can be made optically transmissive in a transversal direction and configured for a generally unimpeded transversal light passage through its body. In addition to that, the system may be configured to emit collimated light from a selected broad-area surface or its portion and limit light emission from the opposing surface. In other words, the waveguide illumination system may be configured to provide directional illumination from one side with the prescribed degree of collimation of the emitted beam while precluding or at least substantially reducing light escape from the opposing side and preserving the transversal optical transmissivity. In contrast to the prior art illumination systems, the waveguide illumination system of this invention may be configured to not require using any opaque layers to prevent light decoupling from an unwanted side or surface.

According to at least some embodiments of this invention, the waveguide can be made both highly transmissive and transparent along the light path perpendicular to the waveguide's prevailing plane or axis. Particularly, the waveguide can be configured to have a very high visual transparency at least in the direction along a normal to its broad surface. In other words, in addition to having high light transmissivity, the waveguide of this invention may have the property of transmitting light without appreciable scattering along a normal viewing direction so that bodies or images lying beyond can be seen clearly. While the light deflecting elements of this invention are used to deviate light from the waveguiding light paths by means of multiple incremental deflections, they can still be configured to not appreciably alter the propagation angles of light propagating perpendicular to the prevailing plane or axis of the waveguide. This is generally in contrast to the prior art illumination systems employing waveguides with other types of light extraction microstructures or scattering features which cause deterioration of either one or both the transmissivity or transparency.

In operation, the light deflecting elements alter the propagation angles of light with respect to the prevailing plane or longitudinal axis of the waveguide by means of continuous incremental deflections along the propagation path. Each deflection alters the propagation angle by a relatively small amount which allows most rays to propagate a considerable distance in a waveguide. Multiple interactions of light rays with the light deflecting elements continues until at least the uttermost out-of-plane rays obtain less-than-TIR incidence angles with respect to the waveguide surface and exit from the waveguide core at relatively low angles with respect to the prevailing plane of the waveguide. When the buffer layer is employed, it creates a differential in the refractive index drop at the opposing surfaces or longitudinal sides of the waveguide. In turn, it creates a preference for light rays to exit from the waveguide through the side or surface to which the buffer layer is attached. The light extraction layer intercepts the light emerging from the waveguide and directs it further at higher angles with respect to the prevailing plane of the waveguide, thus finally extracting light from the illumination system and directing it towards one or more predetermined directions.

The present invention will now be described by way of example with reference to the accompanying drawings.

Figure 5:
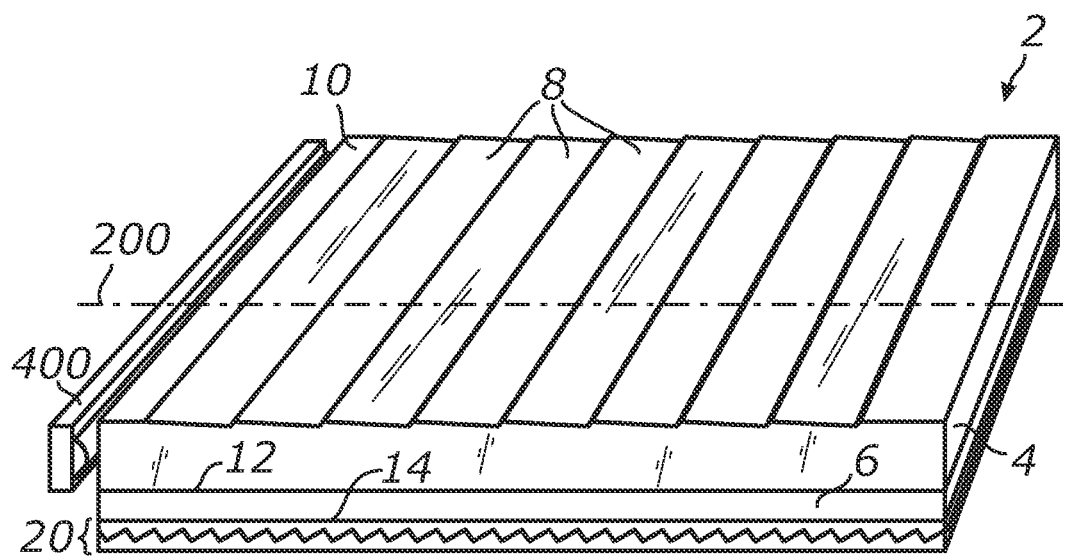
FIG. 5 is a schematic perspective view of a waveguide illumination system, according to at least one embodiment of the present invention.

FIG. 5 depicts an embodiment of a waveguide illumination system 2 in accordance with the invention. System 2 includes a waveguide 4 exemplified by a rectangular, planar slab waveguide having generally smooth-surface walls configured to conduct light by means of TIR. Waveguide 4 is configured to have a first major broad-area surface 10 and an opposing major broad-area surface 12 extending generally parallel to surface 10. Waveguide 4 also has four edges, one of the edged being designated as a light input edge and the opposing edge being designated as a terminal edge. As waveguide 4 may be associated with additional layers attached to either of its major surfaces or edges, the main waveguide body defined by its major surfaces 10 and 20 and by the four edges is also hereinafter referred to as a waveguide core.

A light source 400 is provided on the light input edge so that waveguide 4 can guide light from the light input edge towards the opposing terminal edge by mean of TIR which involves bouncing light from at least surfaces 10 and 12. The prevailing direction of light propagation in waveguide 4 defines a longitudinal axis 200 of the waveguide. The waveguide edges extending parallel to the longitudinal axis (the longitudinal edges) may also be made smooth and polished in order to be able to guide light by means of TIR. Waveguide 4 preferably has a refractive index sufficiently greater than the refractive index of the outside medium to provide for the TIR light guiding properties in a predetermined acceptance angle.

Light source 400 may include any suitable single or multiple light sources of any known type. According to one embodiment, light source 400 may include one or more light emitting diodes (LEDs). Multiple LEDs may be arranged in a linear strip or a two-dimensional array. When high-brightness LEDs are employed, as may be the case, for example, when system 2 is employed in an overhead lighting panel, other type of wide-area luminaire, the LEDs may also be provided with a heat sink to remove excess heat generated by the LED chips. A power supply (driver) may also be provided which electrical characteristics may be matched with those of the LED light source 400. Furthermore, a suitable support frame or housing may also be provided to hold waveguide 4 and source 400 with the associated components together and/or encase all or at least some parts of system 2.

It is noted that light-emitting devices suitable for light source 400 are not limited to LEDs and may also include fluorescent lamps, incandescent lamps, cold-cathode or compact fluorescent lamps, halogen, mercury-vapor, sodium-vapor, metal halide, electroluminescent lamps or sources, lasers, etc. Each light source may have any suitable shape, including compact two-dimensional or elongated one-dimensional shapes.

Light source 400 may have integrated optics such as collimating or light-redistributing lenses, mirrors, lens arrays, mirror arrays, light diffusers, waveguides, optical fibers and the like. When light source 400 includes a series of compact light sources, such as LEDs, each LED may be provided with individual collimating optics or, alternatively, a single collimating optical element may be supplied to inject light from all of the LEDs into the edge of waveguide 4. Numerous applications of system 2 exist where waveguide 4 may have a planar slab configuration and where light source 400 may be associated with a strip of high-power LEDs optically coupled to the light input edge of the waveguide.

Surface 10 of waveguide 4 has at least one light emitting region comprising light deflecting elements exemplified by surface relief features 8 formed in surface 10. More particularly, surface relief features 8 are represented by repetitive shallow depressions formed in a stepped arrangement in surface 10. The depressions can be characterized by alternating peaks and valleys connected by smooth, sloped surface portions. Surface relief features 8 preferably have a linear geometry with a common longitudinal axis extending generally perpendicular to the longitudinal axis 200 of waveguide 4. The shallow depressions forming surface relief features 8 slightly alter the structure of surface 10 yet allowing the surface to remain generally smooth and planar. Since surface 10 is optically transmissive, the shallow surface relief features 8 formed in this surface generally preserve both longitudinal and transversal transmissivity of waveguide 4. Furthermore, surface 10 can be characterized by a first TIR angle $\phi_{TIR1}$ which can be found from the expression: $\phi_{TIR1}=\arcsin(n_0/n_1)$, where $n_0$ is the refractive index of the outside medium and $n_1$ is the refractive index of the core of waveguide 4. Ordinarily, the outside medium can be air with $n_0 \approx 1$, in which case $\phi_{TIR1} \approx \arcsin(1/n_1)$.

Waveguide 4 further comprises a buffer layer 6 disposed in a good optical and physical contact with surface 12 at least in the light emitting region. Buffer layer 6 has a refractive index lower than the refractive index of waveguide 4 and may also have a function of a cladding layer for the core of waveguide 4. Accordingly, the interface between the core of waveguide 4 and buffer layer 6 may be characterized by a second TIR angle $\phi_{TIR2}$ which can be found from the following expression: $\phi_{TIR2}=\arcsin(n_2/n_1)$, where $n_2$ is the refractive index of buffer layer 6. The system may also be characterized by a critical TIR angle $\phi_{TIRC}$ which is the greater of the first and second TIR angles $\phi_{TIR1}$ and $\phi_{TIR2}$, respectively. When features 8 are sufficiently shallow and make very low dihedral angles with the plane of surface 10, the critical TIR angle $\phi_{TIRC}$ generally defines a minimum incidence angle that the light propagating in waveguide 4 must have with respect a normal to the longitudinal walls of the waveguide's core in order to remain being guided through the core by means of TIR.

Referring further to the embodiment illustrated in FIG. 5, $n_0 < n_2 < n_1$ and, consequently, $\phi_{TIR2} > \phi_{TIR1}$ and $\phi_{TIRC} = \phi_{TIR2}$. It will be appreciated, as long as the incidence angles of light rays onto surfaces 10 and 12 remain above $\phi_{TIRC}$, light can propagate within the core in a waveguide mode.

As it will be described in detail below, surface relief features 8 are configured to redirect light within waveguide 4 so that predefined portions of light are eventually communicated incidence angles which are less than $\phi_{TIR2}$ but still substantially greater than $\phi_{TIR1}$. Maintaining the incidence angle generally above ensures that surface 10 and its portions formed by features 8 will continue to be reflective by means of TIR. On the other hand, making the incidence angle less than $\phi_{TIR2}$ for a small portion of light causes the extraction of the respective portion from the waveguide core into layer 6. In other words, a major function of surface relief features 8 is to cause a controlled leakage of light from the core of waveguide 4 into buffer layer 6 through surface 12 along the propagation path, yet preventing light escaping through surface 10.

While the light-bending properties of surface relief features 8 of the above-illustrated embodiment are selected to be insufficient to extract light from system 2 without additional means, they nevertheless play an important role in system 2 operation. Surface relief features 8 act cooperatively with layer 6 to preliminary extract light from the waveguide core into the buffer layer so that light can be further directed and distributed with improved efficiency using additional light extraction features. The refractive index of buffer layer 6 and the properties of surface relief features 8 can be configured to recover light from the core of waveguide 4 through surface 12 at any desirable rate along the propagation path and without causing light loss through surface 10. Accordingly, system 2 further includes a light extraction layer 20 exemplified by a light turning film disposed in contact with an external surface 14 of buffer layer 6. Surface 14 is opposing the broad surface of buffer layer 6 that is contacting waveguide 4. The light turning film comprises two transparent layers having different refractive indices and separated by a corrugated boundary between the layers. The film is configured to extract light from buffer layer 6 and redirect it toward a designated direction which may be advantageously selected to be normal to the plane of waveguide 4.

An optional specularly reflective or diffusively reflective layer (not shown) may be provided and positioned adjacent to surface 10 of waveguide 4 to reflect any stray light that may escape through surface 10 outside of the waveguide. The stray light may include, for example, rays that are scattered by impurities in the materials of waveguide 4, layer 6 or layer 20, as well as by imperfections of surface relief features 8 or the corrugated boundary within the light turning film.

Figure 6:
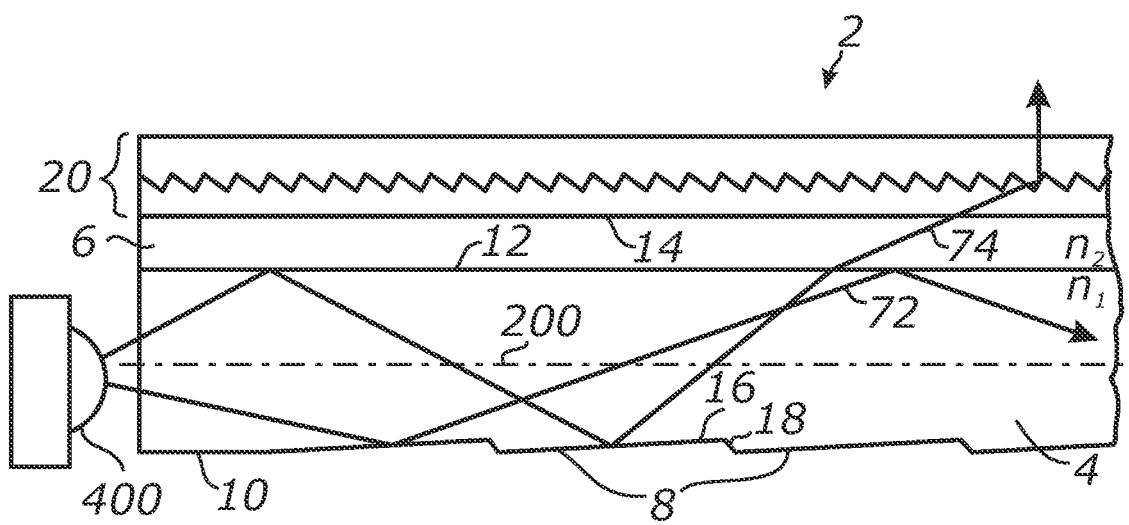
FIG. 6 is a schematic cross-sectional view and raytracing of a waveguide illumination system portion, according to at least one embodiment of the present invention.

FIG. 6 illustrates further details and operation of system 2 depicted in FIG. 5. Each surface relief feature 8 comprises a first face 16 generally facing light source 400 and a second face 18 generally turned away from source 400. Both faces 16 and 18 are ordinarily planar and each form non-zero dihedral angles with the prevailing plane of surface 10. These dihedral angles may also be referred to as slope angles of the respective faces to surface 10. The slope of each face 16 is preferably selected to be fairly low and substantially lower than the slope of the respective face 18 so that faces 16 have considerably greater surface area than faces 18. Accordingly, this translates into a considerably longer cross-sectional profile of face 16 compared to the profile of face 18. The slope of each face 18 may be advantageously selected to ensure that the face is completely shaded from source 400 by the respective face 16. Particularly, the angle which face 18 makes with a normal to the prevailing plane of surface 10 is preferably smaller than $\phi_{TIRC}$. This can ensure that light propagating in the waveguide mode within the core of waveguide 4 will never strike any of faces 18 and will interact only with faces 16. Suitable angles for faces 18 may include normal or near-normal angle with respect to surface 10.

In operation, source 400 illuminates the light input edge of waveguide 4 with a divergent beam which causes at least a substantial part of the beam to enter the waveguide core at angles permitting for TIR. Waveguide 4 further guides light toward the opposing terminal edge by bouncing said light from the opposing parallel surfaces 10 and 12. Since surface relief features 8 are sufficiently shallow and the slopes of faces 16 are low, the change in the propagation angle with respect to axis 200 is also low. Therefore, most light reflected by each face 16 continues its propagation in the waveguide by means of TIR while incrementally obtaining a slightly broader angular distribution with respect to axis 200 at each interaction with surface 10 in the light emitting region.

It will be appreciated that, provided that there is a sufficient optical path along the waveguide's longitudinal axis, the incremental deviation of a light ray from axis 200 will eventually result in said ray reaching surface 12 at an incidence angle which is less than $\phi_{TIRC}$. This, in turn, will ultimately cause ray extraction into buffer layer 6. Obviously, light rays having relatively small out-of-plane angles will generally undergo morel bounces from faces 16 before reaching sub-TIR angles and before being extracted from the core of waveguide 4 than rays having larger out-of-plane angles. For example, a ray 72 strikes face 16 of one of the surface relief features 8 and is losslessly reflected by TIR back into waveguide 4. While the reflection from face 16 increases the out-of-plane angle of ray 72, the incidence angle with respect to surface 12 still remains greater than the TIR angle $\phi_{TIR2}$ at the interface between the waveguide 4 and buffer layer 6. Therefore, ray 72 undergoes TIR from surface 12 and continues to be guided by means of TIR. Accordingly, longer optical path and additional interactions with surface relief features 8 will be needed to extract ray 72 into buffer layer 6.

In contrast, light propagating in waveguide 4 at angles close to the critical TIR angle $\phi_{TIRC}$ can be extracted into buffer layer 6 near the light input edge of the waveguide, as illustrated by the path of a ray 74. Ray 74 is emanated by the same light source 400 but has a greater initial out-of-plane angle than ray 72. Ray 74 strikes face 16 of an individual surface relief feature 8 at an incidence angle which is greater than $\phi_{TIR1}$. Therefore, ray 74 is reflected from face 16 by means of TIR and is directed toward opposing surface 12 at a greater out-of-plane angle than before striking feature 8. When the slope of face 16 is sufficient to result in a less than $\phi_{TIR2}$ incidence angle of ray 74 onto surface 12, no TIR will occur at surface 12 and ray 74 will refract into buffer layer 6.

Ray 74 further propagates in buffer layer 6 towards opposing surface 14 where it enters the light turning film of light extraction layer 20. Layer 20 is preferably configured to have a good optical contact with buffer layer 6. Although it may be simply laminated onto surface 14 with no air bubbles, an adhesion promoting layer may also be used, such as a layer of optical adhesive of double-sided adhesive tape or film, for example. The refractive index of the inner layer of the light turning film contacting surface 14 should preferably be not less than the refractive index of buffer layer 6. Likewise, the refractive index of the adhesion promoting layer, is any, should also be no less than the refractive index of layer 6. According to some embodiments, the above refractive indices may be matched to each other in order to substantially reduce or eliminate the Fresnel reflections.

The outer layer of the light turning film may have a refractive index greater than its inner layer. The corrugated boundary between the inner and the outer layer acts as a prismatic array and redirects light at a different angle with respect to the surface or its normal. The redirection mechanism may involve refraction and/or TIR. Accordingly, the internal boundary corrugations of the light redirecting film may be configured to intercept rays propagating at near-grazing angles in buffer layer 6 and redirect them towards a normal to the plane of waveguide 4, as illustrated in FIG. 6 referring to ray 74.

Figure 7:
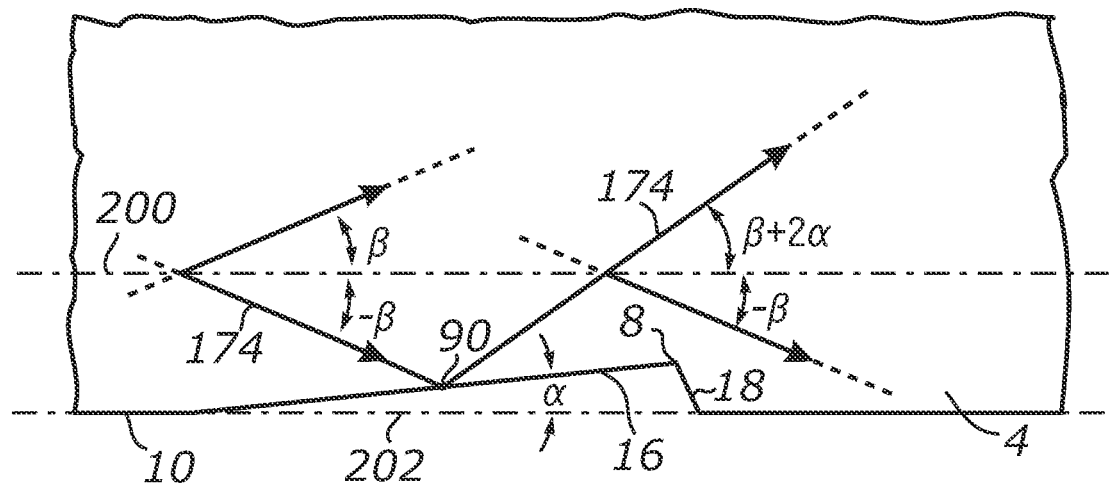
FIG. 7 is a schematic cross-sectional view and raytracing of a waveguide illumination system portion, showing light reflection by a surface relief feature, according to at least one embodiment of the present invention.

FIG. 7 depicts, in a cross-section parallel to the light propagation path, a portion of waveguide 4 including an individual prismatic depression in surface 10 and illustrates the light redirecting operation of surface relief feature 8 formed by said surface depression.

For the purpose of clarity and explaining the principles of light redirection by surface 10, the individual surface relief feature 8 is shown surrounded by flat portions of surface 10 which are parallel to longitudinal axis 200. However, it should be understood that system 2 may have any number of surface relief features 8 which can be spaced apart, contacting each other, overlapping, or otherwise distributed with any prescribed density along the intended propagation path.

Surface relief features 8 may have a constant pitch or spacing. Alternatively, the spacing between adjacent features 8 can be made variable along the propagation path. Particularly, it may be advantageous to provide some initial spacing between surface relief features 8 near the light input edge and gradually increase the density of the features as the distance from the light input edge increases. This may help improve the uniformity of light emission from surface 12 as the increasing density of surface relief features 8 will compensate the depletion of light by the preceding features 8.

Referring further to FIG. 7, light propagates in waveguide 4 left to right within an angular cone having an angular aperture of ±β, where β is an out-of-plane propagation angle counted from longitudinal axis 200. An uttermost ray 174 having the propagation angle of −β is shown striking face 16 of surface relief feature 8 at a point 90.

Face 16 is inclined at a dihedral angle α, hereinafter also referred to as a slope angle α, with respect to the prevailing plane of surface 10. Angle α is selected to be sufficiently low in order to preserve TIR at face 16 and to not cause decoupling of ray 174 through surface 10. 16 and result in TIR back to the core of waveguide 4. In will be appreciated that when light propagates in a waveguide mode, an angle complementary to angle β should generally exceed $\phi_{TIRC}$. Considering that, when low-n buffer layer 6 is employed (not shown in FIG. 7), $\phi_{TIRC}=\phi_{TIR2}$ and $\phi_{TIR2}>\phi_{TIR1}$, the acceptable range of angle α may be generally defined by the following relationship: $0<\alpha<\phi_{TIR2}-\phi_{TIR1}$.

Accordingly, the uttermost ray 174 having the propagation angle −β upon entering point 90 reflects from face 16 by means of TIR and obtains a new propagation angle of β+2α as a matter of optics. Therefore, the individual surface relief feature 8 causes widening the light propagation cone in the core waveguide 4 by angle 2α and also causes temporary angular asymmetry of the cone by the same angle.

Figure 8:
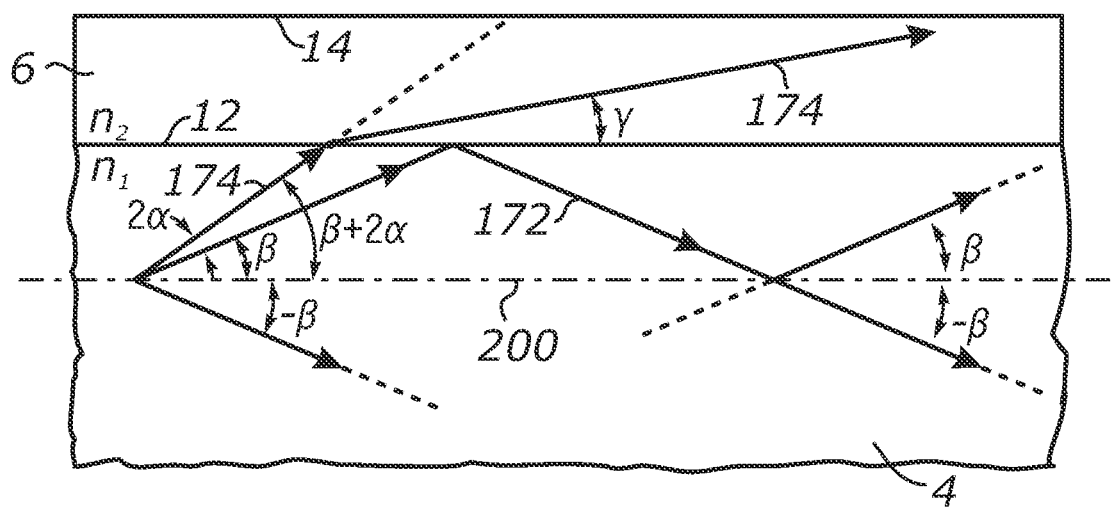
FIG. 8 is a schematic cross-sectional view and raytracing of a waveguide illumination system portion, showing light interaction with an opposing surface of a waveguide, according to at least one embodiment of the present invention.

FIG. 8 depicts an upper portion of waveguide 4 and illustrates the interaction of light with opposing surface 12 of waveguide 4 after its passing surface relief feature 8 of FIG. 7. Due to the smallness of slope α and the resulting smallness of the deflection angle caused by surface relief feature 8, a substantial part of light continues to propagate in the core of waveguide 4 by means of TIR. Particularly, all rays having the incidence angles with respect to surface 12 less than β are reflected from surface 12 by means of TIR. In other words, all light remaining in the angular range ±β, with respect to longitudinal axis 200, remains also confined in a waveguide mode.

However, the uttermost rays from the broadened angular propagation cone may now have incidence angles which no longer exceed second TIR angle $\phi_{TIR2}$. As further illustrated in FIG. 8, those rays may refract into buffer layer 6, generally at relatively low acute angles γ with respect to surface 12.

In an illustrative example where $90°-\beta \approx \phi_{TIR2}$, substantially all of the light having the propagation angles greater than β will exit from the core of waveguide 4 into buffer layer 6. Thus, it will be appreciated that, after interacting with surface 12, the light beam propagating within waveguide 4 will shed a relatively narrow cone of 2α into buffer layer 6 and again obtain the prior ±β angular range. In other words, the optical interface formed by surface 12 and separating waveguide 4 from smaller-refractive-index buffer layer 6 is "shaving off" rays having propagation angles in excess of the critical angles that still permit TIR at surface 12. The escaping cone 2α represents a fixed portion of the angular distribution of light in waveguide 4. Thus, the slope α of face 16 determines the amount of light extracted by each feature 8 into buffer layer 6 along the optical path. Accordingly, the rate of light extraction can be accurately controlled by varying the slope of TIR faces in the light extraction area for a given waveguide 4 geometry and relative refractive indices of the waveguide core and buffer layer 6.

It should be noted that a certain portion of light may undergo reflection from surface 12 even when the incidence angle onto said surface is less than $\phi_{TIR2}$, owing to the so-called Fresnel reflection from the optical interface between two layers having different refractive indices. Light reflected from surface 12 by means of Fresnel reflection will thus return back into waveguide 4 and can be recycled.

When waveguide 4 has planar slab geometry, the shallow depressions of in surface 10 that form surface relief features 8 may be made by sheet casting or extrusion from a suitable transparent polymer, such as acrylic, polystyrene or polycarbonate, for example. Alternatively, surface relief features 8 may be formed in a flat sheet of glass or polymer by any suitable methods for micro-replication or material removal. For example, grinding, milling or fly-cutting may be used with subsequent polishing of surface 10. In a more specific example, surface relief features 8 may be formed using a sharp diamond-tipped bit or cutter in which case the sufficient surface finish may be obtained without the need of subsequent polishing. In an exemplary implementation, the diamond cutting tool having the appropriate shape and slope of the cutting surface can be dragged across the surface of waveguide 4 leaving a shallow groove. In an alternative exemplary implementation, the diamond cutting tool can be used in a "fly-cutting" mode as it can be spun in a spindle at a high speed (preferably at speeds of 20000 to 100000 RPM), plunged to the appropriate depth into the surface of waveguide 4 and moved across the waveguide's surface. The rotation axis the tool should be preferably inclined at an angle with respect to a normal to the prevailing plane of waveguide 4 corresponding to the desired slope angle of the face 16 to be formed. Features 8 may be formed directly in the surface of waveguide 4 or they can also be formed in a separate optically transparent film or plate which can be attached to surface 10.

Figure 9:
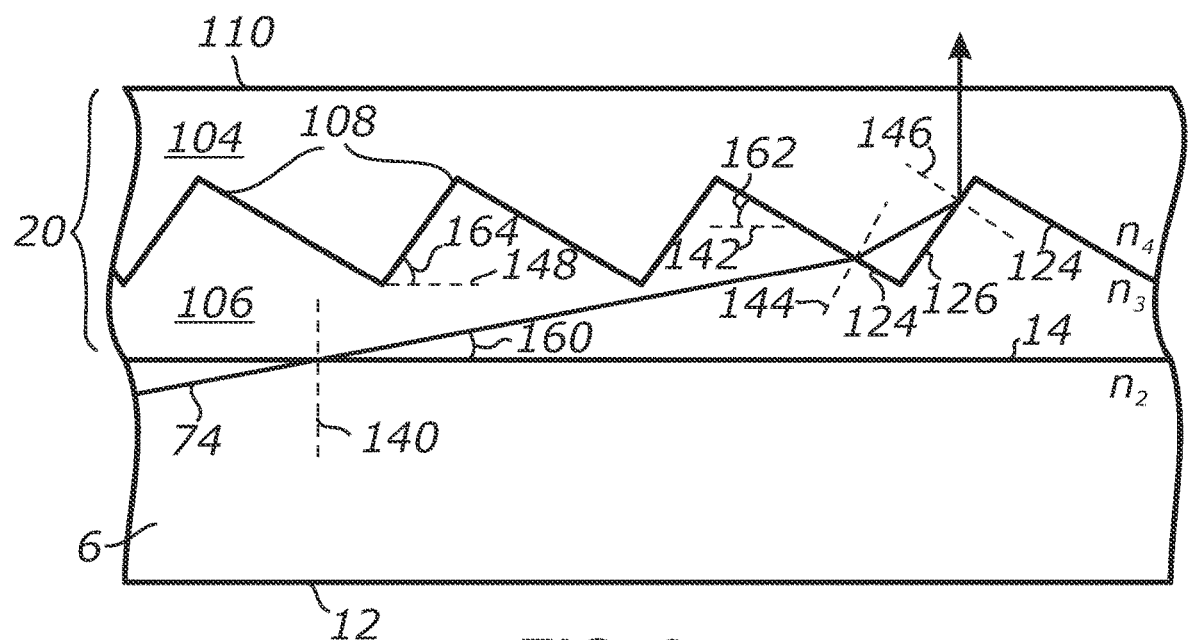
FIG. 9 is a schematic cross-sectional view of and raytracing of a waveguide illumination system portion, showing the operation of a light turning film attached to a buffer layer, according to at least one embodiment of the present invention.

The structure and operation of light extraction layer 20 including a light turning film is illustrated in FIG. 9 by way of example. The light turning film of layer 20 comprises a first layer 104 and a second layer 106 disposed in contact with each other and having a corrugated boundary between the two layers. Corrugations 108 forming the boundary have a linear triangular configuration in a cross-section with peaks and valleys extending perpendicular to the plane of drawing. Corrugations 108 also define a plurality of alternating interface facets making predetermined angles with the prevailing plane of system 2 so that the corrugated boundary between layers 104 and 106 comprises a plurality of facets 124 alternating with facets 126. Facets 124 are characterized by a first dihedral angle 162 with respect to the prevailing plane of system 2 and facets 126 are characterized by a second dihedral angle 164 with respect to that plane. Planes parallel to the prevailing plane of system 2 are indicated by reference lines 142 and 148 in FIG. 9. The light turning film is configured so that a refractive index $n_3$ of layer 106 contacting buffer layer 6 is smaller than a refractive index $n_4$ of layer 104 facing outwardly from layer 6.

The light turning film of layer 20 is configured to accept light propagating at low angles along surface 14 in buffer layer 6 and redirect said light at a greater angle with respect to the surface so as to result in light decoupling through surface 110. Referring further to FIG. 9, an angle 160 represents the low angle that incident ray 74 makes with surface 14 when it enters layer 20. In the illustrated embodiment, the light turning film may be configured to accept light emerging from layer 6 at angles between 0° and 20° from surface 14 (corresponding to 90° and 70° incidence angles with respect to a surface normal, respectively) and communicate said light a smaller angle with respect to the surface normal so that TIR can be overcome at surface 110. When system 2 is configured for light collimation, angle 160 should preferably be within a predefined narrow range of angles from the prevailing plane of waveguide 4, said range being primarily defined by the desired angular cone of the collimated light. While angle 160 may represent very sharp, near-grazing angles with respect to surface 14, it should also be understood that this angle may take any other suitable angular values provided that system 2 has the same basic operation.

Facets 124 are configured to have a generally smaller dihedral angle with respect to the prevailing plane of system 2 than facets 126. Furthermore, the dihedral angle 162 of facets 124 is preferably selected to be less than an angle which is complementary to angle 160 in order to provide refraction towards a normal to that plane.

Dihedral angle 164 of each facet 126 is preferably made greater than a maximum designed value of the angle that light can make with surface 14 in layer 104 after refracting at facet 124. At the same time, dihedral angle 164 of each facet 126 should preferably be selected so that the facet 126 can intercept light refracted by a preceding adjacent facet 124 and reflect it by means of TIR. Referring yet further to FIG. 9, light ray 74 deflected by the respective surface relief feature 8 (not shown) and receiving a sub-TIR angle with respect to surface 12 is extracted from the core of waveguide 4 (not shown) and enters buffer layer 6. Ray 74 further crosses surface 14 and enters layer 106 of layer 20. The refractive index $n_2$ of layer 6 can be matched to the refractive index $n_3$ of layer 106 so that ray 74 can make about the same refraction angle as the incidence angle with respect to a surface normal 140.

Ray 74 entering layer 106 at a sharp angle with respect to surface 14 propagates in layer 106 until it strikes facet 124 of the corrugated boundary with layer 104. Depending on angle 162, ray 74 may slightly bend toward a normal 144 by means or refraction at the interface between the lower refractive index layer 106 and the higher refractive index of layer 104, after which it may strike the next adjacent facet 126. The slope of facet 126 defined by dihedral angle 164 is selected to result in TIR at the interface between high-index layer 104 and low-index layer 106. Upon TIR, facet 126 communicates an additional bend angle to ray 74, this additional bend angle being twice the angle between ray 74 and facet 126. As a result, ray 74 may exit from layer 20 nearly perpendicular to surface 110. It should be understood that light turning film may also be configured to result in the emergence angles other than normal. However, it should also be understood that, ordinarily, ray 74 will be communicated an exit angle with respect to waveguide's 4 prevailing plane which is substantially greater than angle 160. According to at least some embodiments of this inventions, when system 2 is used for light distribution and improved collimation, it may be preferred that the slopes of surface relief features 8 and other parameters of waveguide and the respective outer layers are selected so that the light beam emitted from a major broad area surface of system 2 has a divergence which is at least less than the initial divergence of light emitted by source 400.

Figure 10:
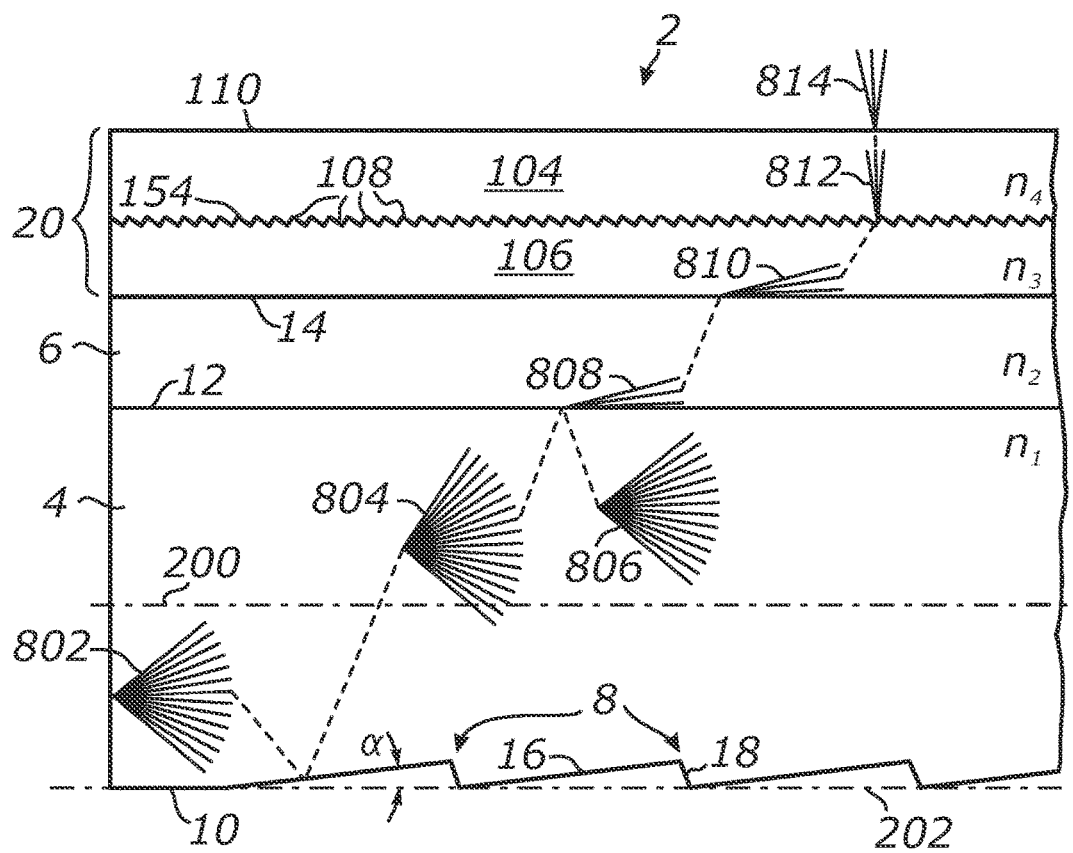
FIG. 10 is a schematic view of a waveguide illumination system portion, illustrating the principles of light collimation, according to at least one embodiment of the present invention.

FIG. 10 illustrates yet further details and operational aspects of embodiments of system 2 shown in the preceding drawing figures and depicts an exemplary case when system 2 is configured for emitting collimated light from its broad-area surface. A fan of rays 802 exemplifies the angular distribution of light initially propagating in waveguide 4 before interacting with surface relief features 8. It will be appreciated that the maximum half-angle of fan of rays 802 is defined by the acceptance angle of the core of waveguide 4. The acceptance angle is primarily defined by the refractive indices of waveguide 4 and buffer layer 6.

As light passes the first surface relief feature 8 along its propagation path, a portion of its rays obtains a greater out-of-plane angle thus widening the angular distribution of light, as exemplified by a fan of rays 804. In order to enable this widening of the angular distribution, face 16 of feature 8 is inclined at low slope angle α with respect to prevailing plane 202 of surface 10.

The slope of face 16 is sufficiently small and 90°−α≪$\phi_{TIR1}$. This prevents refraction at face 16 and light escape from waveguide 4 through surface 10. Therefore, the interaction of light propagating in waveguide 4 with face 16 will result in TIR back into the waveguide. Moreover, the slope angle α is also low so that the increment in the angular distribution it produces is substantially less than the angular span of fan of rays 802.

Face 16 has a substantially planar shape and smooth surface. Accordingly, light rays striking face 16 will obtain an increment in their out-of-plane angles which is twice the slope angle α. It will be appreciated that the range of directions represented by fan of rays 802 is at least partially overlapping with the range of directions represented by fan of rays 804.

As a result of TIR from face 16 of an first feature 8, at least some of the uttermost rays in fan of rays 804 may form incidence angles with respect to a normal to surface 12 greater than second TIR angle $\Delta_{TIR2}$. Therefore, upon reaching surface 12, these uttermost rays will cross said surface and refract into buffer layer 6, as illustrated by a fan of rays 808. It will be understood that this escaping light represents a small portion of light guided through waveguide 4 and is generally characterized by relatively low emergence angles in layer 6 (or high refraction angles with respect to a surface normal). Furthermore, it will be understood that, when angle α is sufficiently low, the angular span of fan of rays 808 will also be relatively low. Moreover, the divergence of fan of rays 808 can be easily controlled by varying slope angle α of the respective face 16. For example, when a high degree of light collimation is desired, the fan of rays 808 may be provided with a very low divergence by making angle α very low, accordingly.

As the extracted light emerges from the core of waveguide 4, it further crosses buffer layer 6 and eventually strikes its outer surface 14. Surface 14 representing the optical interface between layer 6 and light extracting layer 20 is configured for an unimpeded light passage into layer 20. Particularly, the inner layer 106 of the light turning film exemplifying layer 20 may be provided with the refracting index approximately matching the refractive index of layer 6, in which case TIR and Fresnel reflections can be substantially suppressed.

Referring further to FIG. 10, a fan of rays 810 represents light which is extracted from waveguide 4 and which further propagates into layer 106. Obviously, when the refractive indices of layers 6 and 106 are matched, fan of rays 810 can have essentially the same narrow angular span and low slope with respect to the prevailing plane of system 2 as fan of rays 808.

Referring yet further to FIG. 10, the corrugated boundary 154 between layer 106 and 104 comprises a plurality of asymmetric corrugations 108 defined by two different slopes of the opposing facets forming each of said corrugations. As explained in the above examples, corrugations 108 redirect light propagating at low angles towards a normal to the prevailing plane of system 2, as illustrated by a fan of rays 812.

It will be appreciated that fan of rays 812 may have a slightly different angular span than fan of rays 810 due to the at least one refraction occurring at boundary 154. However, it will also be appreciated that corrugations 108 may be designed to result in the angular span of fan of rays 812 still being sufficiently narrow.

As light redirected by the light turning film of layer 20 exits from system 2 along a normal to surface 110, it remains confined within a relatively narrow angular cone, as illustrated by a fan of rays 814. When exiting from surface 110, the out-of-normal rays may undergo some refraction further away from the surface normal since the refractive index of the outside medium is lower than that of layer 104. However, when the angular distribution of fan of rays 812 is sufficiently narrow, the angular distribution within the emergent fan of rays 814 will also be relatively narrow.

Thus, system 2 can emit highly collimated light from its frontal surface without employing traditional collimating elements such as lenses or mirrors. Accordingly, it can be shown that the process of light extraction and collimation can continue along the light propagation path in waveguide 4. As illustrated by a fan of rays 806 representing light propagating at greater-than-TIR angles and reflected from surface 12, layer 6 depletes light from waveguide 4 in a controlled manner by "shaving-off" only a narrow cone of the uttermost rays. The rays escaping into buffer 6 obtain their sub-TIR angles with respect to surface 12 due to TIR from features 8. Since features 8 are distributed along the longitudinal axis 200 of waveguide 4, they will continue providing additional angular bias to the guided light and thus result in continuous light extraction from system 2 through surface 110.

In view of the above description, it will be appreciated that the collimating function of system 2 was achieved using simple, non-collimating and non-focusing elements for light-deflection, such as shallow surface microstructures having planar surfaces. The prior-art devices used for directing light into a relatively narrow emission cone ordinarily use various complex-shape collimating optical elements such as spherical or aspherical lenses, parabolic or spherical mirrors, as well as arrays of such optical elements in various combinations. In contrast, the above illustrated embodiments of system 2 use no such complex shapes of elements.

Furthermore, the conventional devices employing lenses, mirrors or their arrays and commonly require precise positioning of the light emitting features with respect to the collimating elements. Particularly, each light emitting feature should typically be positioned along the optical axis and in focal area of the respective collimating element. Contrary to that, the layers or individual light deflecting or redirecting features of system 2 do not necessarily require any special positioning or alignment with respect to each other except the very basic alignment or positioning of the layers with respect to each other. Thus, the relatively simple and manufacturing-friendly structure of system 2 can be advantageously selected for a number of illumination applications requiring at least some degree of collimation, such as, for example, directional wide-area illuminators, LED panel luminaires for general or special lighting, spotlights, accent lights, flashlights, backlights with a limited emission angle, and the like.

Figure 11:
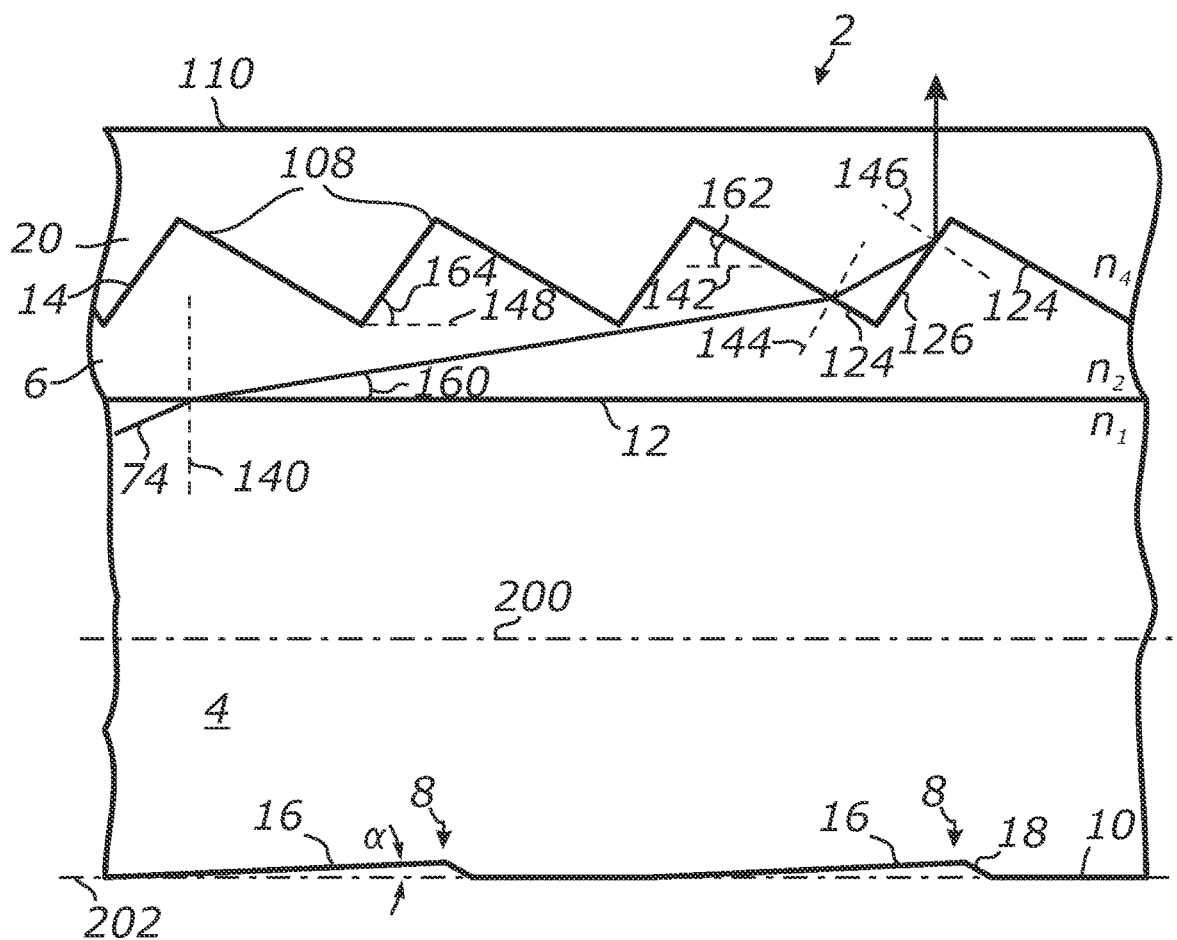
FIG. 11 is a schematic view of a waveguide illumination system, showing a buffer layer having a corrugated boundary with a light extraction layer, according to at least one embodiment of the present invention.

FIG. 11 illustrates an alternative light-collimating variation of system 2 in which buffer layer 6 has corrugated external surface 14 and light extracting layer 20 is disposed in contact with layer 6 conforming to the relief of surface 14. Additionally, light extracting layer 20 has a higher refractive index than layer 6 so that the pair of layers 6 and 20 forms a light turning structure similar to the light turning film described in the above examples. Accordingly, corrugations 108 are now formed by the corrugated boundary between layers 6 and 20.

Each corrugation 108 includes facet 124 configured for refracting light towards surface 110 and adjacent facet 126 configured for reflecting light by means of TIR generally along a normal to surface 110. Thus, facets 124 and 126 may be configured to provide nearly 90° light bending by two stages: the first stage being the refraction at facet 124 and the second stage being TIR at facet 126. It will be appreciated that the slope of facets 124 may be advantageously selected to intercept and bend substantially all of the light escaping from waveguide 4 into buffer layer 6.

Similarly to the above-described embodiments and examples, since buffer layer 6 has a lower refractive index than the core of waveguide 4, it provides the required asymmetry in refractive indices at the optical interfaces formed by surfaces 10 and 12 so that light escapes from waveguide 4 primarily through layer 6 and the light-turning structure formed by layers 6 and 20.

Accordingly, each face 16 of surface relief features 8 formed in surface 10 has slope angle α which is low enough to prevent light leakage through surface 10 but is sufficient to eventually extract at least a substantial part of light propagating in waveguide 4. As explained above, this requirement may be generally satisfied by limiting angles α to less than $\phi_{TIR2}-\phi_{TIR1}$, where $\phi_{TIR1}$ and $\phi_{TIR2}$ are the TIR angles at the waveguide 4 boundaries formed by surfaces 10 and 12, respectively. Furthermore, angle α may be further restricted to even smaller angles to minimize the fan-out angle of the light escaping into layer 6 and/or reducing or eliminating the unwanted light leakage resulting from Fresnel reflections at surface 12.

It will be appreciated by those skilled in the art that the Fresnel reflection generally occurs at each light passage from one refractive medium into another if there is a difference in refractive indices between the media. Although the Fresnel reflections usually account for a small fraction of light energy refracting into the other medium, especially when the difference of refractive indices is relatively small, the relative amount of reflected light increases at high incidence angles. Particularly, Fresnel reflection increases when light travels from a higher refractive index medium into a lower refractive index medium at an angle of incidence closely approaching the TIR angle at the optical interface between the two media. Therefore, referring to the optical interface formed by the core of waveguide 4 and buffer layer 6, some light may still reflect from surface 12 back into the waveguide core even when the incidence angle is lower that the second TIR angle $\phi_{TIR2}$.

In order to minimize the chance for such rays to exit through surface 10, angle α may be limited to a reduced allowable angular range of $0<\alpha\ll\phi_{TIR2}=\phi_{TIR1}$. In this case, sub-TIR rays reflected from surface 12 back towards surface 10 by means of Fresnel reflection will strike the respective face 16 at an incidence angle which is still less than $\phi_{TIR1}$. Accordingly, the respective face 16 will reflect said rays towards surface 12 by means of TIR which will prevent premature light escaping from waveguide 4 through surface 10 and still result in light decoupling from surface 12. Thus, the sufficiently low angles α may provide a sufficient cushion for light recycling in waveguide 4 and maintaining its intended operation even in the presence of unwanted reflections from surface 12.

Referring further to FIG. 11, the light exit portion of system 2 may be provided with a light diffusing layer. For example, the external surface 110 of layer 20 may be patterned to provide diffusing properties. Alternatively, a light diffusing film or sheet may be attached to surface 110. Such diffusing layer may be used to soften the angular distribution of collimated light emitted by system 2. It may also have a function of masking the intensity irregularities across the light-emitting surface. The surface features of the light diffusing layer may be configured to limit the diffusion angle to a desired beam spread and generally preserve the directionality of the emitted beam.

Figure 12:
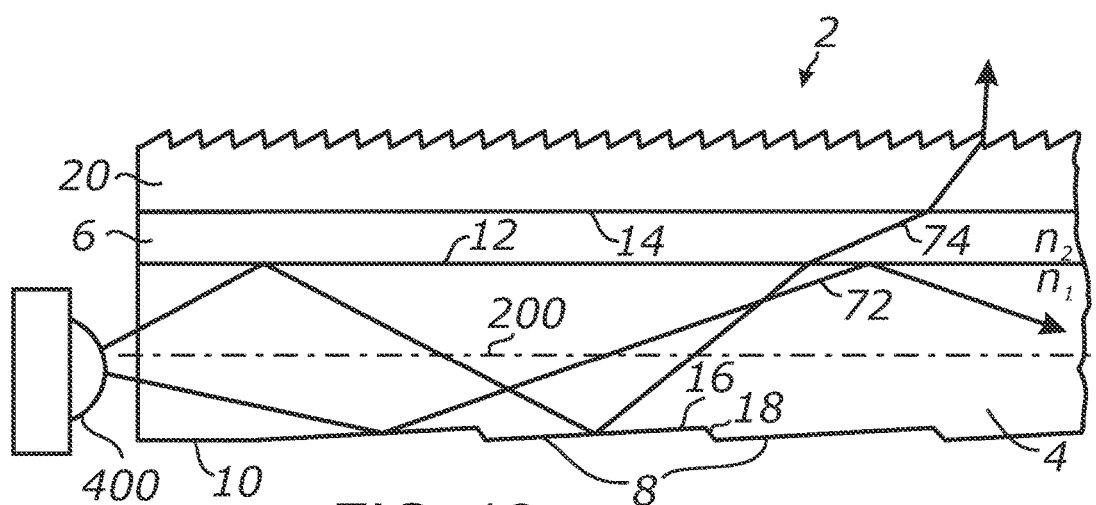
FIG. 12 is a schematic cross-sectional view and raytracing of an illumination system portion, showing surface microstructure formed in a light extraction layer, according to at least one embodiment of the present invention.

FIG. 12 shows an embodiment of system 2 in which layer 20 has a microstructured surface configured for extracting light from system 2 by means of refraction and/or TIR. The microstructured surface of layer 20 represents a linear prism array where each linear prism extends perpendicular to axis 200 and generally parallel to linear surface relief features 8 of waveguide 4.

Similarly to the embodiment of FIG. 6, light source 400 provided on the waveguide's light input edge illuminates the edge and injects light into waveguide 4. The light injected into the waveguide propagates in a waveguide mode by bouncing from opposing surface 10 and 12 of the waveguide. The repetitive pattern of surface relief features 8 along axis 200 ensures that most light rays undergo multiple interactions with features 8 along the propagation path. Surface relief features 8 deflect light from the original propagation direction by incrementally communicating the respective light rays a greater out-of-plane angle at each interaction eventually resulting in light decoupling from waveguide 4 into buffer layer 6. The dihedral angles of the shallow prismatic corrugations representing features 8 are so selected as to result in extracting at least a substantial part of light from waveguide 4 by means of incremental deflections.

Layer 20 preferably having the same or greater refractive index than layer 6 receives light emerging from waveguide 4 and layer 6 and further redirects it out from system 2. For this purpose, the facets of each linear prism of light extraction layer 20 should be positioned to prevent light reflection back into layer 20. In one embodiment, such system 2 may be utilized as a broad-area luminaire emitting light at an angle with respect to a surface normal. In one embodiment, such system 2 may be utilized as a front-light in which case, for example, an image print or painting (not shown in FIG. 12) may be externally attached to layer 20 or disposed in an immediate proximity to said layer.

Each linear prism of layer 20 may also be configured to intercept light rays propagating at a first angle with respect to a surface normal and redirect them at a greater angle with respect to the same normal so that light emitted by system 2 is collimated at least in a plane perpendicular to the longitudinal axis of the array of prisms. As illustrated in FIG. 12 by example of ray 74, at least some rays may be emitted from system 2 in a perpendicular direction with respect to the surface plane.

The prismatic layer 20 may be made by a variety of means. In a non-limiting example such layer 20 may be made in the form of a microstructured sheet or film and then laminated onto layer 6. Alternatively, layer 20 may be deposited onto layer 6 first and the prismatic array may be embossed in a subsequent step. In a further non-limiting example, the fabrication of system 2 may include initially forming a complete layered structure (including waveguide 4 and layers 6 and 20) with smooth external surfaces and subsequently providing microstructures in waveguide 4 and layer 20 in a single step.

Figure 13:
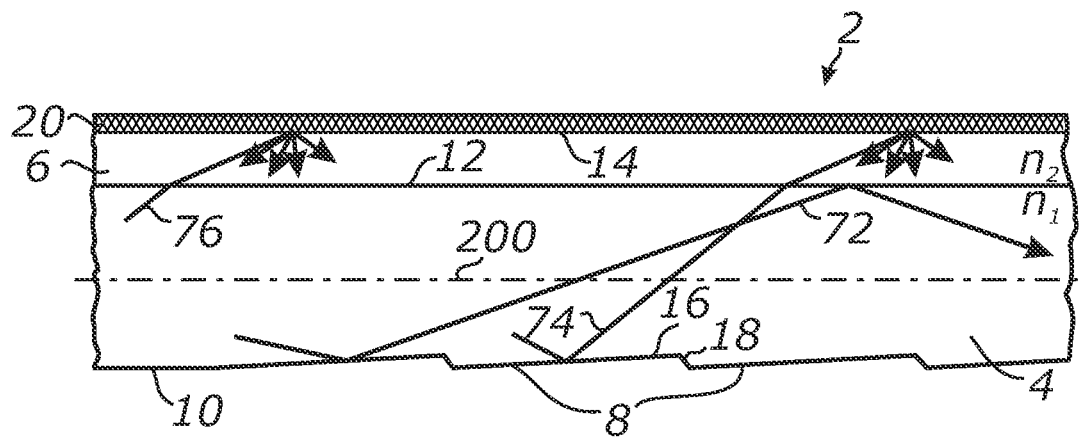
FIG. 13 is a schematic cross-sectional view of and raytracing of a waveguide illumination system portion, showing a light scattering layer attached to a buffer layer, according to at least one embodiment of the present invention.

FIG. 13 illustrates a front-light implementation of system 2 where layer 20 comprises a screen having at least one light scattering surface to be illuminated by the light propagating in waveguide 4. Such layer 20 may be formed, for example, by providing an opaque or semi-opaque scattering layer on top of surface 14. The opaque light scattering layer may be provided by a variety of means and may include, for example, white paint or pigment, colored paint or pigment, back-scattering film, surface texture, ink, phosphorescent or fluorescent substance, liquid crystals, etc. In a further non-limiting example, layer 20 may comprise a screen containing any print, image, logo, text, symbols, pattern, or the like features. When the screen includes an image print, the print may be formed directly on surface 14 using screen printing, digital printing, offset printing, ink spraying, hand painting, machine painting or the like processes. Alternatively, the print may be formed on the surface of an external film, paper or any other suitable substrate which can be laminated or otherwise attached to surface 14. Such external film can be made of an opaque material in which case the printed surface should face layer 6. Alternatively, the external film with an image print can be made from an optically transparent material in which case the print may face either layer 6 or away from layer 6.

Referring further to FIG. 13, rays 72 and 76 having sufficiently high out-of-plane angles exit from waveguide 4 into buffer layer 6 at different locations along axis 200 where they are scattered by layer 20 generally towards a normal to axis 200. In contrast, ray 72 illustrating the main bulk of light rays propagating in waveguide 4 at lower out-of-plane propagation angles, continues to be guided by means of TIR from surfaces 10 and 12 until it obtains the sufficient out-of-plane angle to exit into layer 6 and to be extracted from system 2 by layer 20. Layer 20 may be configured to scatter light primarily towards surface 10 and may optionally incorporate a reflective layer to reflect any stray light escaping towards the opposing direction.

According to at least some embodiments, the slope of the light reflecting faces 16 of surfaces relief features 8 can be made low enough in order not to perceptibly affect the visual appearance of surface 10 or the light-scattering screen of layer 20 compared to the case when surface 10 is perfectly smooth and flat. Additionally, the surface depressions forming features 8 may be made substantially shallow so as not to significantly deflect light rays propagating at low angles with respect to a normal to the prevailing plane of system 2.

Figure 14:
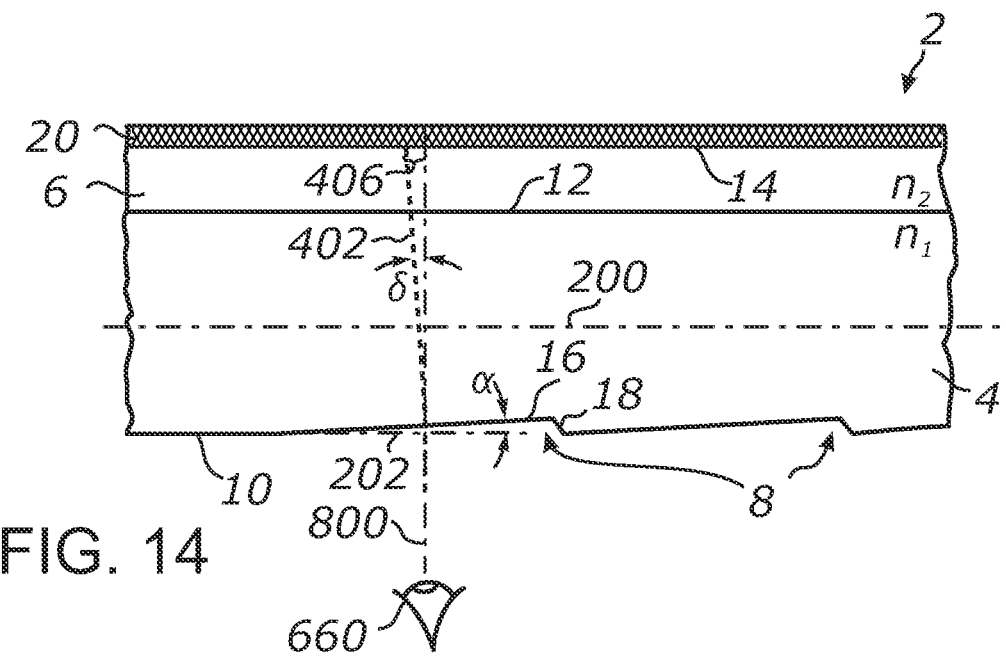
FIG. 14 is a schematic cross-sectional view of a waveguide illumination system portion in a front light configuration, showing an exemplary light path between a light scattering layer and a viewer, according to at least one embodiment of the present invention.

FIG. 14 further illustrates the operation of system 2 of FIG. 13, where system 2 has a planar front-light configuration. For the purpose of illustrating the front-light operation of system 2, it is assumed that an observer is viewing system 2 from a normal viewing angle.

Obviously, each sloped face 16 will slightly alter the light propagation path between the viewer and the light scattering screen compared to the case where surface 10 would be perfectly smooth and planar. Slope angle $\alpha$ of faces 16 with respect to plane 202 of surface 10 will define how much light will deviate from "an ideal" path along the surface normal. Accordingly, at any non-zero angle $\alpha$, an actual light path 402 from a light emitting/scattering point at surface 14 to a viewer's eye 660 will be different from a hypothetical light path coinciding with a normal 800 to plane 202. Particularly, path 402 will deviate by a deviation angle $\delta$ from normal 800 and result in the observer viewing a different area of layer 20 which is offset from the respective "on-axis" area by an offset distance 406. This offset distance 406 depends on angle $\alpha$, as well as on the refractive indices and thicknesses of waveguide 4 and layer 6. If layer 20 comprises a high-fidelity image print and angle $\alpha$ is high, the observer may experience seeing the neighbouring image pixels compared to the case of viewing the same print through a perfectly flat transparent plate.

However, it will be appreciated that angle $\alpha$ may be selected to be sufficiently low so that deviation angle $\delta$ will also be low resulting in a negligibly small offset distance 406 so that the observer will not experience a perceptible change in the visual image quality. By way of example and not limitation, angle $\alpha$ may take particular values of 1 angular degree or less. It can be shown that at such slope angles of faces 16 and with using some common transparent materials for waveguide 4 and buffer layer 6, the deviation angle $\delta$ will also be about 1 degree or less, in which case the offset distance 406 will generally not exceed 1.5-2% of the combined thickness of waveguide 4 and layer 6. Particularly, if the thickness of the respective transparent layers of system 2 is about 5 mm, offset distance 406 will generally be less than 100 microns at near-normal viewing angles.

Furthermore, the slopes of faces 16 can be made identical to each other in which case the light path deviations caused by the plurality of individual features 8 will simply translate the entire image, as viewed by the observer, perpendicularly to the surface normal by a small distance and thus will also not cause the loss of perceptive image fidelity. In the illustrated front light configuration of system 2, faces 18 can be made perpendicular or near-perpendicular to surface 10 so that the visible aperture of faces 18 will be negligibly small, also being substantially smaller than the visible aperture of faces 16. This should ensure that faces 18 do not notably interfere with image viewing.

As substantially all of the light propagating through system 2 can be distributed along waveguide 4 and emitted towards the image print along the propagation path, the efficiency of system 2 as a front light can be made fairly high. As explained above, surface relief features 8 preliminary extract light into buffer layer 6 where the extracted light illuminates layer 20. Layer 20, in turn, scatters light towards the observer and permanently extracts at least a substantial portion of light from system 2. Since the unwanted light leakage through surface 10 is eliminated or at least substantially reduced by providing sufficiently low slopes of faces 16 and by providing an asymmetry in refractive indices of the media adjacent to surfaces 10 and 12 of waveguide 4, a front light employing system 2 may be used for displaying images in higher fidelity, bright illumination, and improved contrast compared to conventional edge-lit front lights.

Figure 15:
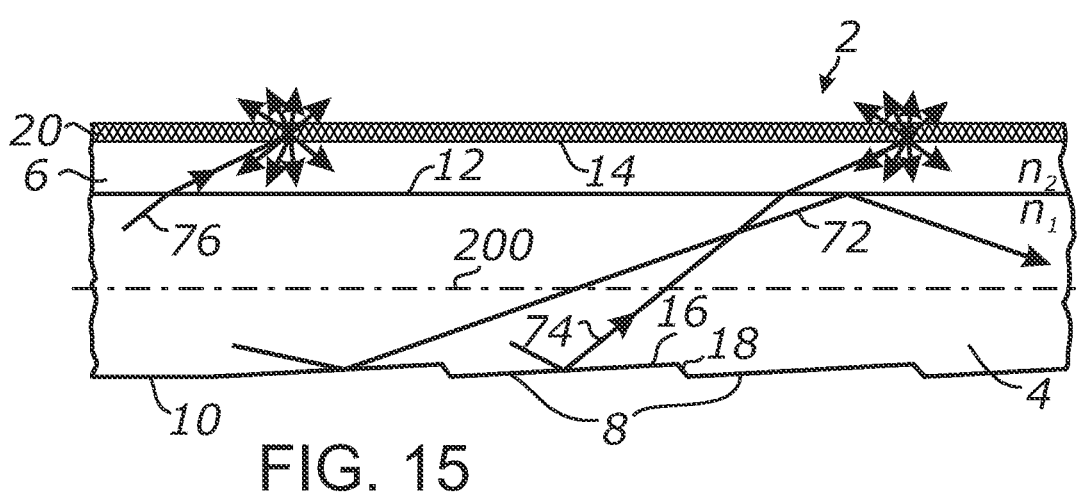
FIG. 15 is a schematic cross-sectional view of a waveguide illumination system portion, showing a translucent light scattering layer, according to at least one embodiment of the present invention.

FIG. 15 illustrates a variation of light scattering layer 20 which is configured to scatter light into both hemispheres from its plane. Such layer 20 may be exemplified by a textured matte-finish surface of an optically transmissive plate or film. Such layer 20 may also be exemplified by a semi-transparent layer of white or colored paint, ink, phosphors or dye deposited onto an optically transmissive surface. The appropriate light scattering features of layer 20 may be formed directly on surface 14 or they may be provided on a transparent or translucent substrate which can be attached to surface 14.

In a backlight variation of this invention, layer 20 may be provided with light diffusing features which diffuse and forward-scatter light emerging from layer 6 toward the viewer. By way of non-limiting example, the light diffusing layer 20 of FIG. 15 can be configured to provide a bright uniform glow from its surface. It may also be associated with a translucent image print, see-through LCD screen, colored film and the like, making system 2 suitable for edge-lit signage and general illumination applications.

Figure 16:
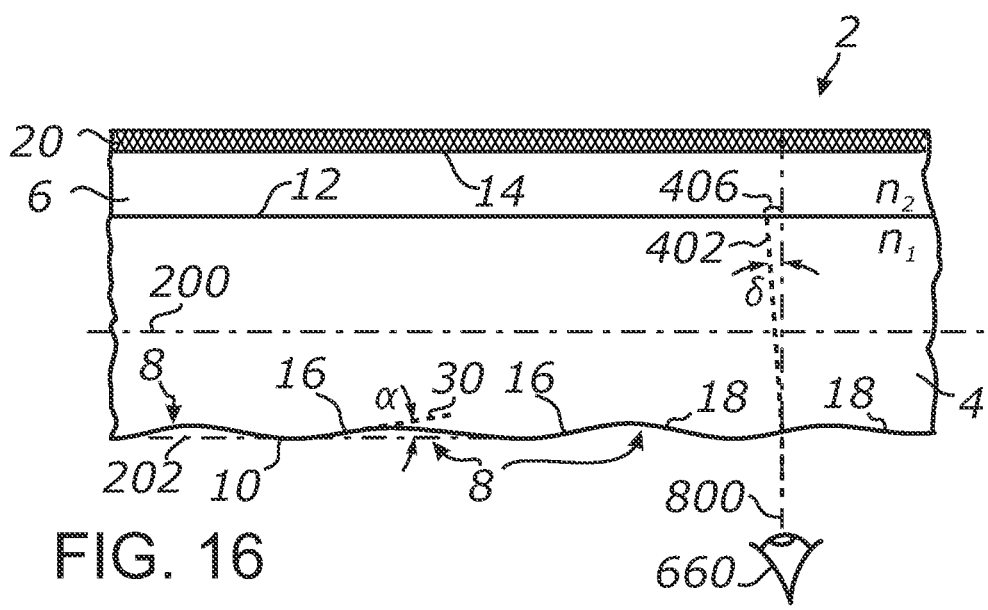
FIG. 16 is a schematic cross-sectional view of a waveguide illumination system portion, showing a smooth corrugated surface of a waveguide, according to at least one embodiment of the present invention.

FIG. 16 shows an embodiment of system 2 in which surface relief features 8 are exemplified by smooth and shallow linear undulations or corrugations extending generally perpendicular to longitudinal axis 200 of waveguide 4 and providing surface waviness in a cross-section parallel to axis 200. In the illustrated embodiment, faces 16 and 18 both have smooth curved surfaces which smooth conjugates between each other.

Similarly to the sharp-corner surface relief features 8 discussed above, the smooth linear undulations may be formed by casting or extrusion of waveguide 4 from an optically transmissive polymeric material or formed in a flat sheet of glass or polymer by micro-replication or material removal. In another example applicable to both the planar and cylindrical geometries of waveguide 4, the smooth undulations or corrugations of surface relief features 8 may be formed by laser ablation or thermal evaporation. In the case of waveguide 4 made from acrylic, a $CO_2$ laser with the operating wavelength of about 10 microns may be used to selectively ablate the surface material and produce the required features. Optional polishing may include, for example, buffing, flame polishing or thermal annealing. In further examples, the smooth surface 10 may be subjected to any other suitable surface modification process such as embossing, imprinting or etching in order to produce the suitable surface relief features 8. In yet further examples, various processes involving heat sources may be used to modify surface 10 accordingly by means of material melting softening, thinning, stretching, etc.

The surface undulations may be made periodic and having a constant pitch and/or slope. Alternatively, the width or slope of each undulation may be made variable in a cross-section along the propagation path. The amplitude of the undulations may also be made constant or variable. Particularly, if a constant pitch is employed, the amplitude or surface slope may be made increasing along the propagation path in order to compensate the gradual light depletion in waveguide 4. A useful variation of surface relief features 8 may include shallow surface undulations having a variable slope of faces 26 which increases along the intended optical path. It will be appreciated that the increase of the slopes of undulations or corrugations along waveguide 4 will increase the rate of light extraction from the waveguide along the optical path thus compensating the light depletion and resulting in an improved uniformity across the waveguide's surface. Particularly, the individual slopes of faces 16 may be selected to provide light uniformity within 20-30% across the light emitting surface of system 2.

Furthermore, undulations or corrugations forming features 8 may be made essentially random within predefined ranges of width, height and/or slopes. The distribution of surface relief features 8 along axis 200 may also be made random or ordered. The randomization or quasi-randomization of features 8 may have a particular advantage for simplifying the fabrication process as well as for reducing the glare from surface 10 in the end products employing system 2. The light extracting properties of waveguide 4 essentially equivalent to making smooth undulations in surface 10 may also be provided by making the thickness of waveguide 4 variable along the propagation path.

Accordingly, each surface relief feature 8 represented by smooth surface undulations or corrugations may be configured to have a reflective face 16 facing the light source and an opposing face 18 facing away from the light source. Each face 16 may be shaped so that at least a portion of its surface is generally inclined at the appropriate angle α with respect to the prevailing plane 202 of surface 10. In FIG. 16, slope angle α is illustrated by the angle between plane 202 and a tangent 30 to face 16 of surface relief feature 8. Similarly to at least some of the above described embodiments, the acceptable range of angle α may be selected from the following relationship: $0<\alpha<\phi_{TIR2}-\phi_{TIR1}$.

Each face 16 is designed to introduce an additional out-of-plane angle to light propagating in waveguide 4 and extract light propagating at near-critical TIR angles into layer 6. Layer 20 is provided to finally extract light from system 2 and scatter or direct the extracted light out of the illumination system.

Also, in a continuing similarly to the above described embodiments employing sharp-cornered shallow depressions and planar faces 16 and 18, the depth of each corrugation or undulation forming features 8 can be made sufficiently small relatively to the width so as to result in very low slope angles that faces 16 and 18 make with plane 202. On one hand, it allows for distributing light along a considerable length of waveguide 4 since each feature 8 redirects only a small fraction of light propagating in waveguide 4 and extracts only a portion of light striking its surface allowing the rest to be guided further through the waveguide by means of TIR. On the other hand, low slope angles provide for low deviation angles S and small offset distances 406 for the viewer, which makes system 2 particularly suitable for low-distortion edge-lit front lights.

Figure 17:
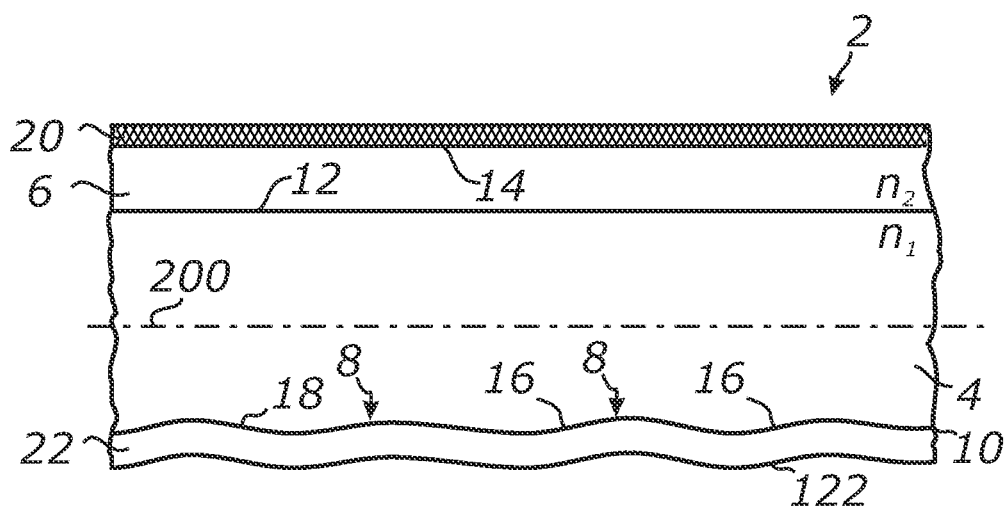
FIG. 17 is a schematic cross-sectional view of a waveguide illumination system portion, showing a cladding layer attached to a corrugated surface of a waveguide, according to at least one embodiment of the present invention.

FIG. 17 shows an embodiment of waveguide illumination system 2 in which an external cladding layer 22 is provided on top of surface 10. Layer 22 may be made from the same or similar material that buffer layer 6 and may have an external boundary 122 with the outside medium such as air. Cladding layer 22 may provide protection of surface 10 from abrasion, scratches, contamination or optical contacting with other bodies or substances which may adversely impact the light guiding properties. Ordinarily, the refractive index of cladding layer 22 should not exceed the refractive index of buffer layer 6 to provide for maximum isolation of light in waveguide 4. However, it should be understood that layer 22 may also have any other suitable refractive index. It will be appreciated that even when the refractive index of layer 22 is the same lower than that of layer 6, system 2 may still operate in the manner described above. Although at least some of the light rays propagating in waveguide 4 and obtaining angles lower than critical TIR angle $\phi_{TIRC}$ with respect to the surface normal may transiently exit into layer 22, the boundary 122 of layer 22 with the even lower-index outside medium will ensure that these rays will reflect from surface 122 by means of TIR. The rays reflected from surface 122 can then return back to waveguide 4 where they can ultimately escape through buffer 6 and can be further extracted from system 2 by layer 20.

Figure 18:
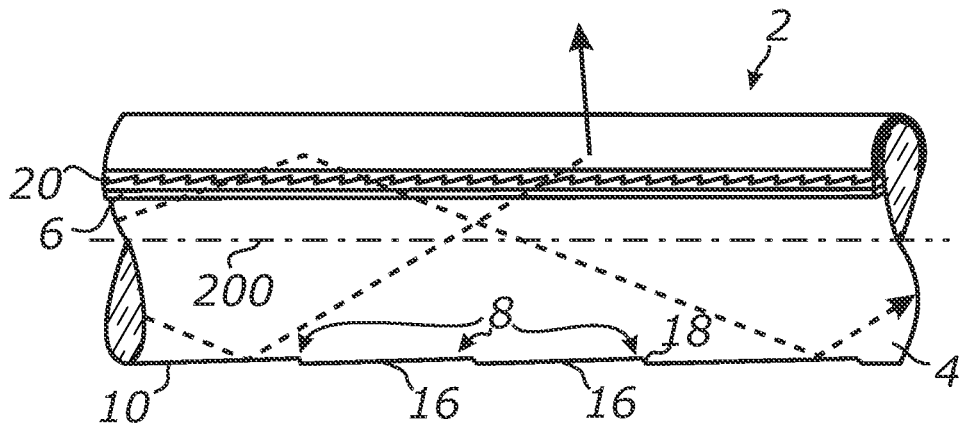
FIG. 18 is a schematic view of a waveguide illumination system having a cylindrical configuration, according to at least one embodiment of the present invention.

FIG. 18 illustrates an embodiment of waveguide illumination system 2 where system 2 has a cylindrical configuration. By way of example, waveguide 4 may be represented by a large-core polymer optical fiber (LCPOF). LCPOF may also include an optional cladding layer (not shown in FIG. 18) surrounding the fiber core. Surface relief features 8 are formed in the side of the cylindrical waveguide 4 opposite to the intended light emission direction. The opposing side of cylindrical waveguide 4 is provided with buffer layer 6 having the refractive index lower than the refractive index of the fiber's core. Light extraction layer 20 is provided on top of layer 6 and may comprise, by way of example, a light turning film designed to accept light emerging at low angles from the fiber and redirect it at a higher angle with respect to the fiber's longitudinal axis. Each feature 8 may have face 16 facing the light source and adjacent face 18 facing away from the light source. The slope of each face 16 with respect to the longitudinal axis 200 of waveguide 4 is sufficiently low in order to prevent light escape through that face and in order to cause the extraction of relatively small portions of light into layer 6 along the propagation path according to the principles discussed above.

In operation, light rays initially propagate in the fiber's core of waveguide 4 at propagation angles permitting for TIR from the longitudinal walls of the fiber, that is at the incidence angles with respect to a surface normal greater than critical TIR angle $\phi_{TIRC}$. Each ray having a sufficient out-of-plane propagation angle eventually strikes one or more faces 16 which progressively communicate greater out-of-plane propagation angles to the ray at each interaction. As any ray reaches the minimum out-of-plane angle sufficient for suppressing TIR at the boundary with buffer layer 6, it can escape into layer 6 and can be further directed by the light turning film of layer 20. Particularly, the light turning film may be configured to emit light in a relatively narrow range towards a perpendicular to the fiber's axis at least in a cross-sectional plane parallel to said axis. Additionally, since the fiber ordinarily has a circular or elliptical transversal cross-section, the cylindrical configuration of the waveguide 4 may also provide at least some light collimation in the plane perpendicular to the longitudinal axis 200. Therefore, it will be appreciated that system 2 having a cylindrical configuration may be configured to collimate light in one or two dimensions and emit the collimated light perpendicular to the fiber along its entire length thus providing an efficient side-emitting fiber illuminations system.

It should be understood, however, that the application of cylindrical configurations of waveguide 4 is not limited to the side emitting fibers but also includes various light pipes, edge illuminators or any suitable illumination systems which may benefit from the elongated shape of the light distributing waveguide. In a cylindrical configuration, waveguide 4 may have any suitable shape in a cross-section perpendicular to the longitudinal axis 200 of the waveguide. Suitable cross-sectional shapes may include but are not limited to: circular, elliptical, square, rectangular, hexagonal, trapezoidal or other shapes having any number of sides each having straight or curved profiles. The cross-sectional shape may also be formed by a profile which contour can be made variable along the longitudinal axis of waveguide 4.

Figure 19:
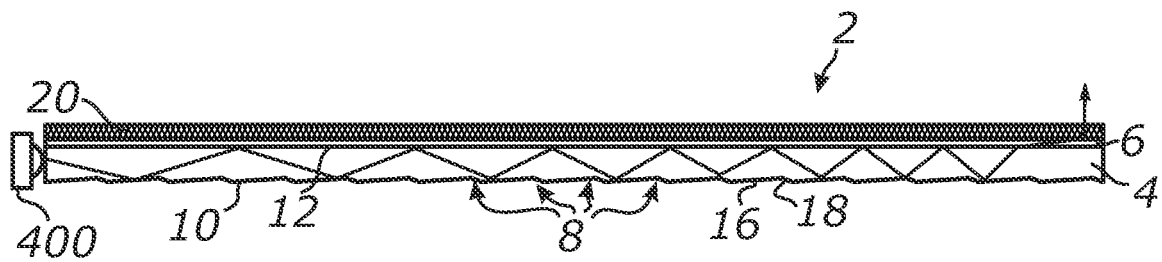
FIG. 19 is a schematic view and raytracing of a waveguide illumination system, showing multiple reflections from surface relief features, according to at least one embodiment of the present invention.

FIG. 19 depicts an embodiment of waveguide illumination system 2 illustrating the incremental increasing the out-of-plane angle of the guided light by multiple TIR reflections from respective surface relief features 8. Referring to FIG. 19, a light ray emitted by edge-coupled light source 400 initially propagates in waveguide 4 at an incidence angle with respect to surface 12 far exceeding the critical TIR angle $\phi_{TIRC}$. Surface relief features 8 formed in surface 10 are distributed along the longitudinal axis of the waveguide.

The plurality of features 8 alters a generally planar cross-sectional outline of surface 10. Each feature 8 is formed by a shallow recess or depression in surface 10 and has two opposing adjacent faces, 16 and 18. Face 16 is facing the light source and has a low slope angle with respect to the prevailing plane of surface 10. Face 18 is facing away from the light source and has a generally higher slope with respect to the prevailing plane of surface 10.

As the light ray randomly encounters features 8 on its path, it strikes the respective faces 16 and reflects from them by means of TIR. Since the angle of reflection is equal to the angle of incidence with respect to a normal to face 16, the ray incrementally obtains a greater out-of-plane angle at each interaction with features 8 and continues to propagate along the longitudinal axis of waveguide 4. This process is continuing until the angle of incidence to surface 12 exceeds the TIR angle at that surface in which case the ray escapes into buffer layer 6.

It will be appreciated that, depending on the initial propagation angle, light may propagate different distances in waveguide 4 until it exits into buffer layer 6, even if the slopes of reflective faces are kept constant. Considering that the conventional light sources have at least some beam divergence, at least a substantial portion of light input through the waveguide's edge can be effectively distributed along the longitudinal axis of waveguide 4 and extracted from surface 12 at generally low emergence angles with respect to that surface.

As the light ray decoupled from the core of waveguide 4 further propagates through layer 6, it reaches light extracting layer 20. The light turning film of layer 20 intercepts light emerging from waveguide 4 and redirects it at a normal angle with respect to the prevailing plane of system 2. Thus, light becomes effectively extracted from system 2 with collimation. This operation makes system 2 particularly suitable for making directional illumination systems, such as, for example, side-emitting large-core fibers and planar edge-lit LED panels.

Various parameters of surface relief features 8 may be varied to fine tune the light distribution and emission from the surface of waveguide 4. These parameters include but are not limited to: width, height or slope of reflective faces 26, general shape and distribution of features 8 along the propagation path, etc. An optional mirrored surface may be provided along surface 10 of waveguide 4 to reflect any stray light that may escape from the waveguide towards a direction opposing to layer 20.

It should be understood that the differential between the stepped drop in refractive indices outwardly at surface 10 and 12 of the waveguide 4 is important to force light to escape from the waveguide's core generally through surface 12 and not through surface 10. As illustrated above, such differential can be easily obtained by providing buffer layer 6 having a lower refractive index than the core of waveguide 4 but higher than that of the outside medium. Since the addition of the buffer layer can generally lower the acceptance angle of waveguide 4 compared to the bare waveguide core surrounded by low-n air on both sides, a light collimating feature may be associated with light source 400 or with the light input edge of the waveguide in order to narrow the natural divergence of light beam emanated by the light source.

Figure 20:
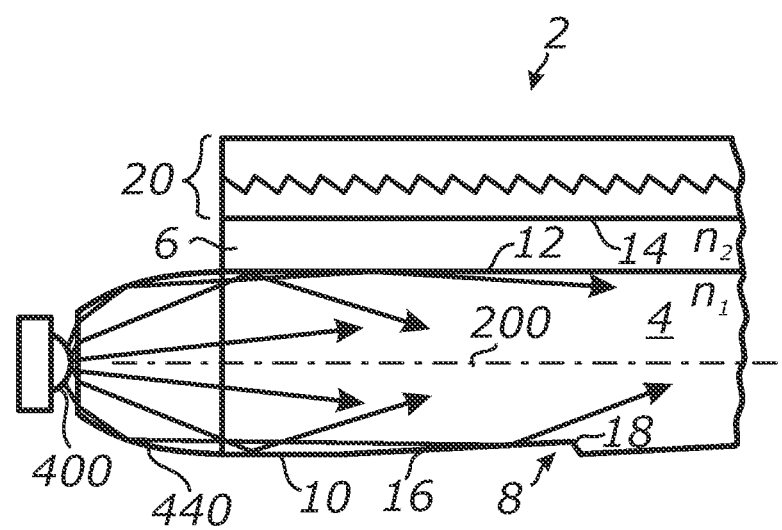
FIG. 20 is a schematic view and raytracing of a waveguide illumination portion, showing a light collimator associated with a light input edge of a waveguide, according to at least one embodiment of the present invention.

FIG. 20 shows a collimating element 440 attached to the light input edge of waveguide 4. Element 440 can be made from transparent material and may have any optical configuration suitable for coupling light from source 400 into waveguide 4 at a limited range of propagation angles permitting for TIR from both surfaces 10 and 12. Element 440 may be attached to the light input edge using an optical adhesive. Alternatively, collimating element 440 may be provided as an integral part of waveguide 4 and formed by tapering the light input edge of waveguide 4 accordingly. Collimating element 440 is preferably configured to have opposing concave walls reflecting light by means of TIR. However, particularly when the divergence of light from source 400 is too high for TIR and/or when source 400 is coupled to the light input edge using a refractive medium such as optical adhesive or encapsulant, the concave walls of element 440 may be mirrored for increasing the acceptance angle of the collimating element.

Considering that waveguide 4 will only effectively conduct light that enters its edge within a certain acceptance cone, let's define an acceptance angle $\theta_{max}$ of waveguide 4 being the half-angle of this acceptance cone. It will be appreciated by those skilled in the art that acceptance angle $\theta_{max}$ can be found from the following expression:

$$\sin\theta_{max} = \frac{\sqrt{n_1^2 - n_2^2}}{n_0},$$

where $n_1$ is the refractive index of the core of waveguide 4, $n_2$ is the refractive index of buffer layer 6 and $n_0$ is the reflective index of the medium light is traveling through before entering waveguide 4. When source 400 is coupled to the light input edge of waveguide 4 through a layer of air ($n_0 \approx 1$), $\sin\theta_{max} = \sqrt{n_1^2 - n_2^2}$. Accordingly, a numerical aperture (NA) of waveguide 4 can be defined as NA=$n_0 \sin\theta_{max}$, or, in the case of source to waveguide coupling through air, NA=$\sin\theta_{max} = \sqrt{n_1^2 - n_2^2}$.

As illustrated in FIG. 20, collimating element 440 may be useful to inject far off-axis rays into waveguide 4 so that they can propagate by means of TIR in the waveguide's core and can also be distributed and emitted through surface 14 as explained in the examples above. Collimating element 440 should be preferably configured to provide at least some initial divergence of light upon entering into waveguide 4. Particularly, when it is desired that system 2 can begin emitting light within a short distance from the light input edge, collimating element 440 may be configured to provide the initial divergence approximating the acceptance cone with the half angle being close to the acceptance angle $\theta_m$, of waveguide 4.

Figure 21:
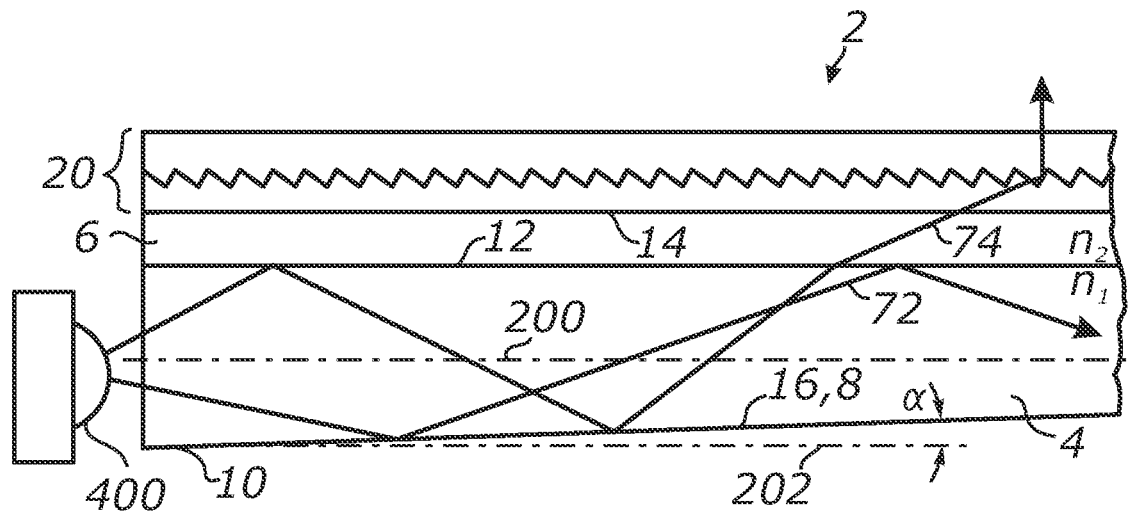
FIG. 21 is a schematic view of a waveguide illumination system including a wedge-shaped waveguide and a light turning film, according to at least one embodiment of the present invention.

FIG. 21 shows an embodiment of waveguide illumination system 2 comprising light source 400, waveguide 4, buffer layer 6 and light extraction layer 20. Waveguide 4 has a wedge shape with the light input edge being wider than the opposing terminal edge and with the thickness of waveguide 4 gradually decreasing along the light propagation path. The taper of waveguide 4 defined by slope angle α is relatively low so that waveguide 4 still has a generally planar configuration. Surface 10 is generally smooth and may have one or more flat portions and at least one inclined surface portion defining an extended surface relief feature 8 and its reflective face 16 facing the light guided in waveguide 4. Buffer layer 6 is provided on opposing side waveguide 4 and is attached to surface 12 with a good optical contact. Layer 6 is further followed by light extraction layer 20.

The refractive index of buffer layer 6 is lower than the refractive index of waveguide 4 which creates a differential in the refractive index drop at surfaces 10 and 12 and enables the preference for light escaping through surface 12 when the light is bent to sufficiently high out-of-plane angles. Light extraction layer 20 is exemplified by a light turning film which turns light by almost 90 degrees so that the light rays emerging from layer 6 at low angles with respect to surface 14 can be directed generally towards a normal to the prevailing plane of system 2. Layer 20 may also comprise a light scattering surface, screen, image print, etc., as discussed above.

Similarly to the above-described principles, light rays propagating in a waveguide mode and having different out-of-plane angles will emerge from system 2 at different locations along the propagation path, depending on the slope of face 16, resulting in light distribution and extraction along the extent of the light emitting region of waveguide 4. It will be appreciated that slope angle α can be made sufficiently small (about one degree or less) which will result in a small angular divergence of light emerging into buffer layer 6. Accordingly, the light turning film of layer 20 can be configured to turn light emerging from buffer layer 6 by up to 90° away from the surface plane while preserving the small divergence. As the light beam turned by the light turning film overcomes TIR and emerges from layer 20, it will have a well defined directionality and due to being confined within a finite angular range. Thus, system 2 depicted in FIG. 21 can be configured to emit light from the entire light emitting region with improved light collimation.

Figure 22:
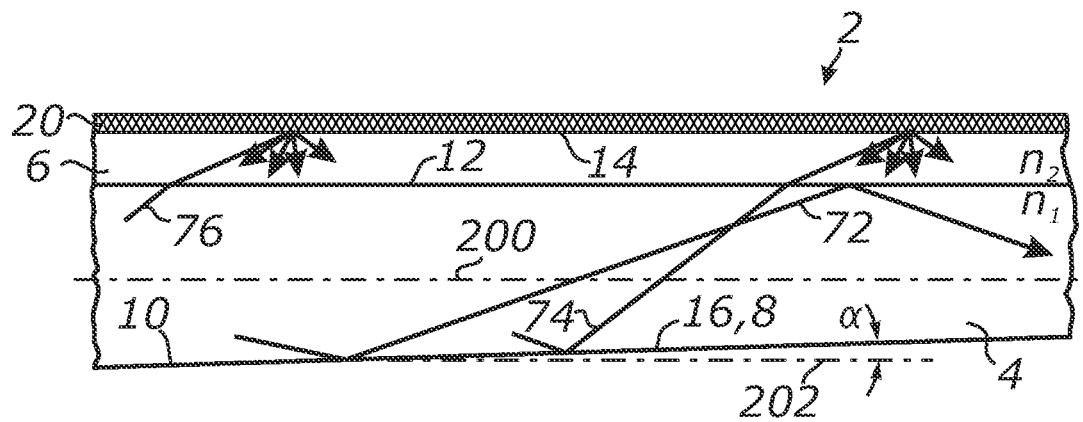
FIG. 22 is a schematic view of a waveguide illumination system including a wedge-shaped waveguide and a light scattering layer, according to at least one embodiment of the present invention.

FIG. 22 illustrates a front-light variation of system 2 employing a wedge-shaped waveguide 4 in which layer 20 comprises a screen that back-scatters light generally towards a normal to the prevailing plane of waveguide 4, so that at least a substantial part of the scattered light can pass through waveguide 4 and exit from system 2 through surface 10. The screen of layer 20 may be formed by a bright, light scattering paint or film for illumination purposes. Alternatively, the screen may comprise an image print viewable through layer 6 and waveguide 4 and deposited onto surface 14 or onto an intermediate substrate using any suitable printing process.

Referring to FIG. 22, light can propagate considerable distances along longitudinal axis 200 in a waveguide mode while undergoing multiple TIR interactions with opposing surfaces 10 and 12. Upon each interaction with a sloped portion of surface 10, light is progressively communicated a broader angular spread with respect to axis 200, as illustrated by the example of ray 72. Upon reaching a sub-TIR angle with respect to surface 12, at least the uttermost out-of-plane rays, as exemplified by rays 76 and 72, will exit from the core of waveguide 4 at different locations along axis 200, depending on the initial propagation angles. Accordingly, light extraction layer 20 extracts the emergent light by means of scattering which causes at least portions of the scattered light to overcome TIR at surface 10 and exit from system 2 towards a normal to the surface.

Figure 23:
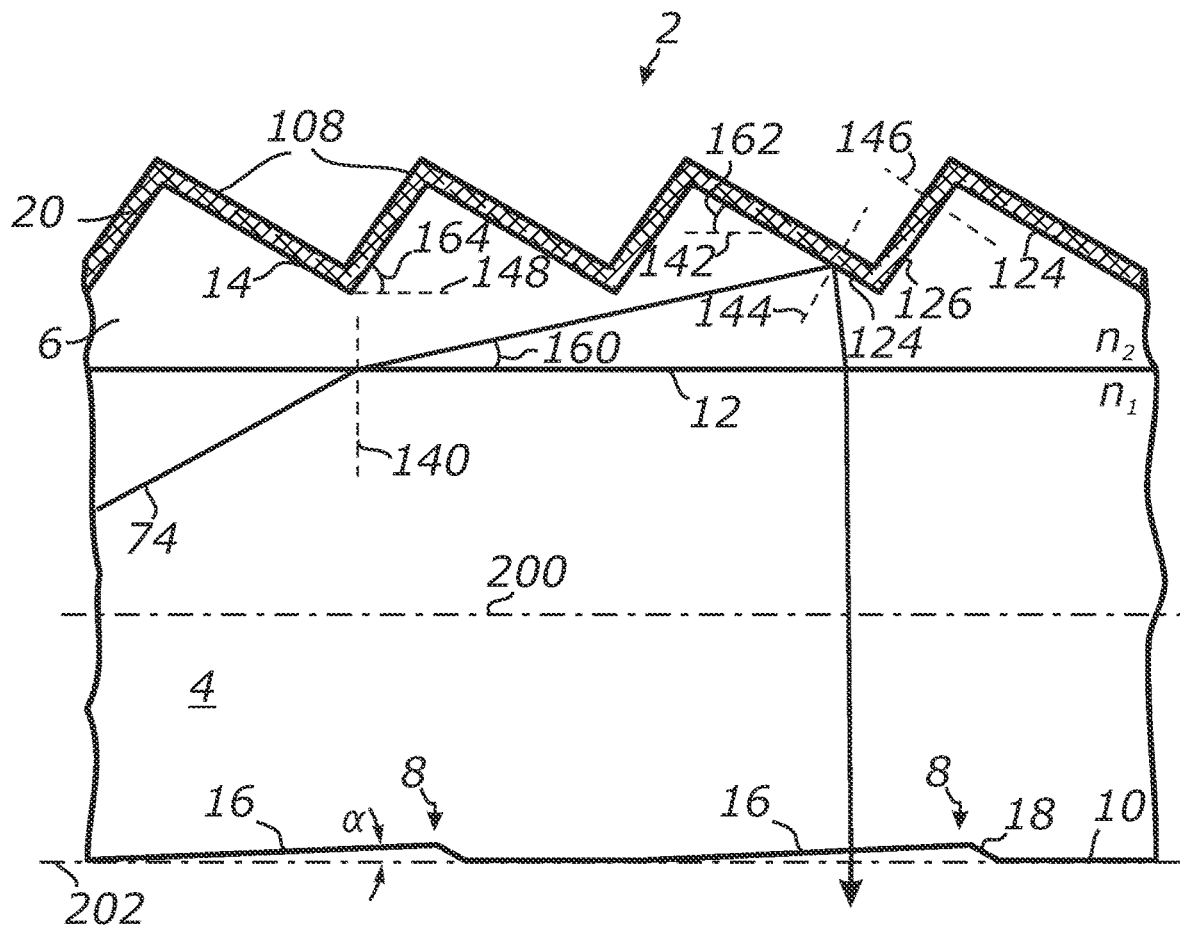
FIG. 23 is a schematic view of a waveguide illumination system, showing a light extraction layer having a mirrored surface, according to at least one embodiment of the present invention.

FIG. 23 illustrates a further variation of system 2 in which layer 6 has corrugated outer surface 14 and layer 20 conforms to this corrugated shape thus also forming a corrugated boundary between the two layers. Additionally, light extracting layer 20 has a specularly reflective surface which can be obtained, for example, by mirroring surface 14 or by depositing a specularly reflective film or foil onto layer 6. The corrugations (features 18) can be made identical to each other and having a constant pitch.

Referring to FIG. 23, facets 124 facing the light source may be advantageously configured to reflect light emerging from waveguide 4 at angles approximately perpendicular to the prevailing plane of system 2, as illustrated by ray 74, thus providing an efficient light turning structure of a reflective type. According to the principles discussed above, waveguide 4 may be configured to emit light into buffer layer 6 within a narrow angular cone. In turn, such reflective light turning structure may be configured to redirect the emitted light towards surface normal while preserving the narrow beam divergence. It will be appreciated that this will result in system 2 emitting a highly collimated beam from surface 10.

It will be understood that system 2 may include any other variations of light extracting layer 20 which may be configured to permanently extract light from system 2 and direct and distribute it according to the specific application. Light extraction layer 20 may also incorporate any other light directing structures which change the propagation path of light emerging from waveguide 4 at low angles with respect its major surface. Various modifications of layer 20 may include lens arrays, prism arrays, mirrors, diffusers, retroreflective elements, scattering elements, color changing elements or layers, etc.

Figure 24:
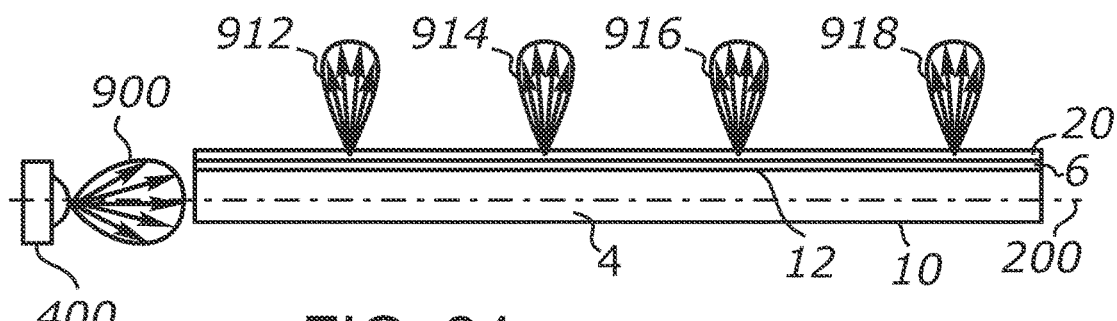
FIG. 24 is a schematic view of a waveguide illumination system, illustrating a light collimation function of the system, according to at least one embodiment of the present invention.

FIG. 24 explains the light collimation function of certain embodiments of system 2 in further detail. In FIG. 24, light source 400 emits light having a relatively broad angular distribution 900. When such light enters the light input edge or end of waveguide 4, it propagates within the waveguide along its longitudinal axis 200 undergoing multiple reflections from surfaces 10 and 12 by means of TIR. The interactions of light with surface 10 include reflections from surface relief features 8 (not shown) which gradually increases the out-of-plane angle of light propagation and eventually results in light escape from waveguide 4 into low-n buffer layer 6.

As explained above, when the characteristic slope angle $\alpha$ of surface relief features is sufficiently low, the angular distribution of light escaping into layer 6 is also very narrow as it generally subtends an angular range from zero to a small angle which depends on slope angle $\alpha$. Accordingly, when light extraction layer 20 turns the emerging light by up to 90 degrees, the angular distribution of light emitted from the broad surface of system 2 will also be relatively narrow. It will be appreciated that the light beam emerging from layer 20 may experience some broadening of the angular distribution compared to its propagation in the bulk materials of system 2 generally having refractive indices considerably greater than a unity. Nevertheless, it will also be appreciated that the angular distribution of light emitted by system 2 can be made substantially narrower than that of source 400.

This is illustrated in FIG. 24 by reference to angular distributions 912, 914, 916, and 918 exemplifying collimated light emerging from the broad-area surface of system 2 at different distances from source 400. Each the angular distributions 912, 914, 916, and 918 may be made narrower than the broad distribution 900 of light source 400 at least in a plane in which the reflection by surface relief features 8 occurs within waveguide 4. Therefore, system 2 may be configured to not only distribute light from a compact source over a large area and emit such light from said large area, thus resulting in a reduced glare, but also provide an improved collimation and/or directionality of the emitted light compared to the light beam emitted by the source.

It will be appreciated that the light-collimating embodiments of system 2 illustrated above do not generally require applying any opaque or mirror layer onto surface 10 in order to prevent light escaping through that surface. Due to the combined function of surface relief features 8, which provide incremental out-of-plane deflection of light rays propagating along axis 200, buffer layer 6, which preliminary extracts only the uttermost deflected rays from waveguide 4, and light extracting layer 20, which finally extracts the pre-extracted light from system 2, virtually no light may be allowed to exit through surface 10 even though said surface can have a very high optical transmissivity.

This is in a sharp contrast to the conventional illumination systems employing a waveguide, such as edge-lit backlights or lighting luminaires, for example. In such conventional systems, a substantial portion of light escapes through an unwanted side of the waveguide (usually at least 25% and up to 50%) which requires using a special diffuse or specular reflector to be attached to that surface. The reflector typically includes a sheet of highly reflective material which redirects (with some reflection loss) the escaping light towards the other side of the waveguide. It will be appreciated that the use of an opaque reflector layer introduces additional losses (compared to TIR) and precludes the possibilities of transmitting light in a transversal direction or using the system as a front light.

On the contrary, according to at least some embodiments of the present invention, waveguide illumination system 2 can maintain high transversal transmissivity and allow for a generally unimpeded light passage along in a perpendicular direction with respect to its major surfaces. Therefore, such system 2 may be used for transmitting light from a different light source in a transversal direction.

By way of example and not limitation, system 2 can be implemented as a light-collimating edge-lit luminaire which may also be positioned horizontally in the light path of a daylighting system, such as a skylight located above the luminaire. In such configuration, system 2 can be configured to provide illumination by distributing and emitting light emanated by one or more LEDs attached to the edge of waveguide 4 and, additionally, to transmit light from the skylight perpendicularly through its body thus forming a combined solar/electric lighting luminaire.

Figure 25:
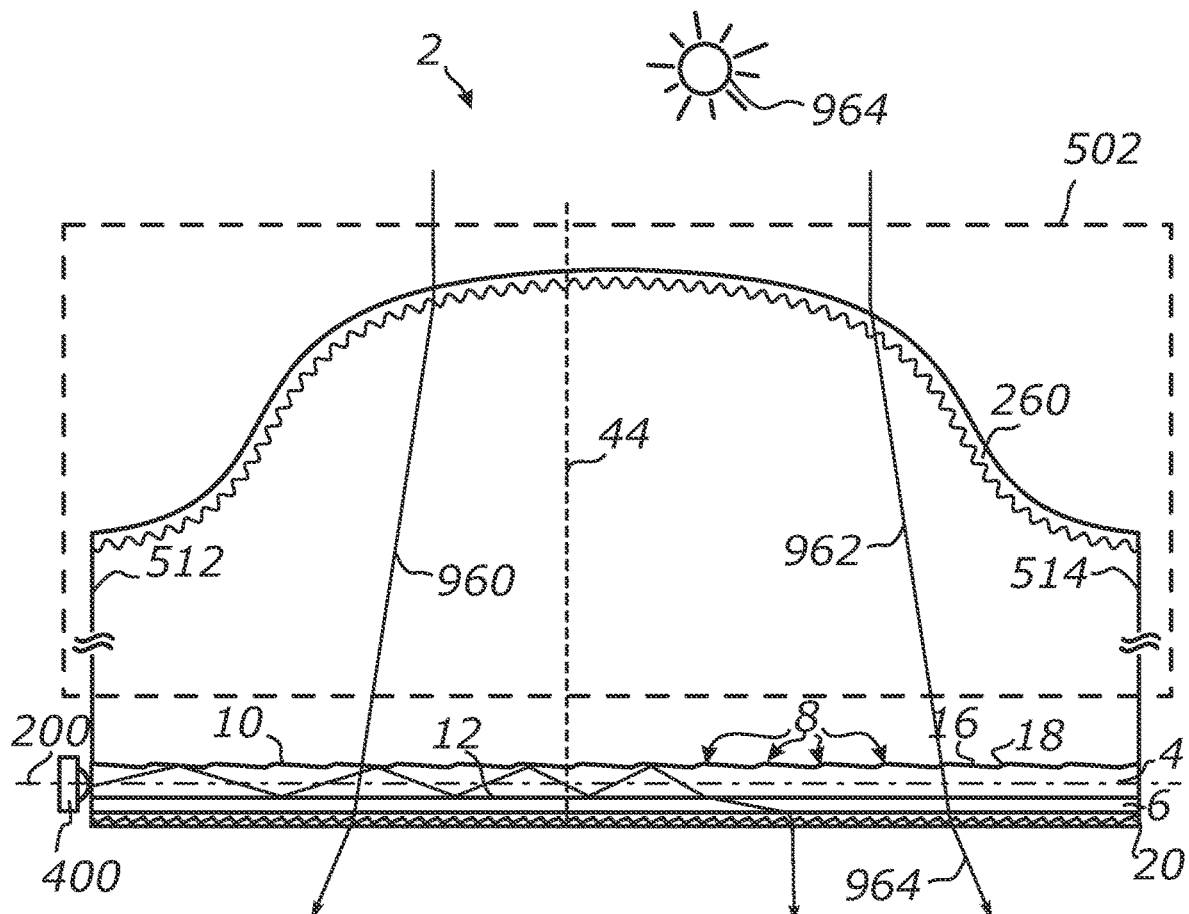
FIG. 25 is a schematic view of a waveguide illumination system used in conjunction with a daylighting device, according to at least one embodiment of the present invention.

FIG. 25 illustrates an exemplary embodiment of system 2 which is used at the light exit end of a skylight 502. Skylight 502 can be ordinarily designed for rooftop installation and illumination of the building interior with the natural sunlight through an opening in the roof or ceiling underneath the skylight's light-collecting aperture.

Referring to FIG. 25, skylight 502 includes a dome-shaped diffuser sheet 260, and optional reflective side walls 512 and 514. Diffuser sheet 260 can be made from an optically clear plastic material and may have at least one microstructured surface to improve light diffusion. Walls 512 and 514 are preferably covered with a sheet or film of secularly reflective material to aid in light channeling from sheet 260 to the light-emitting opening below. The light emitting opening of skylight 502 may have approximately the same aperture as the light-receiving aperture of sheet 260. Alternatively, skylight 502 may be made in a tapered version, in which case the above apertures may have different transversal dimensions with respect to each other.

Referring further to FIG. 25, waveguide illumination system 2 is implemented in the form of a, optically transmissive planar panel and includes waveguide layer 4, low-n buffer layer 6 and light extracting layer 20 formed by a light turning film. Light source 400 including a strip of high-brightness LEDs is positioned adjacent to the light input edge of waveguide 4. At least a substantial portion of surface 10 is provided with sufficiently shallow surface relief features 8 each including low-slope face 16 and adjacent face 18. The orientation of surface relief features 8 is such that each face 16 faces source 400 and each face 18 is turned away from source 400. System 2 having the above layered structure and the form factor of a relatively thin panel is positioned below skylight 502 in the respective light-emitting opening of the skylight so that the prevailing plane of waveguide 4 extends perpendicularly to a vertical axis 44.

In electric lighting operation, waveguide 4 receives light from the linear array of LEDs at its light input edge and guides said light by means of TIR. Accordingly, light injected through the light input edge propagates in a waveguide mode along axis 200 towards the opposing terminal end of waveguide 4. According to the principles described above, surface relief features extract light into buffer layer 6 along the propagation path. In turn, the light turning film of light extracting layer 20 finally extracts light downwards. Optionally, system 2 may be configured to provide a prescribed degree of collimation and emit directional light along vertical axis 44. Accordingly, since light escape through surface 10 is minimized or eliminated, substantially all of the light emitted by source 400 and distributed along waveguide 4 is emitted into the building interior. With the exception of light which is absorbed or scattered during propagation in waveguide 4 or layers 6 and 20, practically no additional light is lost in the system. Importantly, no light is directed back towards sheet 260 which would otherwise constitute a major energy loss in the case when waveguide 4 would employ conventional microstructures or other types of prior-art light extraction features.

In daylighting operation, system 2 receives a diffuse beam of sunlight emerging from sheet 260 and transmits it further downwards through its body. Since all respective layers and surfaces of system 2 are optically transmissive, the sunlight transversally passes through the panel without undergoing substantial reflection, backscattering or attenuation. When additional diffusing of daylight is necessary or when masking the portions of skylight disposed above the light emitting opening is desired, system 2 may further comprise one or more light diffusing layers operating in the transmissive mode. In view of the above-described operation within a skylight, it will be appreciated that system 2 can emit artificial light from its broad-area surface and also doubles as a skylight luminaire by allowing the daylight into the building interior and optionally providing enhanced light diffusion.

It will be appreciated that a unique operation of system 2 is obtained, at least in part, by employing a two-stage light extraction mechanism. The first stage includes incremental light deflection by surface relief features 8 and the second stage includes beam turning by light extracting layer 20. Buffer layer 6 separates these stages from each other and provides the functional differential in the refractive index drop at the opposing sides of waveguide 4. By employing these features, in combination, system 2 suppresses light extraction through the unwanted side of waveguide 4 and can be configured to emit light primarily through the designated side or surface. When desired, as illustrated above, it may also be configured to almost completely shut-off light emission from the unwanted side despite being optically transmissive and allowing light to pass transversely through its body.

Figure 26:
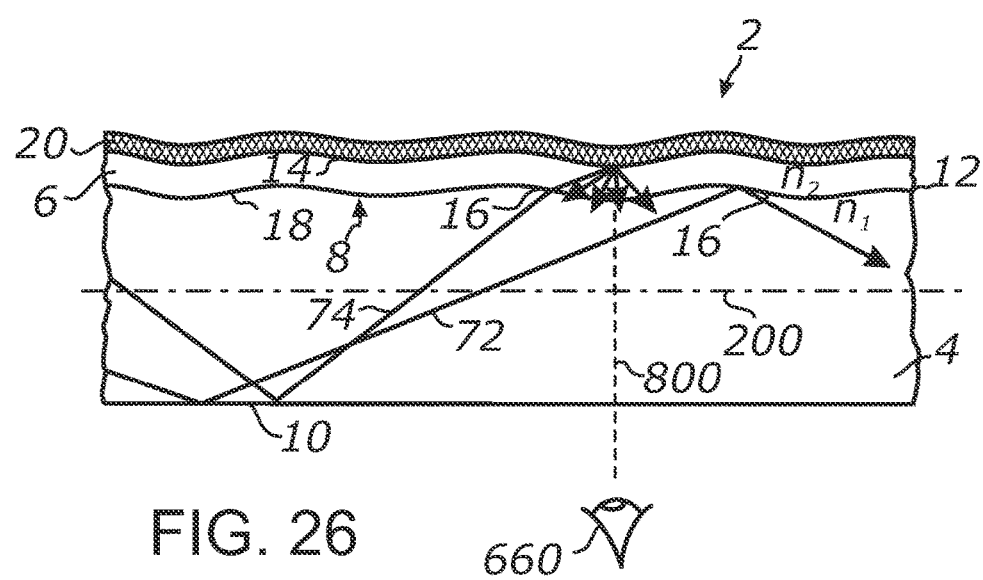
FIG. 26 is a schematic view of a waveguide illumination system portion, showing a buffer layer attached to a corrugated surface of a waveguide, according to at least one embodiment of the present invention.

FIG. 26 shows an alternative arrangement of the layers around waveguide 4, where surface 10 is configured to be substantially flat but surface 12, instead, has surface relief features formed by smooth and shallow corrugations or undulations. Accordingly, buffer layer 6 and light extraction layer 20 adjacent to surface 12 may conform to the shallow relief features of surface 12 or may, alternatively, have flat external surfaces.

Accordingly, the refractive index of buffer layer 6 being greater than that of the outside medium and lower than that of waveguide 4 provides the functional difference between TIR angles $\phi_{TIR1}$ and $\phi_{TIR2}$ at surfaces 10 and 12, respectively. Therefore, the incremental angular bias of light propagation caused by the undulations of surface relief features 8 along the propagation path in the waveguide 4 will result in light escaping primarily through surface 12 while surface 10 will continue to reflect substantially all light by means of TIR.

By way of example and not limitation, layer 20 of the embodiment of FIG. 26 may be formed by a scattering layer or a print formed directly on surface 14 of layer 6 or formed on a separate substrate which can be laminated onto surface 14. When laminating layer 20 onto surface 14, a soft roller may be used for pressing layer 20 against surface 14 in order to fill the shallow depressions in surface 14 and avoid forming of air gaps.

The amplitude of the undulations forming surface relief features 8 may ordinarily be very small so that the relief of layer 20 will be virtually unnoticeable when viewed from a distance. Additionally, the shallow surface relief features 8 will deflect light propagating between the visible surface of layer 20 and viewer's eye 660 by only a small amount causing no perceptible visual distortions.

Ray 72 illustrates a light path in waveguide 4 at relatively low out-of-plane propagation angles allowing for TIR at both surfaces 10 and 12. Each TIR of ray 72 from face 16 of the respective feature 8 will generally result in a greater out-of-plane angle thus introducing additional angular bias and widening the angular distribution of light guided in waveguide 4. Accordingly, ray 72 may eventually obtain an incidence angle less than the TIR angle with respect to surface 12 when striking one of the successive faces 16 and exit into layer 6 where it will be scattered by layer 20 towards the viewer. Ray 74 illustrates a ray path of the light being extracted from system 2 as it already obtained a sufficiently high angle with respect to the longitudinal axis of waveguide 4. As ray 74 exits from waveguide 4 into buffer layer 6, it strikes the light scattering surface of layer 20 and can be directed towards the viewer thus providing the illumination function of an edge-lit front light.

Figure 27A:
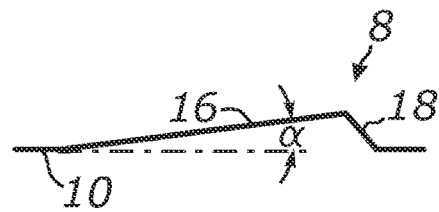
FIG. 27A through FIG. 27I show various configurations of surface relief features, according to at least some embodiments of the present invention.
Figure 27B:
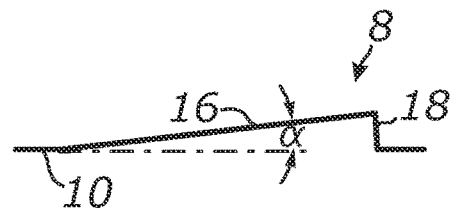

FIG. 27A through FIG. 27I illustrate various shapes of surface relief features 8. In FIG. 27A, feature 8 is shown to include face 16 inclined at a low slope angle α to the prevailing plane of surface 10 and opposing face 18 inclined at a substantially greater slope angle to said plane. In FIG. 27B, face 18 is shown being perpendicular to the prevailing plane of surface 10. It should be understood that the illustrative case of FIG. 27B may also include variations of face 18 having angles which are close to 90° but not exactly normal. Particularly, when the respective feature 8 is formed in surface 10 by replication processes like injection molding, compression molding, embossing, or extrusion processes, face 18 may have a suitable draft angle of 3-4° with respect to a surface normal. Such draft angle may be necessary, for example, to facilitate mold release.

Figure 27C:
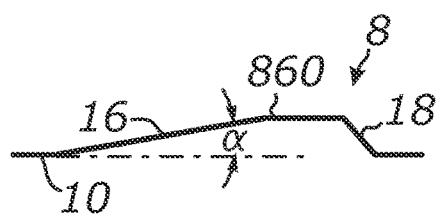
Figure 27D:
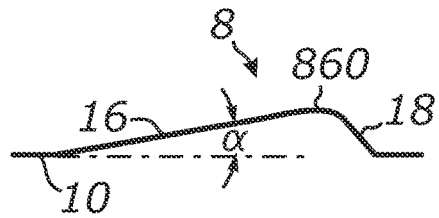

In FIG. 27C, surface relief feature 8 is shown to additionally comprise a flat top portion 860 which extends parallel to the plane of surface 10 and may also be configured to reflect by means of TIR. In FIG. 27D the top portion 860 has a curved shape in a cross-section.

Figure 27E:
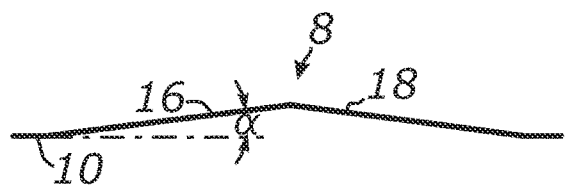

FIG. 27E shows feature 8 in which faces 16 and 18 are disposed symmetrically and have about the same slope angle with respect to the plane of surface 10. Such a symmetric configuration of features 8 may be selected, for example, for the case where waveguide 4 is illuminated from both opposing edges or terminal ends.

Figure 27F:
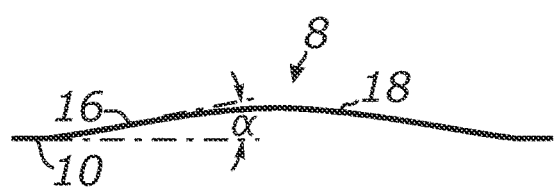
Figure 27G:
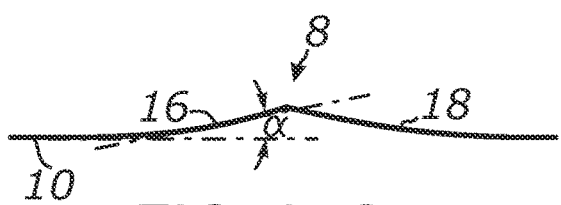

In FIG. 27F, surface relief feature 8 is formed by a smooth undulation or shallow recess in surface 10, where faces 16 and 18 are formed by the opposing side surfaces of the undulation. FIG. 27G shows surface relief feature 8 formed by a funnel-shaped shallow cavity in surface 10. It should be understood that a relatively small portion of face 16 facing light source 400 (not shown in FIG. 27G) may have an arbitrary high slope angle. Such portion may include, for example, the small area immediately adjacent to the vertex of the funnel. However, it is generally preferred that at least a major portion of face 16 still has relatively low slope angle α with respect to the prevailing plane of surface 10.

It will be appreciated that there is a great variety of possible shapes that can be used for surface relief features 8. Accordingly, any suitable profile or any suitable perturbation or irregularity of otherwise smooth and flat surface 10 may be used to form individual surface relief features 8, including any ordered or random surface relief structures, bumps, recesses, grooves, corrugations, surface waviness, etc., provided that they can introduce the required additional angular bias for light propagating in waveguide 4 along its path and cause controlled light leakage into layer 6.

Figure 27I:
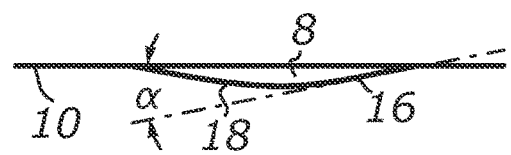
Figure 27H:
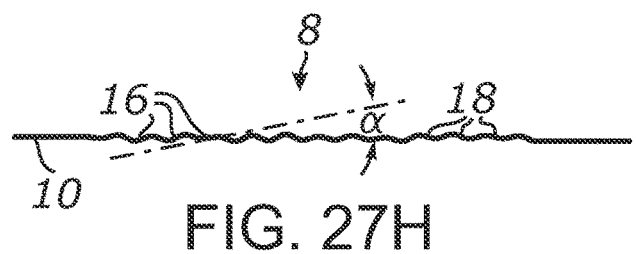

FIG. 27H shows surface relief feature 8 formed by a textured micro-relief portion of surface 10. The textured portion may be surrounded by non-textured, flat portions of surface 10 thus creating a distinct, well defined microstructured area of the respective feature 8. The texture may be formed in a random or ordered manner, provided that each elementary micro-relief feature has a low aspect ratio (low height to width) so that the respective surface slope angles do not exceed a certain maximum angle which would cause light leakage from waveguide 4 through surface relief feature 8. According to one embodiment, considering that the walls of micro-relief features of the surface texture may have a variable slope from top to bottom, the walls of each micro-relief feature should have a sufficiently low prevailing slope to provide the above discussed operation. Additionally, each micro-relief feature should have a generally smooth surface on the scale which is comparable to the wavelength of light of source 400. This requirement is aimed at minimizing or preventing light scattering and/or reflecting at higher than the prescribed angles with respect to the longitudinal axis of waveguide 4 or the plane of surface 10.

It should be understood that surface relief feature 8 are not limited to recesses or undulation-type surface microstructure but may also be formed by light-deflecting surface protrusions or indentations of the appropriate shape and even by varying the thickness of waveguide 4 along the light propagation path, provided the prevailing slope of the respective surface structures is less than the prescribed maximum angle.

By way of example and not limitation, the surface of the each textured area of FIG. 27H may include an array of microlenses. According to the principles discussed above, each of the microlens should have a sufficiently low profile ensuring that the slope of the microlens walls with respect to surface 10 does not exceed the maximum allowed angular value so that system 2 may operate in the manner described in the above embodiments.

In FIG. 27I, an alternative configuration of surface relief feature 8 is illustrated which includes a low-aspect-ratio, smooth-walled protrusion in surface 10. Referring to a projection of surface relief feature 8 onto a plane parallel to surface 10, such protrusion may have an elongated shape, a round shape or any other suitable shape or outline. In a non-limiting example, a two-dimensional protrusion may be formed by depositing a micro droplet of UV-curable polymer onto surface 10. The polymer should preferably have a low surface tension allowing for the droplet to obtain the desired low-profile shape before curing. Alternatively, surface 10 of waveguide 4 may be specially treated or coated to increase its surface tension and obtain the desired surface wettability.

Referring to FIG. 27I and to the example of forming surface relief feature by a UV-curable droplet, slope angle α may be associated with the angle at which the liquid contacts the surface. This contact angle is commonly known as the wetting (or dihedral) angle that a liquid droplet makes to a solid surface. Accordingly, in the illustrated example, the wetting angle of the droplet with respect to surface 10 should be kept sufficiently low in order to form a low-profile surface relief feature 8 which could deflect light by a sufficiently small angle with respect to its original propagation direction.

It is noted that surface relief features 8 may be arranged in surface 10 in a variety of ways. For example, surface relief features 8 may be formed in a parallel array of strips or bands extending perpendicular to longitudinal axis 200 of waveguide 4. The respective strips or bands can be made substantially straight. Alternatively, they may have a constant curvature or even some waviness.

Figure 28:
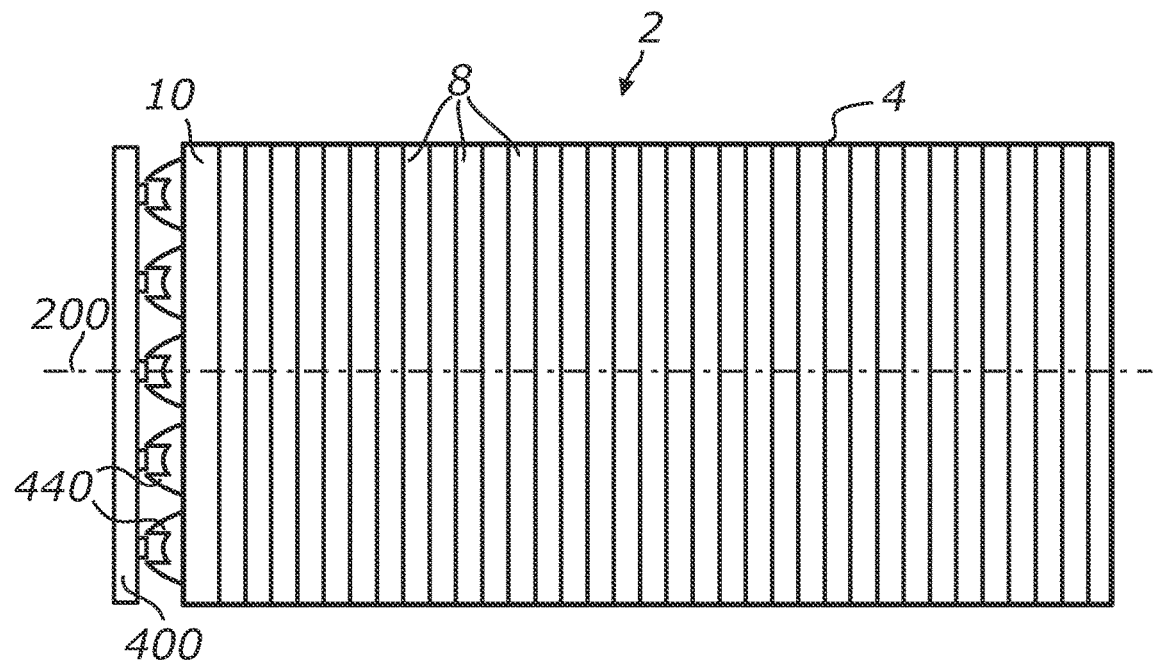
FIG. 28 is a schematic elevation view of a waveguide illumination system, showing a linear arrangement of parallel surface relief features formed in a waveguide surface, according to at least one embodiment of the present invention.

FIG. 28 shows an embodiment of system 2 in which waveguide 4 has a shape of a rectangular plate or slab and in which surface relief features 8 are arranged in a parallel linear array which longitudinal axis is perpendicular to axis 200. FIG. 28 also shows an exemplary configuration of light source 400 which includes a strip of LEDs where each LED is provided with individual collimating element 440. Each collimating element 440 intercepts light emitted by the respective LED and collimates said light towards axis 200. Collimating element 440 may be configured to provide light collimation in at least one plane or dimension. By way of example and not limitation, collimating element 440 of FIG. 28 may have a linear geometry and may be characterized by a longitudinal axis and an optical plane both of which extending perpendicular to the plane of the drawing. It will be appreciated that such linear collimating element 440 will provide light collimation in a plane which is parallel to the respective plate or slab. In a further non-limiting example, collimating element 440 may have a round aperture and may be configured to collimate light in two orthogonal dimensions such as those parallel and perpendicular to the prevailing plane of the rectangular plate or slab.

Figure 29:
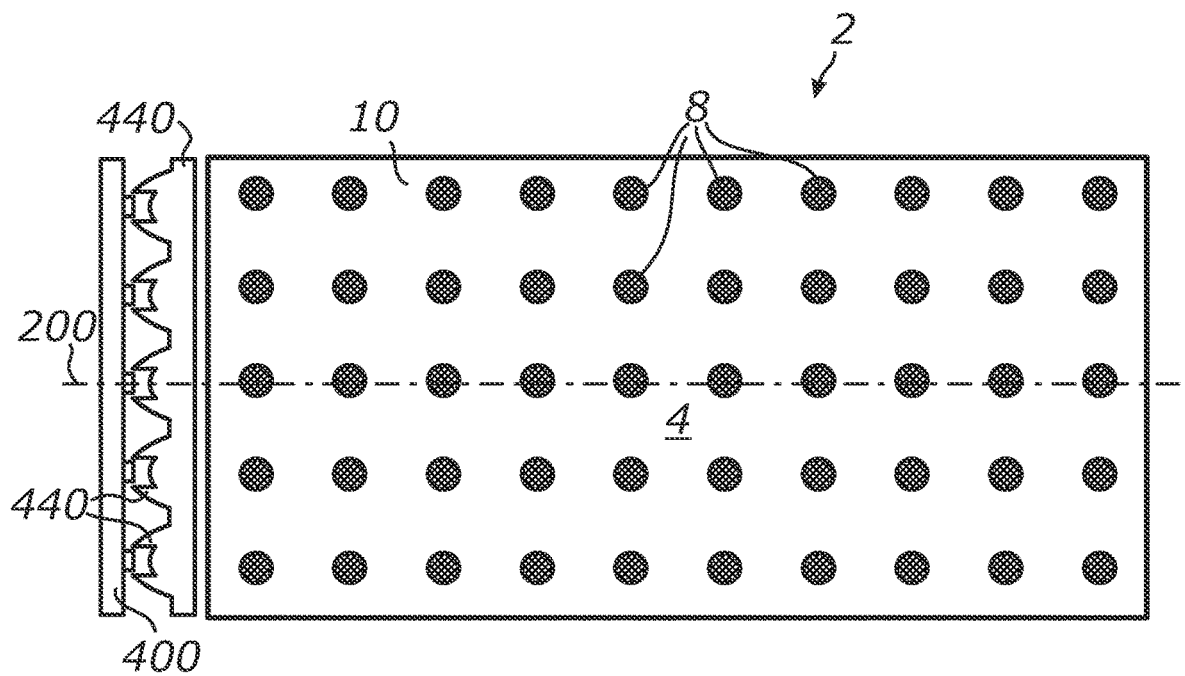
FIG. 29 is a schematic elevation view of a waveguide illumination system, showing a two dimensional array of surface relief features, according to at least one embodiment of the present invention.

FIG. 29 shows an alternative exemplary arrangement of surface relief features 8 across surface 10 and also shows an alternative configuration of a plurality of collimating elements 440. Referring to FIG. 29, each surface relief feature 8 is formed by a textured area as explained in relation to FIG. 27H and is separated from the adjacent surface relief features 8 by a spacing area in an ordered array pattern. The size of each surface relief feature 8 may be varied. Particularly, the size may increase with the distance from light source 400 to compensate the light depletion in waveguide 4 along axis 200. Alternatively, the density of surface relief features 8 in the array may increase with the distance from source 400 for the same reason. Referring further to FIG. 29, an array of light collimating elements 440 is arranged on a single transparent substrate and form a solid piece structure which can be placed between the LED strip and waveguide 4. Accordingly, light collimating elements 440 of FIG. 29 may also be configured to emit light along axis 200 and provide light collimation in one or two dimensions.

Figure 30:
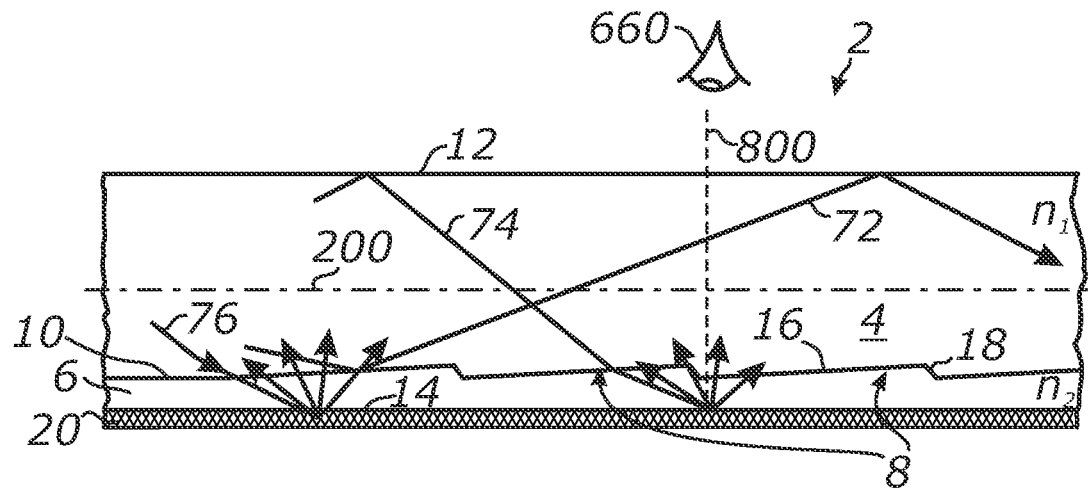
FIG. 30 is a schematic view of a waveguide illumination system portion, showing a buffer layer and a back-scattering light extraction layer attached to a waveguide surface comprising surface relief features, according to at least one embodiment of the present invention.

FIG. 30 depicts an embodiment of illumination system 2 in which buffer layer 6 is provided on the microstructured surface 10 of waveguide 4. Light extracting layer 20 provided on the external surface of the buffer layer 6, accordingly so that surface 12 is exposed to the outside medium. Layer 6 should provide a good optical contact between waveguide 4 and light extracting layer 20. It may be formed as a conformal thin coating (conforming to the shape of surface relief features 8) of a constant thickness. Alternatively, as shown in FIG. 30, layer 6 can be made of a sufficient thickness to fill the depressions in surface 10 and provide a smooth external surface. The light extracting layer 20 of FIG. 30 can be configured to provide strong backscattering of light emerging from waveguide 4 with a highly diffuse reflectivity in which case system 2 can be advantageously used, for example, for general lighting applications. Layer 20 may also be associated with an image print in which configuration the system 2 can be used, for example, as a front light, decorative light or as an illumination cover for signage or painting/printing arts.

In operation, referring to FIG. 30, ray 72 propagating in waveguide 4 strikes surface 10 where it is reflected from one of surface relief features 8 by means of TIR due to the relatively low propagation angle with respect to axis 200. The slope of face 16 with respect to the prevailing plane of surface 10 is sufficiently low so as to result in the incremental increase in the out-of-plane angle of ray 74 without causing it to exit through surface 10. As a result of TIR from face 16, ray 72 obtains slightly lower incidence angle with respect to normal 800 and further propagates towards the opposing surface 12 of waveguide 4.

Since the drop in refractive index outwardly from waveguide 4 at its surface 12 is greater than that at surface 10, the incidence angle of ray 72 into surface 12 is not sufficient to overcome TIR at that surface. Therefore, ray 72 continues to propagate in the waveguide mode through the core of waveguide 4.

In contrast, rays 74 and 76, deflected by the preceding surface relief features 8 (not shown), strike surface 10 at smaller angles with respect to normal 800, said angles being less than the critical angle of TIR at the interface between waveguide 4 and low-n layer 6. As a result, rays 74 and 76 exit from the core of waveguide 4 and strike layer 20 which scatters the extracted rays back towards the viewer's eye 660.

Figure 31:
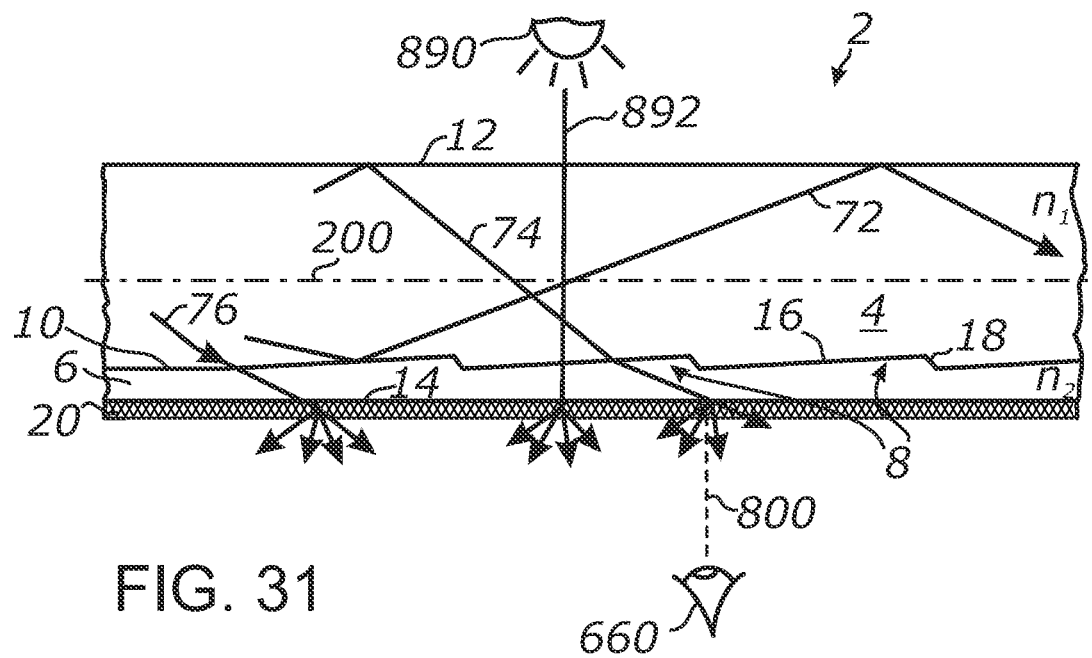
FIG. 31 is a schematic view of a waveguide illumination system portion, showing a light diffusing layer, according to at least one embodiment of the present invention.

FIG. 31 depicts an embodiment similar to that of FIG. 30 except that light extracting layer 20 is configured to transmit and diffuse light emerging from waveguide 4 towards the opposing side. In such configuration, system 2 can be used, for example, for backlights, transmissive sign displays or area illumination.

Referring to FIG. 30 and FIG. 31, exemplary rays 74 and 76 illustrate light emerging from waveguide 4 and illuminating layer 20. As it is further illustrated, the emerging light can be further directed by layer 20 to provide either front light or back light operation depending on the configuration of the light scattering/diffusing layer. Furthermore, the surface of layer 20 can be illuminated from one or more additional directions and by one or more additional light sources such as, LEDs, lighting luminaires or sunlight. By way of example and not limitation, when layer 20 comprised a transmissive light diffuser, it can be illuminated from the appropriate edge of waveguide 4 by a strip of LEDs and by a beam of sunlight incident onto layer 20 perpendicular to its surface, in which case system 2 of FIG. 31 may have operation similar to FIG. 25

Referring to FIG. 31, a distant light source 890 is illustrated which illuminates system 2 perpendicularly to its plane. Ray 892 passes through the transparent layers of waveguide 4 and buffer layer 6 after which it strikes layer 20. In turn, layer 20 scatters ray 892 similarly to rays 74 and 76, all of which are extracted from the waveguide toward a viewer 600. When light source 890 is exemplified by sunlight, such as that delivered from a skylight or a similar device, system 2 can be used as a luminaire for hybrid lighting and can provide combination of natural and artificial illumination. In this case, light from source 400 can be advantageously made dimmable in response to the change in the sunlight intensity so that constant lighting in the room can be maintained. The corresponding layers of system 2 may be configured to provide illumination pattern which is generally symmetrical with respect to no normal 800.

Figure 32:
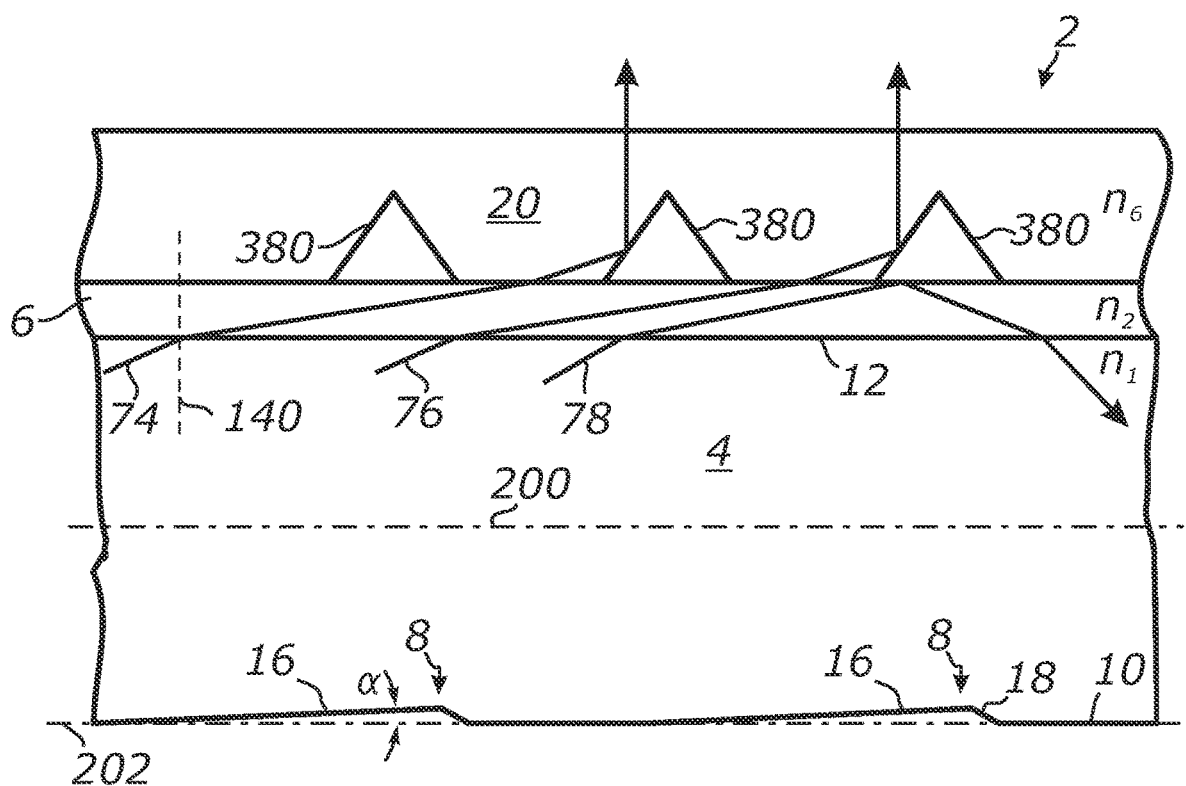
FIG. 32 is a schematic view of a waveguide illumination system portion, showing light redirecting prismatic grooves within a light diffusing layer, according to at least one embodiment of the present invention.

FIG. 32 depicts an embodiment of system 2 in which light extracting layer 20 is made from an optically transmissive material and includes V-shaped prismatic grooves 380 which slope is selected to redirect light emerging from waveguide 4 into a perpendicular direction with respect to the prevailing propagation path of light in the waveguide. It is preferred that a refractive index $n_6$ of layer 20 is at least equal or greater than that of buffer layer 6 to prevent TIR at the boundary between the two layers.

Accordingly, rays 74 and 76 emerging first into buffer layer 6 enter layer 20 and strike respective sloped faces of grooves 380 where said rays are reflected by beans of TIR towards along a normal to the prevailing plane of waveguide 4. Ray 78 strikes an interface with the air pocket formed by groove 380 and is reflected by TIR back into waveguide 4 and towards surface 10. However, since surface 10 represents a boundary with the outside medium (air) which has substantially lower index than waveguide 4, ray 78 will eventually reflect from surface 10 and can thus have a further chance of being fully extracted from system 2 by other grooves 380 along the propagation path.

It will be appreciated that the arrangement of FIG. 32 can be configured to efficiently collimate light at least in the plane of the drawing that is a plane which is parallel to longitudinal axis 200 of waveguide 4 and which is also perpendicular to the prevailing plane of waveguide 4. Accordingly, when waveguide 4 of system 2 is illuminated by a non-collimated or weakly collimated beam of light at its light input edge or end, the illustrated embodiment of system 2 can emanate highly collimated light at least in the above-mentioned plane. It will also be appreciated that the degree of such collimation can be adjusted in a broad range, for example, by adjusting the slopes of faces 16 of features 8 and/or the slopes or configuration of grooves 380. Moreover, additional angular distribution effects for the emitted light can be achieved by varying the respective slopes of faces 16 and/or grooves 380 along the longitudinal axis 200 of waveguide 4.

I will be further appreciated that system 2 may include various collimated elements attached to the input edge or end of waveguide 4 which can provide additional means for controlling the angular spread or distribution of light emitted from the respective broad surface of system 2. Particularly, when system 2 employs a planar configuration of waveguide 4 and discrete light sources such as LEDs, collimating elements 440 such as those illustrated in FIG. 28 and FIG. 29 may be used to additionally collimate the incident beam in a plane parallel to axis 200 and also parallel to the prevailing plane of waveguide 4. In this case, system 2 can emit light which is collimated in two orthogonal planes or dimensions rather than just in a single plane or dimension. Additionally, it is noted that the degree of collimation and angular distribution of light emitted by system 2 may be independently controlled in each of the orthogonal planes or dimensions thus providing a virtually unlimited number of combinations for the emitted beam parameters. In a non-limiting example, when used as an area illumination device such as ceiling-mounted panel luminaire, system 2 may be configured to illuminate a well defined area below the luminaire while emitting much fewer or no light towards non-functional directions.

According to one embodiment, slope angle α of each face 16 may be limited to about three angular degrees in order to maximize the collimation power of system 2 and/or minimize the light leakage through surface relief features 8. More particularly, according to certain embodiments, slope angle α of each face 16 may be less than two and a half degrees, less than two degrees, less than one and a half degrees, and less than one degree. According to one embodiment, the minimum slope angle α of each face 16 may be about one half of a degree.

The slope of the reflecting walls of grooves 380 may be selected to redirect light emerging from waveguide 4 at any suitable angle with respect to a normal to the prevailing plane or longitudinal axis of system 2. Particularly, grooves 380 of light extraction layer 20 may be configured to redirect the emergent light so as to result in system 2 generally emitting light at an off-normal angle from its major broad-area surface. Such an off-normal angle may take particular values of, for example, thirty degrees, forty five degrees or sixty degrees. Considering that system 2 may be configured to emit a major portion of collimated light in a limited range of angles with respect to the surface normal, such range may be between zero and thirty degrees, between fifteen degrees and forty five degrees, between thirty degrees and sixty degrees, for example. Such off-normal illumination may be useful for a number of applications of system 2. By way of example and not limitation, system 2 emitting off-normal collimated beam may be used to illuminate a portion of a wall from a planar lighting fixture mounted flush with a ceiling, in an application like accent illumination of wall-mounted fine art drawings and the like.

Figure 33:
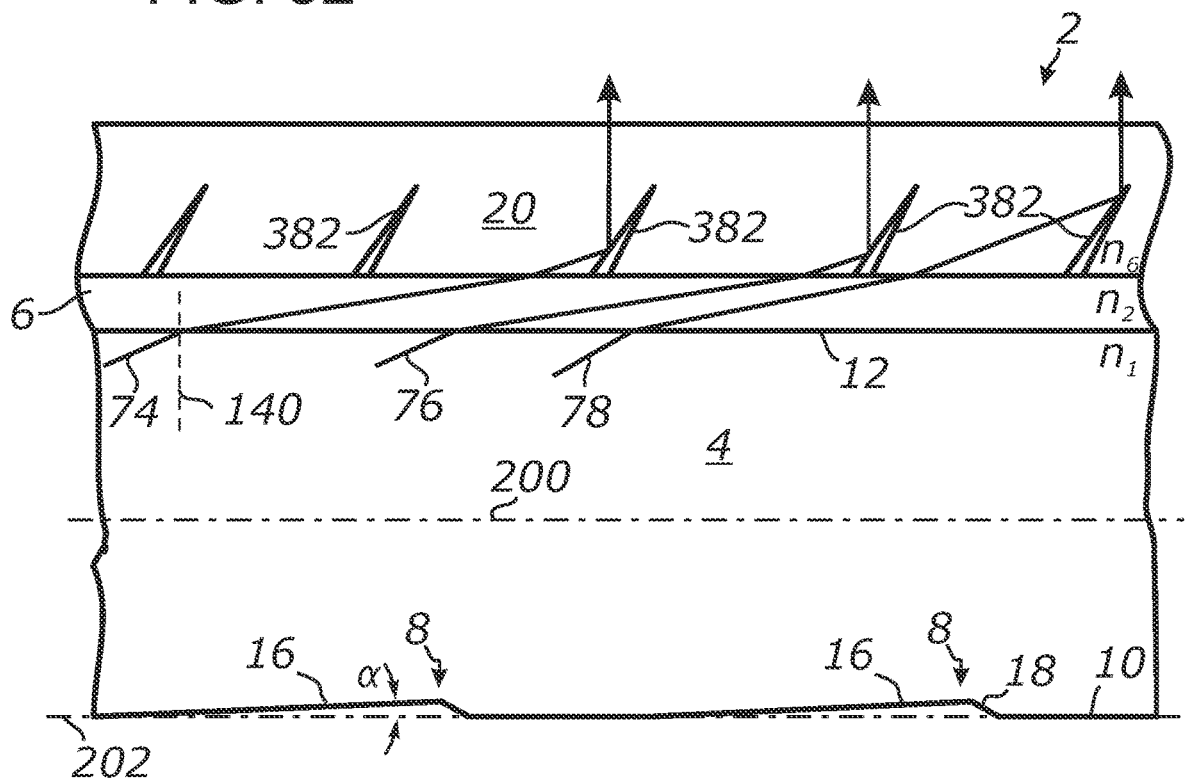
FIG. 33 is a schematic view of a waveguide illumination system portion, showing light redirecting slits within a light diffusing layer, according to at least one embodiment of the present invention.

It should be understood that grooves 380 may be substituted by any other features capable of redirecting light emerging from waveguide 4 toward a prescribed direction. FIG. 33 shows another non-limiting example of light redirecting features associated with layer 20 and exemplified by sharp-angle slits 382 in the surface of layer 20. Each slit 382 has a relatively narrow base and extends deep into the body of layer 20 at an angle with respect to surface normal. Such configuration of light redirecting features may be more advantageous from the point of view of enhancing the light extraction efficiency. As it can be seen from FIG. 33, ray 78 is extracted from system 2 in the first pass as opposing to the configuration illustrated in FIG. 32. The deep and narrow slits 382 may be made by any suitable means, including but not limited to laser ablation, slitting with a sharp blade, material cracking, etc. The process of forming of such slits should preferably allow for forming optically smooth walls which can efficiently reflect light by means of TIR. It is noted that, while straight profiles of the slit walls are illustrated in FIG. 33, such walls may also have any curvilinear or stepped profile as well.

In a further non-limiting example, slits 382 may be replaced by narrow undercuts made in a surface of layer 20. Each undercut may have parallel or nearly-parallel walls. and may be formed, for instance, by laser ablation, a sharp blade or by any other means of material removal or cutting. Similarly, to the above example of slits 382, at least the light-redirecting wall of each undercut should preferably have an optically smooth surface allowing for TIR. The light-redirecting wall of each undercut should make a dihedral angle with the surface of layer 20 which is suitable for light extraction towards a normal direction with respect to the prevailing plane of system 2.

Figure 34:
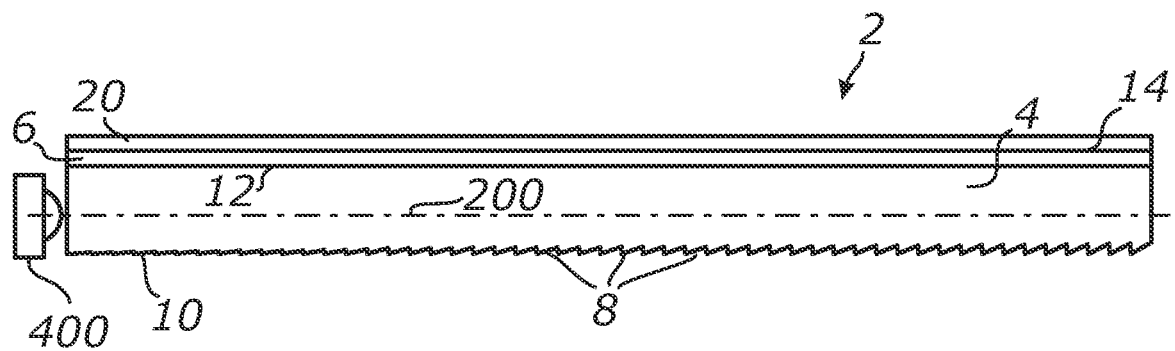
FIG. 34 is a schematic view of a waveguide illumination system, showing surface relief features having a variable slope, according to at least one embodiment of the present invention.

FIG. 34 illustrates an embodiment of system 2 in which surface relief features have a variable slope with respect to the prevailing plane of waveguide 4. Accordingly, system 2 of FIG. 34 includes waveguide 4 defined by opposing TIR surfaces 10 and 12, low-index buffer layer 6 attached to surface 12, light extraction layer 20 attached to the buffer layer, and light source 400 coupled to an edge or terminal end of the waveguide. Surface 10 is provided with an array of micro-stepped surface relief features 8. Each feature 8 has a TIR face facing the light source and inclined at a sufficiently low angle with respect to the prevailing plane of surface 10 and/or waveguide 4 so that light leaks out of waveguide 4 primarily through buffer layer 6 and light extraction layer 20. The slope of individual TIR faces increases along the light propagation path as a function of the distance from light source 400. This can be useful, for example for compensating of light depletion by the previous features 8 along the waveguide and for providing a uniform light output from the light emitting surface of layer 20. According to one embodiment, the slope angle of the TIR faces varies between approximately one half of a degree and three degree. According to one embodiment, the slope angle of the TIR faces increase with the distance from source 400 linearly. According to one embodiment, the slope angle of the TIR faces increase with the distance from source 400 according to a non-linear function in which the rate of slope increase accelerates with the distance from source 400.

It will be appreciated that system 2 of FIG. 33 is designed to receive light from one side and emit it from the respective broad-area surface. Such configuration exhibits certain geometrical asymmetry with respect to a normal to the prevailing plane of the system, which, in turn, my potentially result in an unwanted asymmetry in light distribution in the prevailing plane of light extraction and collimation. In order to eliminate such asymmetry, system 2 may be configured in a symmetrical configuration which is also illuminated from the opposing sides by symmetrically disposed light sources.

Figure 35:
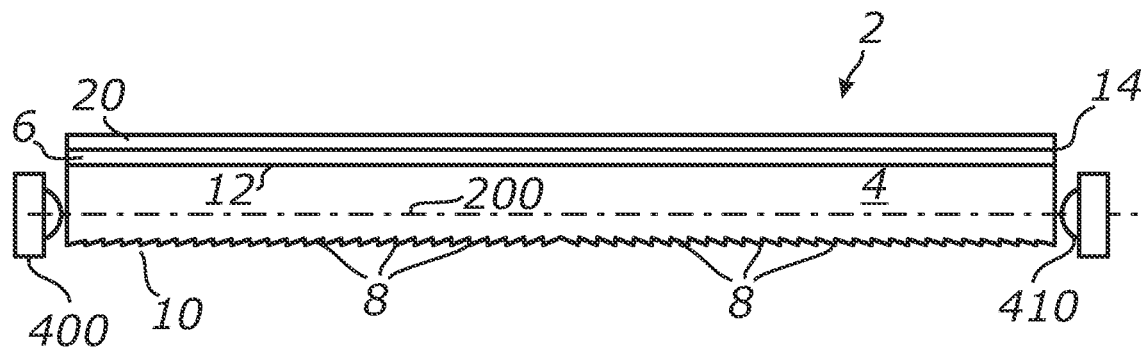
FIG. 35 is a schematic view of a waveguide illumination system, showing two opposing arrays of surface relief features and two light sources coupled to opposing edges or ends of a waveguide, according to at least one embodiment of the present invention.

FIG. 35 shows a two-sided implementation of system 2 which includes two symmetrical segments along axis 200. Accordingly, waveguide 4 also has two symmetrically disposed segments and two opposing light input edges or ends which are illuminated with the respective light sources 400 and 410. Each of the waveguide segments is provided with an array of surface relief features 8 formed in surface 10.

Each of surface relief features 8 is represented by a low-profile, linear asymmetric micro-prism protruding from a base at surface 10 outwardly from waveguide 4. The tips or ridges of the micro-prisms may have sharp corners or they may also be slightly rounded or even have small flat portions.

The larger-area facets of the micro-prisms are tilted outwardly from the central portion of waveguide 4 and are configured for incremental deflection of propagating in a waveguide mode. Each of the larger-area facets should preferably have an optically smooth, polished surface to preserve TIR at surface 10 and minimize light loss.

The dihedral angle of the larger-area facets of the micro-prisms is variable along axis 200, increasing along the intended light propagation path from the opposing edges or ends of waveguide 4 towards the mid-portion of waveguide 4. This ensures that the rate of light deflection increases as a function of the distance from the respective light source and at least partially compensates light depletion in waveguide 4 by the preceding micro-prisms. In will be appreciated that the dihedral angles of the microprisms may be particularly tailored to provide for a nearly-constant rate of light extraction from the surface of waveguide 4 along axis 200. Additionally, the rate of progressive light extraction along axis 200 by the prismatic surface relief features 8 should preferably be sufficient to ensure that substantially all or at least a substantial portion of light injected into waveguide 4 may be extracted.

Accordingly, the opposing lateral sides of light extracting layer 20 may be configured to receive light from the respective portions of waveguide 4 and further direct the extracted light towards surface normal.

Referring further to FIG. 35, each of the opposing segments of system 2 may be configured to emit a slightly asymmetric beam with respect to a normal to the emitting broad-area surface. However, since the opposing segments of system 2 are symmetrical and emit beams that mirror each other with respect to a surface normal, the resulting light distribution representing a superposition of the respective light beams will also become symmetrical with respect to the plane of symmetry of system 2 regardless of the distance from the emitting surface.

Accordingly, by varying the angular distribution and directionality of the individual beams emitted by the opposing system 2 segments of FIG. 35, the resulting light beam may be focused by pointing the respective beams toward converging directions or a target. Alternatively, the individual beams may also be defocused by pointing them beams toward diverging directions or away from a certain target.

It will thus be appreciated that the structure and operation of system 2 allow for an unprecedented control of the beam emitted from its broad-area surface compared to the conventional art employing waveguide illumination systems. In accordance with at least some embodiments and the principles of light collimation described above in reference, for example, to FIG. 9 and FIG. 10, the angular distribution of light emerging from waveguide 4 can be made very narrow at least in one plane or dimension. In turn, light extraction layer 20 may be configured to direct the narrow-distribution light emerging from waveguide 4 towards a plurality of distinct directions. Such directions may be parallel, convergent or divergent. The divergent or convergent directions may also follow a particular angular pattern. Alternatively, the direction of light emission from the light emitting region of system 2 may be randomized within a limited range thus providing an improved light diffusion without sending light into non-functional directions.

In an illustrative example, each of angular distributions 912, 914, 916, and 918 of FIG. 24 may be directed towards a common area located at a distance from system 2 along a normal to axis 200. As a result, particularly when the respective distributions are sufficiently narrow, the intensity of the light beam in the respective area can be made greater than in the intensity of the surrounding areas. Thus, system 2 may be configured to additionally focus light emitted from its surface.

Such focusing can be achieved by the appropriate configuring the light extraction layer 20. For instance, when layer 20 employs light redirecting features such as prismatic grooves 380 of FIG. 32 or slits 382 of FIG. 33, the slope of the respective features may be varied accordingly so as to provide such focusing of the emitted light. In an exemplary case, referring to FIG. 32, the TIR walls of respective grooves 380 redirecting rays 74 and 76 can make slightly different dihedral angles to the prevailing plane of waveguide 4 so as to result in said rays converging at a certain distance from system 2.

Figure 36:
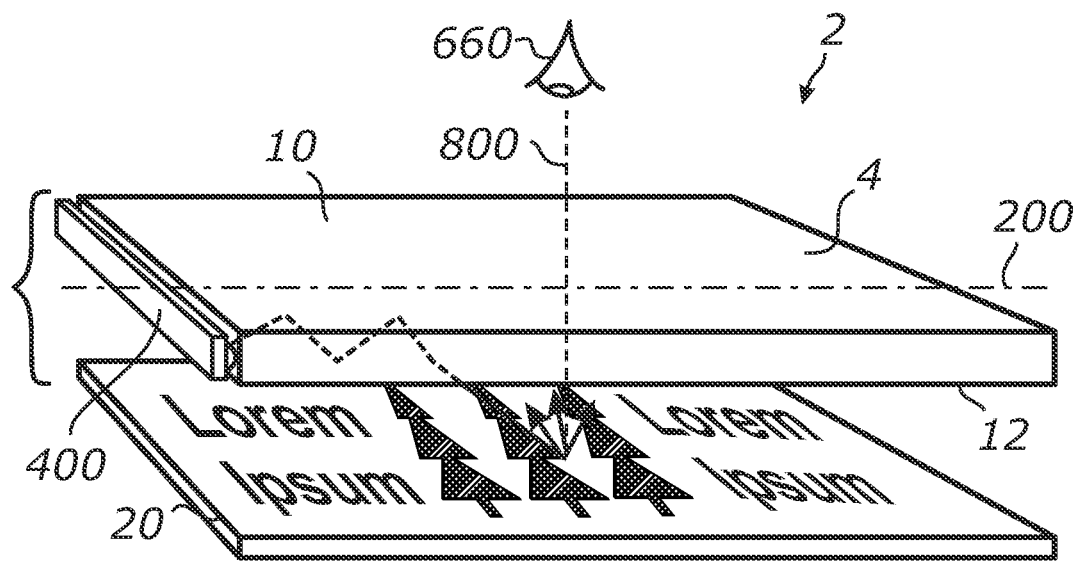
FIG. 36 is a schematic exploded view of a front light implementation of a waveguide illumination system, according to at least one embodiment of the present invention.

FIG. 36 shows an embodiment of illumination system 2 in a front light configuration in which there is provided a light-guiding layer formed by planar waveguide 4 and light extraction layer 20 positioned immediately adjacent to the broad-area surface 12 of the waveguide. Waveguide 4 has high optical transmissivity of the material and also high transparency at least in a direction perpendicular to the waveguide's plane. The waveguide is configured for transmitting light from edge to edge by means of TIR from at least the opposing surfaces 10 and 12 both of which are made smooth (polished) and highly transparent. The side walls of waveguide 4 can also be made smooth and capable of reflecting light by means of TIR. Light source 400 is coupled to the light input edge of the waveguide. The opposing (terminal) edge can be provided with a mirrored surface to reflect light back into the waveguide and recycle rays that have not been extracted from the waveguide in a single pass.

Layer 20 comprises a screen containing an image print which is opaque for the incident light and includes at least one region which has good light scattering or reflective properties. The image may contain any text, graphics, symbols or patterns and can be exemplified, for example, by a front-illuminated display that can be found in the signage industry.

Waveguide 4 and layer 20 of FIG. 36 should be preferably positioned very close to each other, including the case when they are disposed in a physical contact by at least portions of their surfaces. However, a direct optical contact without any intermediate layer (such as air) should be avoided in order to prevent the suppression of TIR of surface 12 and unwanted premature light leakage from waveguide 4.

Waveguide 4 is exemplified by a transparent plastic matrix with a plurality of very fine optically transmissive glass or plastic particles which are incorporated into the matrix in very small proportions by volume and have forward-scattering properties. The forward-scattering particles are meant to mean such scattering particles that scatter light substantially in a forward direction and have a very low or negligible scattering far sideways and in the reverse direction.

The forward-scattering particles are made from an optically transmissive material which refractive index differs from that of the main bulk of waveguide 4 by a predetermined amount. A minimum difference in refractive indices is required for the particles to effectively scatter light rays that propagate sufficiently close to them. Particularly, it is preferred that the refractive index of the particles differs by more than 0.02 but less than 0.4 from the refractive index of the body of waveguide 4. The forward-scattering particles should preferably be finely separated from each other by considerable distances in order to provide for consistent and predictive light scattering as well as maintain high visual transparency and transmissivity of the waveguide.

By way of example and not limitation, the core of waveguide 4 can be made from PMMA ($n_{core}$=1.49) and the particles can be made from polystyrene ($n_{part}$≈1.59) or FEP ($n_{part}$≈1.34). The particles can have a simple, single-component structure or they can have a more complex morphology and may be composed by a core and a shell made from different materials. Depending on the other parameters involved, the particles can have a mean diameter less than, equal to or greater than the wavelength of visible light.

The concentration of forward-scattering particles should be sufficiently low to keep waveguide 4 optically thin along the perpendicular to the prevailing plane of the waveguide. At the same time, the particle concentration should be high enough to make waveguide 4 optically thick along longitudinal axis 200 and yet highly transmissive.

The term "optical depth" or "optical thickness" is commonly directed to mean the quantity of light removed from a light beam by scattering or absorption during its path through a medium. In the context of this invention, as applicable to waveguides including non-absorbing, forward-scattering particles, this term can be more narrowly directed to mean the quantity of light that has been perceptibly scattered from the original propagation path of the light beam. The original propagation path is the path of the light beam in the homogeneous medium of the waveguide in the absence of the scattering particles.

Particularly, if $I_0$ is the reference intensity of radiation in a homogeneous, weakly-absorbing medium of waveguide 4 and I is the observed intensity of light propagating along the same optical path, then an optical depth τ of the medium in the presence of forward-scattering particles can be defined by the following expression: $I=I_0 e^{-\tau}$.

In the optically thin case, that is referring to the case of light propagating along the perpendicular to the plane of waveguide 4, τ≪1 and $e^{-\tau}$≈1−τ, so that the above expression can be simplified as follows: $I=I_0(1-\tau)$. Accordingly, it at least some embodiments of the present invention, waveguide 4 can be configured to perceptibly scatter less than 5% of light propagating along the waveguide's normal and more preferably scatter less than 2% of said light. In other words, the column density of light scattering particles should be low enough so that τ is less than 0.02-0.05 along the normal to the waveguide's prevailing plane and so that the high transparency of the waveguide is maintained.

At the same time, the concentration and light scattering parameters of forward-scattering particles should be selected to ensure that at least a substantial part of light is removed from waveguide 4 by means of scattering as such light propagates through the column of material along longitudinal axis 200. According one embodiment, it is preferred that at least approximately half of the light beam input into waveguide 4 through an edge is scattered as it propagates towards the opposing terminal edge. According to one embodiment, it can be preferred that at least 80% or light is scattered along its longitudinal propagation in waveguide 4, which corresponds to an optically thick case of τ≥1.6.

An important relevant parameter for estimating the required concentration of light scattering particles is an effective cross-section a which defines the area around the particle where light is likely to be scattered. In general, the scattering cross-section is different from the geometrical cross-section of a particle, and it depends upon the wavelength of light and the permittivity, shape and size of the particle. Another important parameter defining the type of scattering and the effective cross-section of dielectric particles of diameter d in a refractive medium is the so-called size parameter x:

$$x = \frac{\pi d \cdot n_{med}}{\lambda},$$

where $n_{med}$ is the refractive index of the refractive medium and λ is the wavelength of the propagating light.

The general case for an arbitrary value of x is called Mie scattering in the relevant art. In the case of relatively large particles compared to the wavelength (x≫1), the total cross-section tends toward a geometric limit of $\sigma=2\pi d^2/4$. As the particles become smaller, the forward scattering diffraction peak can be observed, in which case the cross section will be become twice the geometric limit.

In the case of very small particles (x≪1), the so called Rayleigh limit, the total cross-section is given by $$\sigma = 2/3 \pi d^2 x^4 \left(\frac{m^2-1}{m^2+1}\right)^2,$$

where m is the ratio between the refractive index of the particle and the refractive index of the medium.

Considering light propagating in waveguide 4 having sparsely distributed scattering particles and assuming that the particles do not shadow each other, the optical depth can be related to the scattering cross-section through the following expression: τ=NLσ, where L is the propagation path length and N is the number density of light scattering particles.

The relationship between an optical depth along the waveguide's longitudinal axis and an optical depth perpendicular to the prevailing plane of the waveguide z defines the relative difference in waveguide transparency between the respective directions. It can also be used to define the relationship between the thickness and the length of the waveguide for the given scattering efficiency of the particles and particle concentration.

The scattering particles should be particularly configured to be substantially invisible to the naked eye from a distance and should not introduce a perceptible blur or haze to the bodies or images behind waveguide 4. Additionally, the scattering particles should be configured to not introduce a substantial glare or loss in image contrast when waveguide 4 is lit by source 400 or by any other external light source.

In a non-limiting example, the core of waveguide 4 may include an Acrylite® Endlighten acrylic sheet (e.g. available from CYRO Industries, Rockaway N.J.) which combines visual transparency and light-scattering properties. In a further non-limiting example, waveguide 4 may include a Plexiglas® ELiT acrylic sheet. The sheets can be made using extrusion, casting or any other suitable process and can be configured to provide 90-92% light transmission along surface normal.

In operation, referring further to FIG. 36, the light input edge of waveguide 4 receives light emanated by source 400 and refracts light into the body of waveguide allowing at least a substantial part of the emitted light to propagate in a waveguide mode. Such light injected through the light input edge of waveguide 4 propagates towards the opposing terminal edge by means of transmission and TIR from surfaces 10 and 12 until it is incrementally scattered by a the light scattering particles to a sufficient angle to overcome TIR at surface 12 and exit towards light extracting layer 20. The image print of layer 20 back-scatters the out coupled light into all directions so that at least a portion of the scattered light can reach the viewer's eye 660. Thus, the observer can clearly see the image print which is brightly lit by the highly transparent top layer represented by waveguide 4.

Figure 37:
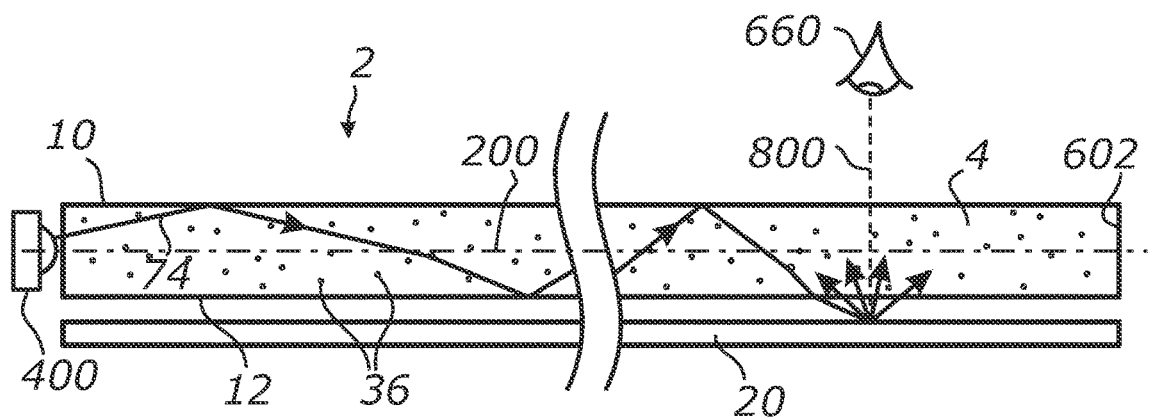
FIG. 37 is a schematic cross-sectional view and raytracing of a waveguide illumination system, showing light scattering features within a waveguide, according to at least one embodiment of the present invention.

FIG. 37 illustrates the structure and operation of the embodiment of FIG. 36 in further detail by depicting an exemplary path of ray 74 emanated by source 400. Waveguide 4 comprises a large plurality of forward-scattering particles 36 made from a transparent refractive material that has different refractive index than waveguide 4. Each scattering particle 36 is configured to provide strong forward scattering propertied so that each interaction of light ray with such particle can change its propagation direction by up to a relatively small, predetermined amount. The bend angle introduced by each particle 36 should be low enough to generally prevent light exiting from waveguide 4 at high angles with respect to the prevailing plane of the waveguide. Instead, each scattering particle 36 should be configured to provide incremental deviation of rays along the propagation path and eventually result in light rays exiting from surface 12 at low angles with respect to the surface, thus providing means for illuminating layer 20 by the decoupled light.

Particles 36 are preferably finely distributed through the volume of waveguide 4 in a concentration low enough to maintain high transparency of the waveguide along normal 800. At the same, time, the concentration should be sufficient to extract most of the light from waveguide 4 by means of forward scattering and by means of eventual communicating incidence angles greater then TIR at surface 12.

Due to the probabilistic nature of scattering and particle encounter, ray 74 may undergo multiple scattering events until it reaches the incidence angle greater than the TIR angle at surface 12. It will be appreciated that at certain concentrations of light scattering particles 36, a portion of light beam may remain non-extracted upon reaching the terminal edge of waveguide 4. Therefore, the terminal edge may be provided with reflective surface 602 which will reflect the above portion of light back into the waveguide and promote a more complete light utilization. In certain cases, employing reflective layer 602 may also result in an improved uniformity of light emitted by system 2.

It will be appreciated by those skilled in the art that when waveguide 4 is surrounded by air, the smooth waveguide/air interfaces at surfaces 10 and 12 may appear functionally identical with respect to light propagating by TIR within the waveguide. Accordingly, with the absence of TIR suppression or at one of the surfaces, the propagating light has essentially equal probability of exiting through either surface. As a result, about 50% of light may exit from waveguide 4 without illuminating the image print of layer 20. Although the emergence angle of light exiting through surface 10 can be made sufficiently low so as not to interfere significantly with viewing the illuminated image print from a normal direction, the loss of the respective portion of light may be unwanted for a variety of reasons.

Figure 38:
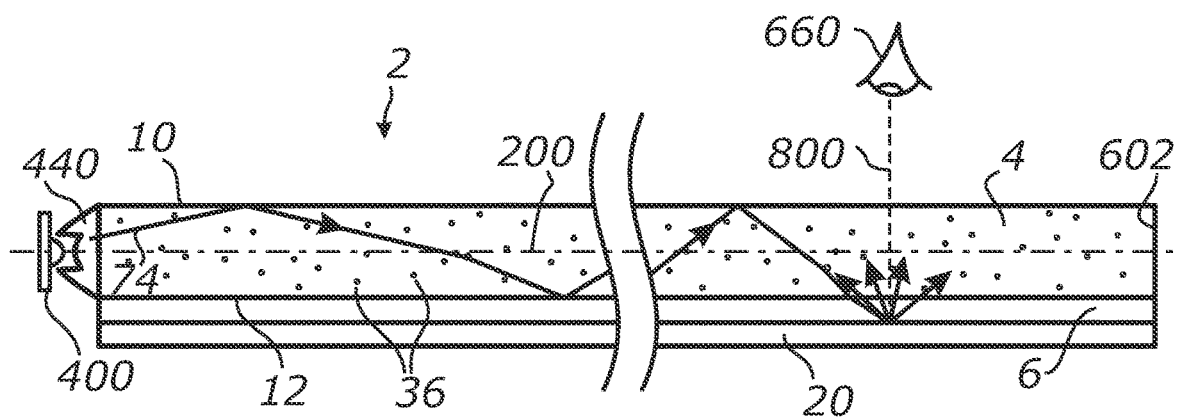
FIG. 38 is a schematic cross-sectional view and raytracing of a waveguide illumination system, showing light scattering features within a waveguide and a buffer layer positioned between the waveguide and a light extraction layer, according to at least one embodiment of the present invention.

In order to eliminate or at least substantially reduce this light loss and enhance the brightness of the image print, a suitable intermediate outcoupling layer can be provided between waveguide 4 and layer 20, as illustrated in FIG. 38.

Referring to FIG. 38, the intermediate outcoupling layer is exemplified by highly transparent buffer layer 6 disposed in a good optical contact with both waveguide 4 and layer 20. Similarly to at least some of the embodiments discussed above in reference to, for example, FIG. 5 and FIG. 6, buffer layer 6 has a lower refractive index than waveguide 4. At the same time, the refractive index of layer 6 should be greater than the refractive index of the surrounding air or otherwise of the material adjacent to surface 10.

Buffer layer 6 allows for TIR at surface 12 at sufficiently high incidence angles, that is when the propagation angle is sufficiently low with respect to longitudinal axis 200. Similarly to the embodiments described in reference to FIG. 5 and FIG. 6, surface 10 can be characterized by the first TIR angle $\phi_{TIR1}$ and surface 12 can be characterized by the second TIR angle $\phi_{TIR2}$.

Accordingly, when the incidence angle onto surface 12 becomes lower than $\phi_{TIR2}$ as a result of scattering by particles 36 and incremental increase of the out-of-plane angle, light can escape from waveguide 4 through the respective surface and illuminate the image surface of layer 20. Since the refractive index of air is lower than that of layer 6, the TIR angle $\phi_{TIR1}$ at surface 10 is lower than the second TIR angle $\phi_{TIR2}$. This results in the prevailing light escape paths through layer 6 and no light or at least much less light leaking through surface 10.

Referring further to FIG. 38, system 2 may also include collimating element 440 associated with the light input edge of waveguide 4. Collimating element 440 may be attached to the light input edge of waveguide 4 with or without good optical contact or it can be spaced apart from the edge by a small air gap or by an intermediate optically transmissive layer. For maximizing the light input, collimating element 440 may be coupled to the waveguide edge using an optical adhesive or encapsulant. Collimating element 440 may be configured to narrow the angular light distribution emitted by light source 400. This may ensure that the second TIR angle $\phi_{TIR2}$ is not exceeded in waveguide 4 prematurely for at least some rays and that no substantial portion of light exits from the waveguide 4 near the light input edge. Since the embodiment of FIG. 38 may be configured to admit up to about twice as much light onto the print of layer 20 and eliminate or at least substantially suppress light loss through the opposing surface 10 compared to the embodiment of FIG. 37, it may be advantageously selected for at least some applications where more complete light utilization and improved image contrast are important.

Figure 39:
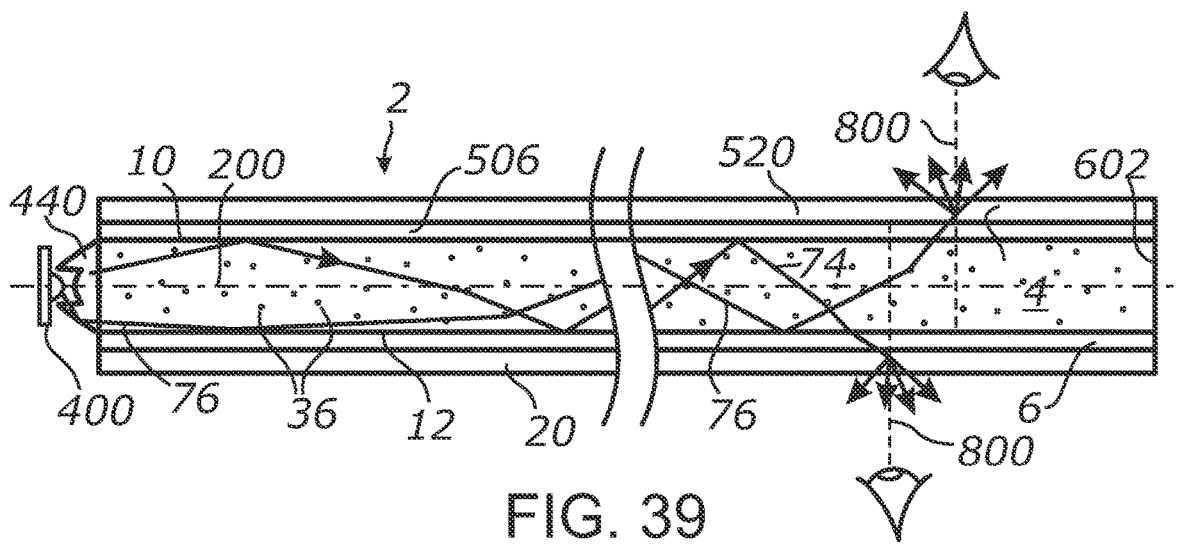
FIG. 39 is a schematic cross-sectional view and raytracing of a waveguide illumination system in a two-sided backlight implementation, according to at least one embodiment of the present invention.

FIG. 39 depicts an embodiment of system 2 configured as a backlight and more particularly as a two-sided backlight. An additional pair of the buffer layer and the light extraction layer is provided on surface 10, as indicated by reference numerals 506 and 520, respectively.

Similarly, the layers 506 and 520 are laminated to surface 10 with a good optical contact with or without intermediate adhesive layers. Both light extraction layers 20 and 520 may be configured as transmissive diffusers and can have any suitable color, tint, light transmissive and scattering characteristics. Either one of the layers 20 and 520 may also be configured to display an images or any suitable pattern or text.

Accordingly, light propagating through waveguide 4 and scattered by particles 36 can be evenly distributed along the surfaces 10 and 12 and will illuminate both layers 20 and 520 thus providing the desired operation of a two-sided backlight having waveguide 4 sandwiched between the opposing light extracting layers. Ray 74 of FIG. 39 exemplifies light exiting from waveguide 4 through surface 12 and ray 76 exemplifies light emerging from surface 10.

Figure 40:
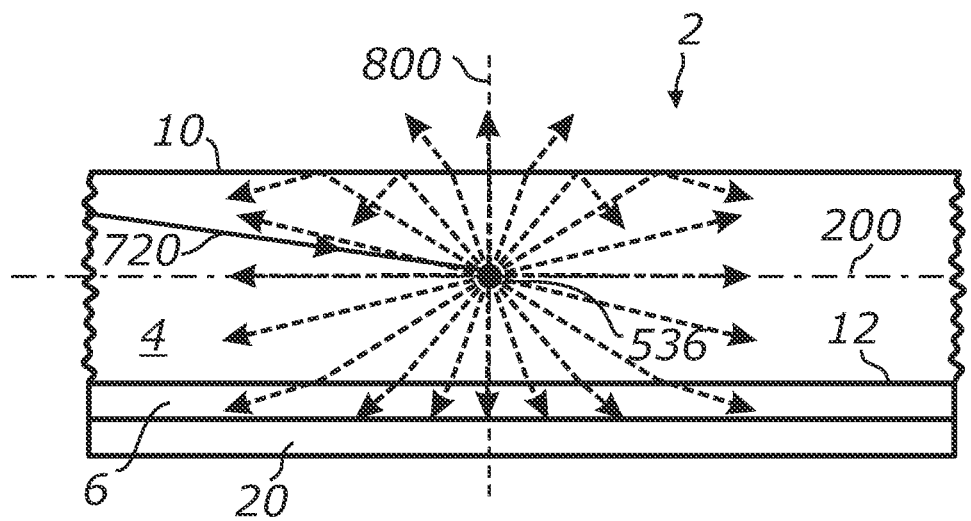
FIG. 40 is a schematic cross-sectional view and raytracing of an illumination system portion illustrating the light extracting operation of scattering particles in conjunction with a low-index layer, according to at least one embodiment of the present invention.

FIG. 40 illustrates the effect of adding layer 6 between waveguide 4 and light extraction layer 20 for an exemplary case of an isotropic scattering particle 536 embedded into the material of the waveguide. A ray 720 exemplifies light propagating in a waveguide mode through waveguide 4.

Referring to FIG. 40, ray 720 is scattered into all directions by the particle 536. While surfaces 10 and 12 receive an about equal number of scattered rays, the low-n layer 6 enables the asymmetry in TIR angles between surfaces 10 and 12 and results in more light extracted through surface 12 towards layer 20 compared to the amount of light escaping from waveguide 4 through surface 10.

Figure 41:
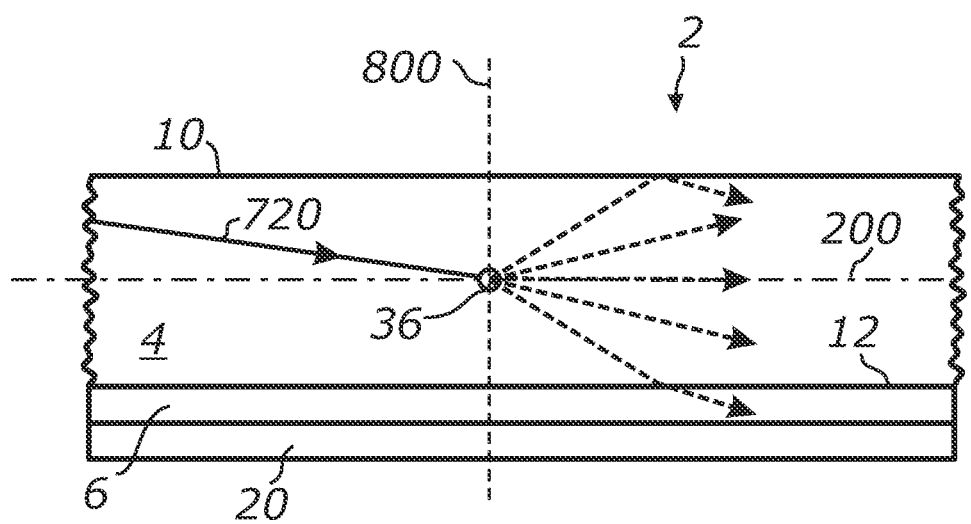
FIG. 41 is a schematic cross-sectional view and raytracing of an illumination system portion illustrating the light extracting operation of forward-scattering particles in conjunction with a low-index layer, according to at least one embodiment of the present invention.

FIG. 41 illustrates the advantage of employing anisotropic scattering particles by example of a single forward-scattering particle 36 operating in conjunction with the low-n layer 6. As shown in FIG. 41, ray 720 is forward-scattered by particle 36 at scattering angles not exceeding the complementary angle to the first TIR angle $\phi_{TIR1}$. At the same time, the maximum scattering angle is greater than the complementary angle to the second TIR angle $\phi_{TIR2}$ which causes at least some uttermost scattered rays to obtain sub-TIR incidence angles with respect to surface 12 and exit from waveguide into layer 6. Since layer 6 is optically transmissive, all light rays exiting into layer 6 reach light extraction layer 20 which, in turn may redirect or redistribute said rays and direct them into the prescribed directions. Accordingly, by limiting the scattering angle by a predetermined value, the unwanted light escape through surface 10 can be eliminated or at least substantially reduced compared to the case of FIG. 40 where isotropic particle 536 is employed.

A scattering angle $\delta$ can be defined as an angle between the original propagation direction that a light ray has before encountering scattering particle 36 and the direction of a scattered ray resulting from ray interaction with the particle. Accordingly, referring to FIG. 42, if ray 720 has out-of-plane propagation angle $\beta$ before scattering, it may obtain a new out-of-plane propagation angle $\beta+\delta$ thus broadening the angular distribution of light propagating in waveguide 4.

Figure 42:
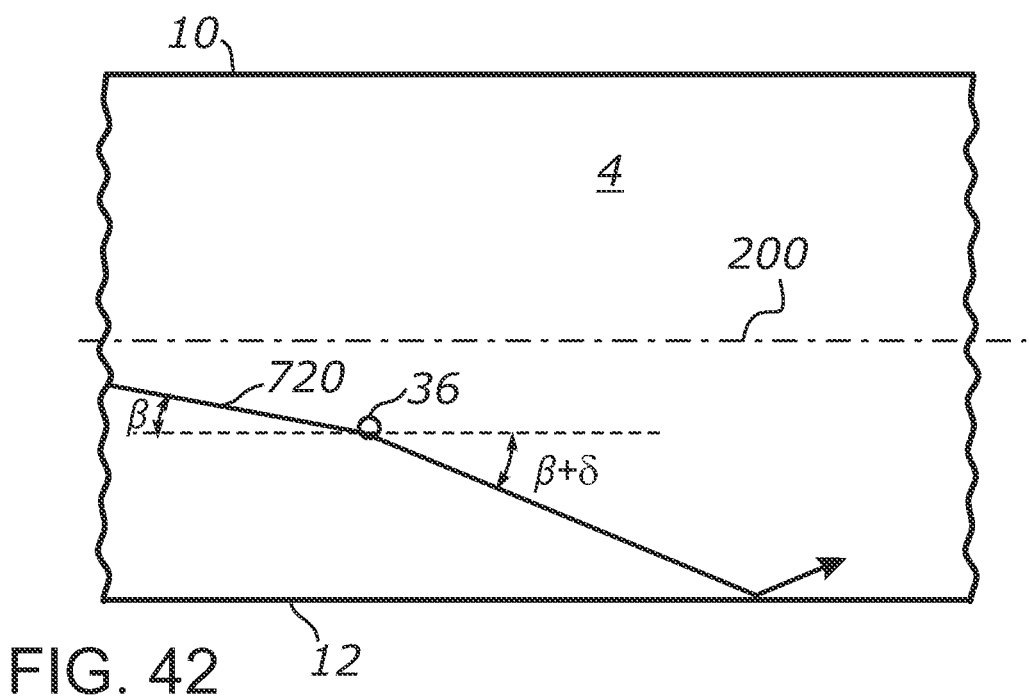
FIG. 42 is a schematic cross-sectional view and raytracing of a waveguide further illustrating a forward-scattering operation of light scattering features, according to at least one embodiment of the present invention.

In an operational aspect of this invention, forward-scattering particles 36 may be configured to provide function similar to surface relief features 8 of at least some embodiments discussed above (see, e.g., the discussion on broadening the angular distribution of propagating light beam in reference to FIG. 7 and FIG. 8). More particularly, it may be appreciated that an analogy may be drawn between the scattering angle $\delta$ of FIG. 42 and the angular increment $2\alpha$ of FIG. 8. Although angle $\delta$ of FIG. 42 is obtained by using a light scattering mechanism and a specially configured particle 36 embedded into the bulk of waveguide 4 material while angle $2\alpha$ is obtained using surface relief feature 8 having a characteristic slope $\alpha$ with respect to the waveguide surface, both of these angular values represent a relatively small incremental deviation of the respective light rays from the original propagation directions. Either one of the above-compared light deviation mechanisms may be configured directed to provide a controlled leakage of light through the designated major surface of waveguide 4. Additionally, it is noted that by selecting the appropriate parameters of surface relief features 8 and forward-scattering particles 36 of the respective embodiments, the angular spread and angular/spatial distribution of light extracted from waveguide 4 can also be controlled, which may be used, for example, for providing a light collimating function of system 2.

It will be appreciated by those skilled in the art that, although each individual interaction of a light ray with forward-scattering particle 36 has a random character, by selecting the material, refractive index, size, concentration and/or other parameters of particles 36, the light scattering pattern of the particles may be tailored to provide a controlled magnitude and rate of spreading of the light beam along the propagation path in waveguide 4. As layer 6 frustrates TIR for at least those rays that have incidence angle into surface 12 greater than the critical TIR angle $\phi_{TIRC}$, light will primarily exit from waveguide 4 toward layer 20 and not toward the opposing side of the waveguide.

By applying Mie scattering calculations to dielectric spheres in refractive medium and considering an exemplary case of PMMA waveguide 4 ($n \approx 1.49$) and polystyrene particles ($n \approx 1.59$) a scattering phase function can be obtained for various particle sizes. The scattering phase function, or phase function, gives the angular distribution of scattered light intensity at a given wavelength.

Figure 43:
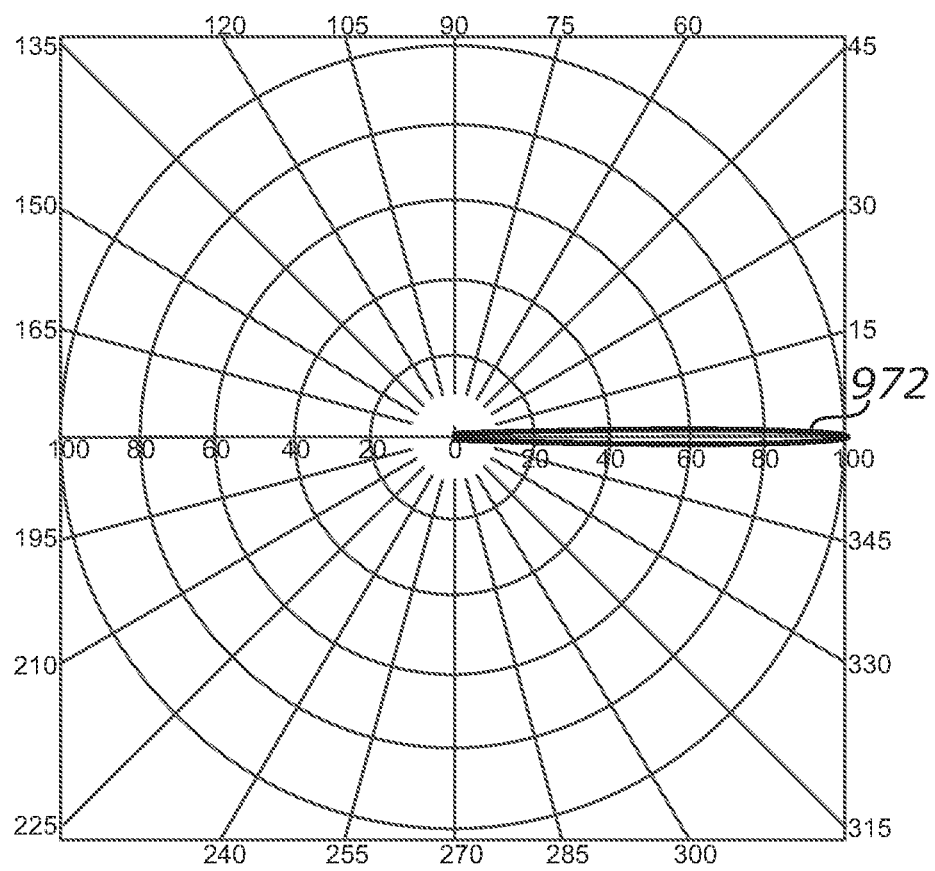
FIG. 43 is a schematic view of a scattering pattern characterizing an exemplary forward-scattering particle, according to at least some embodiments of the present invention.

FIG. 43 shows a scattering phase function plot for an exemplary spherical particle 36 having a 5 μm in diameter, calculated according to Mie theory for 532 nm wavelength. As it can be seen from an angular distribution 972 of scattered light intensity, the scattering angle $\delta$ generally does not exceed 5° for the most part of light beam. More particularly, about 90% of scattered light will be deviated from the original propagation path by 5° or less. Therefore, each interaction of light beam with such a narrowly-scattering particle 36 will broaden the angular distribution by a small increment which can be sufficient for useful light extraction through surface 12 and the adjacent layer 20 but generally insufficient for light escape through opposing surface 10.

Figure 44:
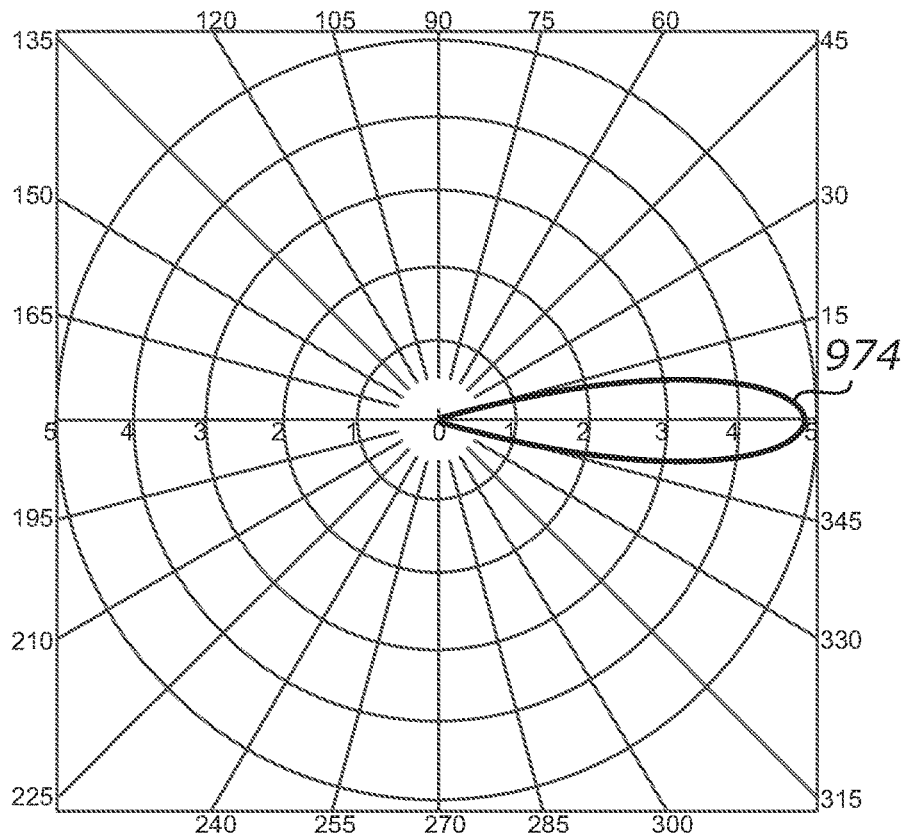
FIG. 44 is a schematic view of a scattering pattern characterizing another exemplary forward-scattering particle, according to at least some embodiments of the present invention.

FIG. 44 shows a similar plot calculated for 0.9 μm diameter of particle 36 where the scattered light intensity has a different angular distribution 974. The analysis of angular intensity distribution 974 indicates that about 90% of the scattered light beam is confined within ±17° scattering cone and that 95% of the beam is contained within ±20° scattering cone, respectively. Thus, statistically, scattering angles S will generally be greater for the case of 0.9 μm diameter of particle 36 than for the case a larger, 5 μm particle 36. Accordingly, light rays having angular distribution 974 will be extracted from waveguide 4 much faster and will travel much shorter distances along axis 200 than light rays having angular distribution 972. It will be thus appreciated that the particle size can be used for controlling the rate of light extraction and overall light output for a given area of system 2. The size of particles 36 therefore represents an important system parameter that generally needs to be factored into the system design along with the other parameters discussed above for the respective embodiments.

According to at least some embodiments of the present invention, the size and other parameters of forward-reflecting particles 36 can be selected to result in the scattering angles S that generally do not exceed the difference in TIR angles at surfaces 10 and 12. In other words, $\delta < \phi_{TIR2} - \phi_{TIR1}$, where $\phi_{TIR2}$ is the critical TIR angle at the interface of waveguide 4 with buffer layer 6 (e.g., surface 12 in FIG. 38) and $\phi_{TIR1}$ is the critical TIR angle at the interface of waveguide 4 with the outside medium (e.g., surface 10 in FIG. 38). This can minimize light escape into air through the waveguide surface opposing the interface between waveguide 4 and buffer layer 6.

It should be understood that this invention is not limited to the cases where system 2 has the shape of a rectangular plate, sheet or film or an elongated rod and may be applied to the case when system 2 has any other suitable shape. Particularly, system 2 can have any basic geometric form, a free-form or any combination thereof. Additionally, any two-dimensional planar shape of system 2 can be bent in any suitable way to form a three-dimensional shape. This can be used, for example, to provide a broader illumination pattern or create artistic or decorative effects. Similarly, system 2 having an elongated or rod-like geometry can be bent or formed to create a two-dimensional or three-dimensional shape.

Figure 45:
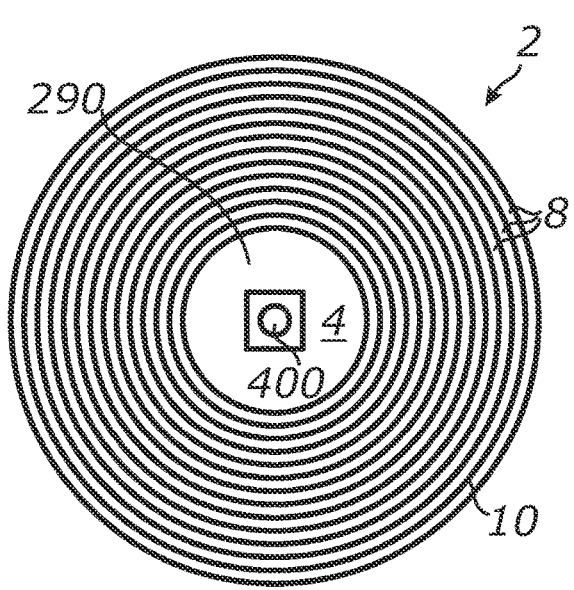
FIG. 45 is a schematic view of an illumination system in an axisymmetrical configuration, showing a light source in the center, according to at least one embodiment of the present invention.

FIG. 45 depicts an example of system 2 in an axisymmetrical configuration where light source 400 is positioned at the central area of waveguide 4 and surface relief features 8 are represented by nested radial rings. Waveguide 4 may have an area 290 which is clear and void of any features 8.

Figure 46:
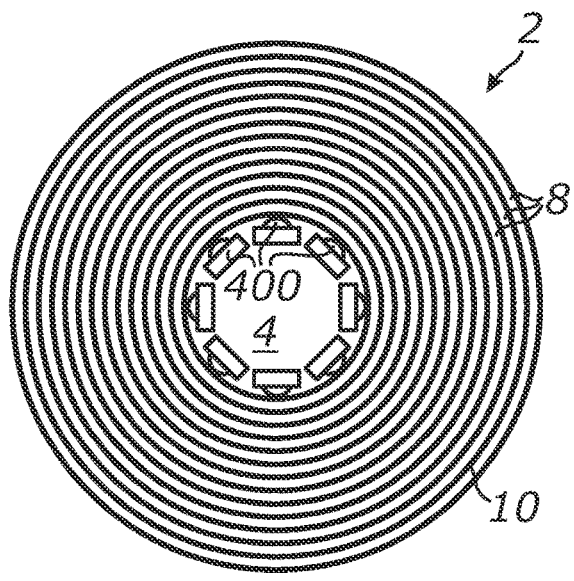
FIG. 46 is a schematic view of an illumination system in an alternative axisymmetrical configuration, showing a plurality of light sources in a central ring area, according to at least one embodiment of the present invention.

FIG. 46 shows an alternative round configuration of system 2 in which there is a central opening in waveguide 4 where a ring of multiple light sources 400 is attached to the inner edge of the waveguide. In configurations depicted in FIG. 45 and FIG. 46, light injected into waveguide 4 in the central area and propagating radially away from the center is emitted from the broad surface of the waveguide by the combined function of surface relief features 8, buffer layer 6 and light extraction layer 20, according to the principles described above. In view of the foregoing description of the invention, it should be understood that the above-described forward-scattering particles 36 can also be used in place or in addition to surface relief features 8.

It should be understood that at least some of the configurations of system 2 shown in a cross-section in the foregoing embodiments may also be implemented in an axisymmetrical form obtained by the revolution of the respective cross-section around an axis. It should also be understood that this invention is not limited to the light input through an edge into waveguide 4, but can also be applied the case where light can be input at any suitable location of waveguide 4, including an arbitrary location across surfaces 10 or 12. The light can be input by embedding light source 400 into the envelope of waveguide. Light source 400 can be alternatively attached to a broad-area surface of waveguide 4 or spaced apart from the body of the waveguide. When source 400 is externally attached to waveguide 4, a suitable collimating or non-collimating light coupler can be used to inject light into waveguide's core.

At least some of the foregoing embodiments were described upon the case where a difference between the refractive indices at the opposing walls or surfaces of waveguide 4 was used to force light escape towards a designated side of the waveguide. However, this invention is not limited to this and may be applied to the case when any other suitable means are used for suppressing light leakage through the unwanted side of the waveguide. Particularly, a specularly reflective layer, such as a mirrored surface, may be provided on the side of the waveguide opposing to the light emitting side to return any stray light back to the waveguide.

Figure 47:
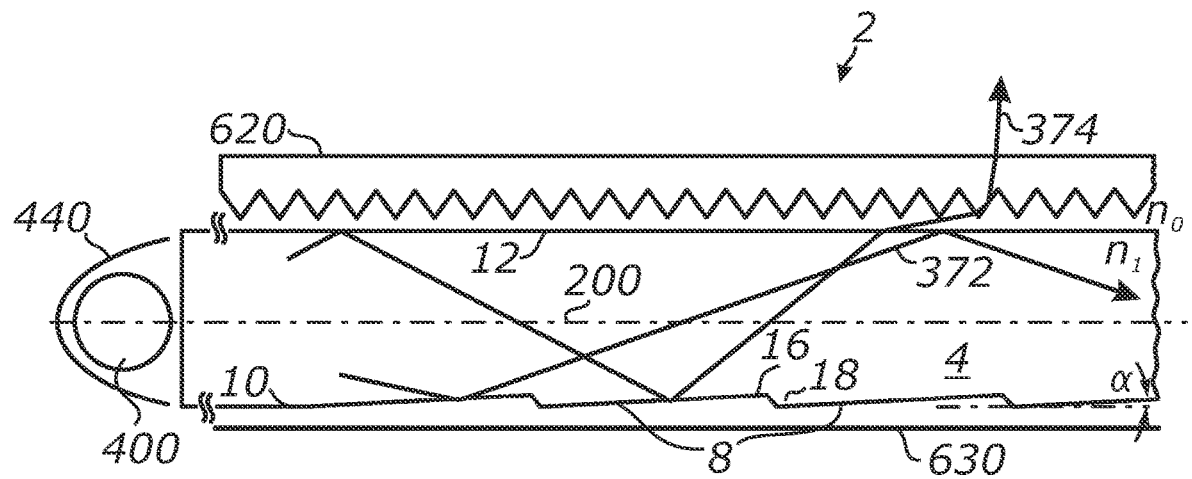
FIG. 47 is a schematic cross-sectional view and raytracing of an illumination system portion, showing a reflective layer adjacent to a waveguide and a right-angle turning film adjacent to the same waveguide, according to at least one embodiment of the present invention.

FIG. 47 shown an embodiment of system 2 comprising planar waveguide 4 sandwiched between a light turning film 620 and a sheet-form specular reflector 630. Waveguide 4 has generally planar opposing broad-area surfaces 10 and 12. Surface 12 has a plurality of shallow surface relief features 8 represented by shallow steps formed in said surface.

Light source 400, which may be represented by one or more LEDs, cold cathode fluorescent lamp (CCFL) or any other source, is positioned near the light input edge of waveguide 4. Collimating element is provided to collect light propagating from source 400 away from the light input edge and inject such light into the waveguide.

Each surface relief feature has a planar face 16 which is configured to reflect light propagating at relatively low out-of-plane angles by means of TIR, as illustrated by a. The slope angle α of the respective faces 16 is sufficiently low so as to generally result in multiple interactions of light rays before they can obtain the sufficient out-of-plane angle to overcome TIR at either surface 10 or 12. This is illustrated by the example of a light path of a ray 372 in FIG. 47. The slope of face 16 of the respective surface relief feature 8 is insufficient to communicate a sub-TIR incidence angle with respect to either surface 10 or 12. Accordingly, ray 372 can continue propagating in the waveguide mode until its interactions with the subsequent surface relief features 8 result in reaching the minimum out-of-plane angle to suppress TIR.

Reflector 630 is positioned adjacent to surface 10 in such a way that there is at least minimal air gap between the two. Reflector 630 has a high specular reflectivity and is configured to reflect light emerging from surface 10 at high exit angles with respect to surface normal back towards waveguide 4.

Light turning film 620 has a prismatic structure facing waveguide 4. The grooves of the prismatic structure are aligned parallel to each other in an linear array which longitudinal axis extends generally perpendicular to longitudinal axis 200 of waveguide 4.

By way of example and not limitations, light turning film 620 may be exemplified by the Transmissive Right Angle Film (TRAF) which is commercially available from 3M. The TRAF film has a polyester backing substrate with the prismatic structure made from modified acrylic resin. It has the acceptance angle of 0° to 20° with respect to the plane of the film and a nominal thickness of about 155 μm. Accordingly, surface relief features 8 may be configured to gradually increase the out-of-plane angle of light propagating in the waveguide mode and eventually result in light exiting from the waveguide core towards TRAF at such an out-of-plane angle which will be within the acceptance angle of the TRAF. In turn, TRAF may intercept and further redirect the emerging light away from the emitting surface by an angle of approximately 70° thus resulting in light emission from the broad-area surface of system 2 in a perpendicular direction.

It will be appreciated that surface relief features 8 may be configured to match any other acceptance angle of light turning film 620, simply by adjusting slope angle α of the respective faces 16. Particularly, each face 16 may have such a slope angle α which will ensure that most light will emerge from waveguide 4 also at an out-of-plane angle which is within the acceptance angle of film 620.

It will be appreciated that, in order to achieve the desired operation, slope angle α will typically be much lower than the acceptance angle waveguide 4. Most light rays propagating in waveguide 4 will require multiple interactions with surface relief features 8 along the propagation path in order to obtain the minimum out-of-plane angle to overcome TIR at surface 12 and yet to enter film 620 at the prescribed low out-of-plane angles. It will thus be appreciated that most light will be extracted from waveguide 4 by deviating from the original propagation path in an incremental fashion and that the increments to the out-of-plane angle communicated by each surface relief feature 8 will be relatively low due to the smallness of slope angle α.

A light ray 374 of FIG. 47 exemplifies the final portion of the light path according to the above scenario. Ray 374 emitted by source 400 and injected into waveguide 4 has a relatively high out-of-plane angle with respect to the waveguide's prevailing plane as a result of its multiple interactions with surface relief features 8 along the propagation path. Particularly, the angle which is complementary to the out-of-plane angle of ray 374 is lower than the critical TIR angle at surface 12 by a relatively small difference which may be overcome by an additional interaction with a single surface relief feature 8. As ray 374 strikes face 16 of the respective surface relief feature 8, it is reflected by means of TIR and obtains an increment in the out-of-plane angle. It will be appreciated by those skilled in the art that the increment in the out-of-plane angle will be twice the slope angle α of face 16.

Accordingly, as ray 374 is directed towards the opposing surface 12, its new incidence angle with respect to a normal to surface 12 may become less than the critical TIR angle at that surface resulting in ray decoupling from waveguide 4. Upon exiting from a greater-index material of waveguide 4 into a low-n outside medium (such as air), ray 374 will bend substantially towards the plane of waveguide 4 due to the refraction angle being greater than the angle of incidence. Therefore, even if ray 374 was making a relatively high out-of-plane angle when propagating within waveguide 4, its respective out-of-plane angle outside of waveguide 4 would generally be substantially lower, in accordance with the Snell's law, including near-zero angles. Accordingly, the maximum allowable angle that ray 374 can make with respect to surface 12 can be set to the acceptance angle of film 620 in which case substantially all rays emerging from waveguide 4 may be turned towards a perpendicular direction. Since film 620 may be configured to generally preserve the angular distribution of light that it redirects and since most rays emerging from waveguide 4 may be distributed within a relatively narrow angular cone, a highly collimated beam may thus be obtained.

Referring further to FIG. 47, the maximum allowable slope angle $\alpha_{MAX}$ of face 16 may be defined from the following reasoning for a given acceptance angle $\alpha_{ACC}$ of light turning film 620. It is noted that this reasoning is provided by way of an illustrative example to assist the reader in understanding of the operation of this invention and should not be construed as limiting the scope of the invention.

Since the out-of-plane angle of ray 374 should preferably be equal to or lower than the acceptance angle $\phi_{ACC}$ upon exiting from waveguide 4, the minimum refraction angle $\phi_{RMIN}$ of ray 374 counted off from a normal to surface 12 should be complementary to angle $\phi_{ACC}$ that is $\phi_{RMIN}=90°-\phi_{ACC}$. By using the Snell's law, it can be shown that the minimum angle of incidence $\phi_{DIN}$ corresponding to $\phi_{RMIN}$ can be found from the following relationship: $n_1$ sin $\phi_{IMIN}=n_0$ sin $(90°-\phi_{ACC})$ or $n_1$ sin $\phi_{IMIN}=n_0$ $\cos(\phi_{ACC})$, where $n_1$ is the refractive index of the material of waveguide 4 and $n_0$ is the refractive index of the outside medium. Accordingly, assuming the outside medium being the air with $n_0 \approx 1$, sin $\phi_{IMIN}=\cos(\phi_{ACC})/n_1$.

Since the angle of reflection is equal to the angle of incidence in respect to a normal to face 16, TIR from face 16 will decrement the incidence angle or ray onto surface 12 by 2α. Now, considering that the minimum incidence angle that ray 374 may take with respect to a normal to surface 12 while propagating in a waveguide mode is the critical TIR angle $\phi_{TIRC}$ and that the incidence angle of reflected ray should not exceed $\phi_{IMIN}$, obtain $\alpha_{MAX}=(\phi_{TIRC}-\phi_{IMIN})/2$.

For the case illustrated in FIG. 47 and in view of the above assumptions, $\phi_{TIRC}=\arcsin(n_0/n_1) \approx \arcsin(1/n_1)$. Accordingly, slope angle α of face 16 may be selected to not exceed $\alpha_{MAX}$, where $$\alpha_{MAX}=\tfrac{1}{2}(\arcsin(1/n_1)-\arcsin(\cos(\phi_{ACC})/n_1))$$

For instance, if waveguide 4 of FIG. 47 is made from PMMA (acrylics) having refractive index $n_1 \approx 1.49$ and light turning film 620 includes TRAF having the acceptance angle $\phi_{ACC}$ of 20°, it will give $\alpha_{MAX} \approx 1.5°$. It is noted however, that greater slope angles may also be selected for faces 16 in which case at least some rays may emerge from waveguide 4 at out-of-plane angles beyond the acceptance angle of film 620. Accordingly, a portion of light emitted from system 2 may have a prescribed degree of collimation and another portion of the emitted light may have a more diffuse angular distribution. It will be appreciated that, when the primary function of system 2 of FIG. 47 is to emit a collimated light beam while minimizing light scattering, slope angle α shall either not exceed the maximum angle $\alpha_{MAX}$ or exceed it only by a relatively small amount. Particularly, the slope angle α of each face 16 with respect to prevailing plane of waveguide 4 may be made less than two angular degrees. It can be shown that, at such low angle, at least a major portion of light escaping through surface 12 will still have out-of-plane angles less than 20 degrees, which is within the acceptance angle of the TRAF film. Accordingly, when film 620 is exemplified by the TRAF film, practically all of the emerging light may be redirected towards the surface normal while generally preserving the narrow, 20-degrees angular spread and resulting in system 2 emission of a collimated beam perpendicularly to its plane.

Light turning film 620 may also be provided with light scattering properties or associated with an external light scattering layer. This may be useful, for example, for smoothing out the irregularities in light distribution that may be present in the collimated beam. In another example, the light scattering features associated with light turning film 620 may also be useful for additional spreading of the collimated beam emitted by system 2 over a broader angular range.

Figure 2:
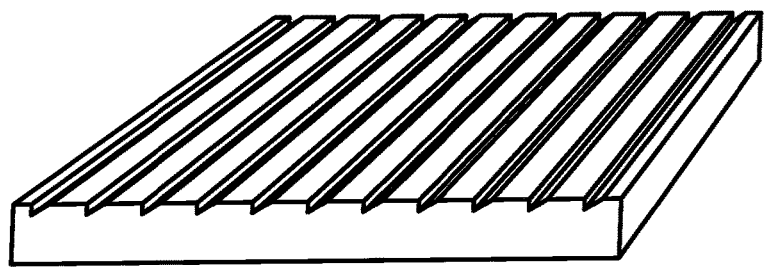
FIG. 2 is a schematic perspective view of a conventional light emitting waveguide employing V-shaped grooves for light extraction.
Figure 3:
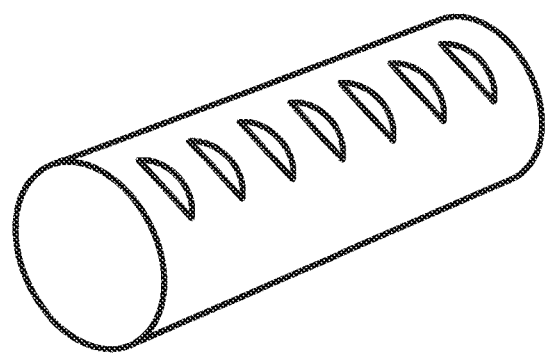
FIG. 3 is a schematic perspective view of a conventional side-emitting optical fiber employing cuts or notches formed in the fiber surface for light extraction.
Figure 4:
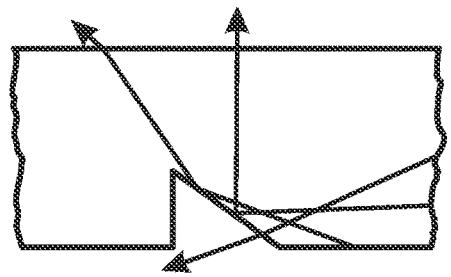
FIG. 4 is a schematic cross-sectional view of a conventional light-emitting waveguide portion, showing the principles of light extraction.
Figure 48:
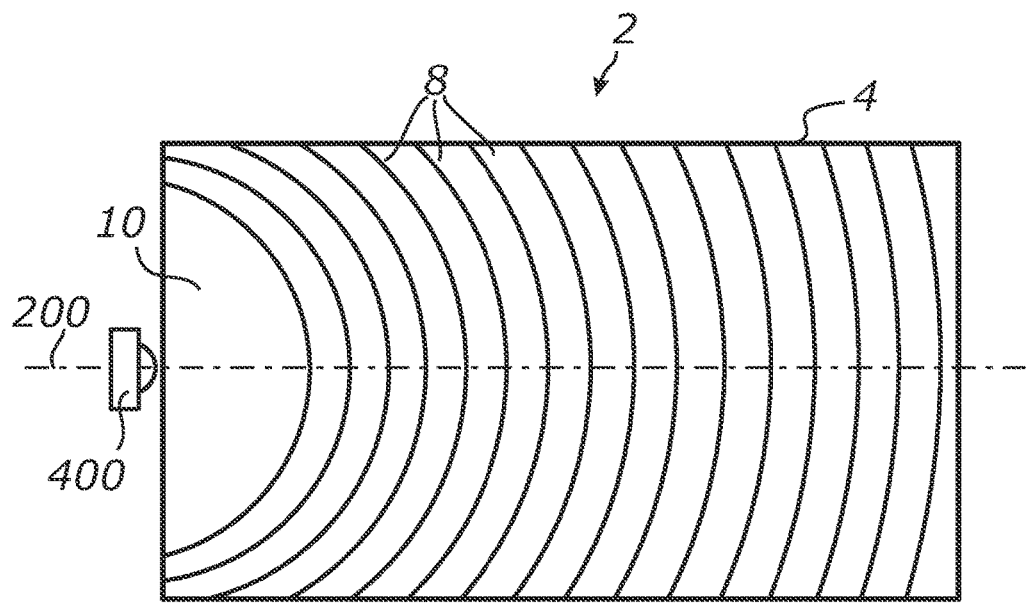
FIG. 48 is a schematic elevation view of a waveguide illumination system, showing an annular arrangement of parallel surface relief features formed in a waveguide surface, according to at least one embodiment of the present invention.

At least some of the foregoing embodiments were described upon the case where surface relief features 8 are arranged in parallel rows in a surface of waveguide 4. However, this invention is not limited to this and may be applied to the case where surface relief features are arranged in an array which can have any other configuration. For example, as illustrated in FIG. 48, surface relief features may be formed in surface 10 in an annular stepped arrangement radially extending from source 400 and being symmetrical with respect to axis 200. However, it is noted that any other suitable pattern may also be used for arranging feature 8 in surface 10, which may also include symmetric, asymmetric, intermittent, ordered or random patterns. For instance, any of the surface distribution patterns of light extracting features of the prior art devices, also including those shown in FIG. 1 through FIG. 3, may be used to distribute surface relief features 8 across a major surface of waveguide 4.

The foregoing embodiments were described upon the case where the light deflecting elements are exemplified by either surface relief features 8 formed in a major surface of waveguide 4 or forward-scattering particles 36 distributed though the body of the waveguide. However, this invention is not limited to this and may be applied to the case where the light deflecting elements have any other type provided that system 2 has the same basic operation.

For instance, the light deflecting elements may include diffraction or holographic structures distributed along either one or both of surfaces 10 and 12. Such structures may be configured to deflect light by small angles in an incremental fashion along the propagation path in waveguide 4 and to cause controlled light leakage from the waveguide at relatively low out-of-plane angles.

Figure 49:
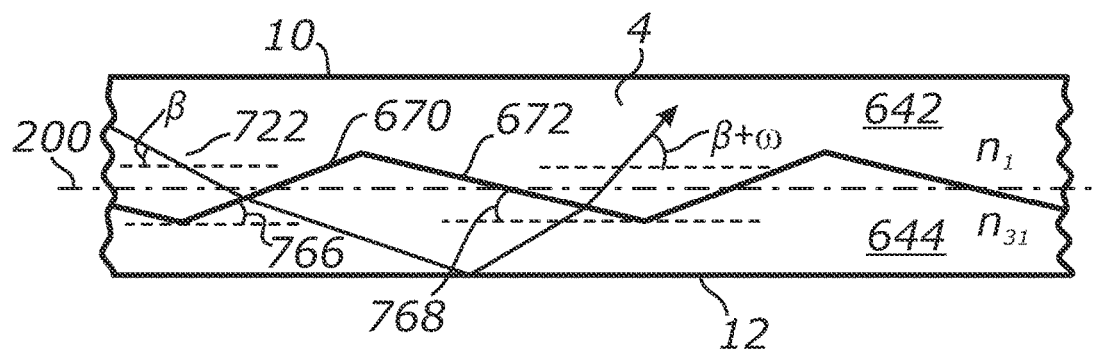
FIG. 49 is a schematic cross-sectional view and raytracing of a waveguide portion, showing a corrugated boundary between two transmissive materials having different refractive indices, according to at least one embodiment of the present invention.

In a further instance, the light deflecting elements that can provide the incremental light deflection along the optical path in waveguide 4 may also be formed by a corrugated boundary between two different transmissive materials incorporated into the body of the waveguide. An illustrative example of such waveguide is shown in FIG. 49. Accordingly, waveguide 4 of FIG. 49 has a planar slab shape and is formed by two optically transmissive dielectric layers 642 and 644 disposed in optical contact with each other. The refractive index of layer 642 is $n_1$ and the refractive index of layer 644 is $n_{31}$ which is different than $n_1$. The difference in the refractive indices creates a refractive optical interface between layers 642 and 644 which bends all rays entering it at any non-zero incidence angles. In the case illustrated in FIG. 49, $n_{31}<n_1$.

The boundary between layers 642 and 644 is not planar and includes prismatic corrugations each formed by a pair of planar facets 670 and 672. The corrugations may be adjacent to each other and form a continuous corrugated boundary between the respective layers. It is noted, however, that the corrugations may also be alternated with flat portions of the boundary and may also be distributed along axis 200 according to any suitable pattern. Facet 670 makes a dihedral angle 766 with the prevailing plane of waveguide 4 and facet 673 makes a dihedral angle 768 with the same plane. According to one embodiment, angle 766 is greater than angle 768 and may take particular values up to 90 degrees. According to one embodiment, angles 766 and 768 may be identical or nearly identical. According to one embodiment, angle 766 may be less than angle 768.

In operation, a ray 722 propagating in layer 642 of waveguide 4 at an out-of-plane angle β strikes facet 670 of the inter-layer boundary and refracts into the lower-index layer 644. Ray 722 further strikes surface 12 of waveguide 4 and reflects from the surface by means of TIR. Ray 722 further refracts at facet 672 and enters layer 642 again. When dihedral angle 768 of facet 672 is lower than the dihedral angle 766 of facet 670, the consecutive refraction of ray 722 at facets 670 and 672 will result in a new out-of-plane propagation angle β+ω which. It will be appreciated that the angular increment ω to the out-of-plane angle is a function of the difference in refractive indices between layers 642 and 644 and the difference between dihedral angles 766 and 768.

Accordingly, it will also be appreciated that such waveguide 4 with a corrugated inter-layer boundary may be configured to provide an incremental increase of the out-of-plane angle along the propagation path. In turn, this may eventually result in ray 722 exiting from waveguide 4 and being intercepted and redirected by the light extraction layer (not shown) according to the principles described above.

Various surface treatment techniques other than microstructuring or replication may also be used to produce suitable light deflecting elements which could incrementally bend light in small angular increments along the propagation path. For example selective UV exposure or chemical processing may be used to cause repetitive variations in the refractive index along the waveguide's surface or through the body of the waveguide. The variations of the refractive index along the propagation path may create a number of optical interfaces which can bend light by a relatively small angle upon each interaction with the propagated light. As light rays accumulate a sufficient increment to the out-of-plane angle to overcome TIR, they can exit from waveguide 4 where they can be further redirected by light extracting layer 20.

System 2 may also incorporate any number of auxiliary layers serving various purposes, such as, for example, providing additional mechanical strength, environmental resistance, peel resistance, improved visual appearance, color, etc. Any optical interface between a layer formed by a lower refractive index transmissive medium and a layer formed by a higher refractive index transmissive medium may also be provided with an intermediate optically transmissive layer, for example, for promoting the optical contact or adhesion between the layers. The intermediate layer should preferably have a refractive index which is greater than the lower of the two refractive indices at the given optical interface.

It may be appreciated that the system 2 may be implemented in a sheet form and may provide efficient light distribution across a large-area and emission of a collimated beam from its entire surface, which may find utility in various lighting devices. Particularly, system 2 may be employed for making directional lighting luminaires and fixtures having a wide emission area, compact form and reduced glare.

Figure 50:
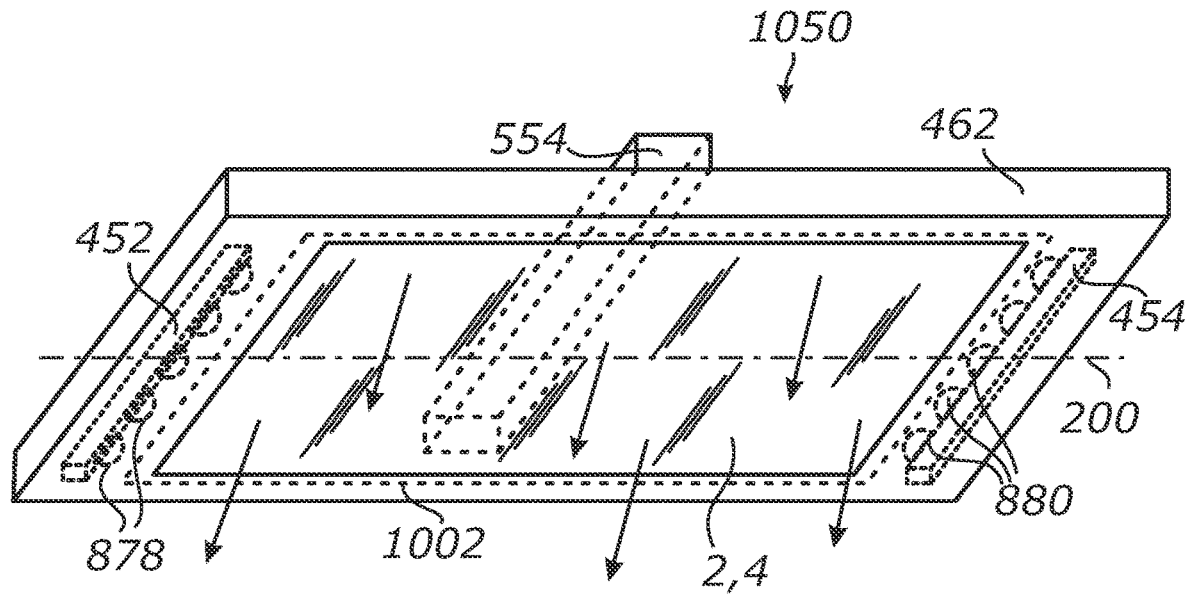
FIG. 50 is a schematic perspective view of a directional lighting fixture employing a collimating illumination system, according to at least one embodiment of the present invention.

FIG. 50 shows an exemplary embodiment of a low-profile directional luminaire 1050 which incorporates system 2 including at least edge-lit planar slab waveguide 4 and light extraction layer 20 configured for light collimation. Such luminaire 1050 may be configured in the form of a panel installable in a similar manner to the fluorescent troffers or non-collimating direct-lit and edge-lit LED lighting panels. By way of a non-limiting example, luminaire 1050 may be designed for drop in ceilings in commercial and institutional buildings and have dimensions common for such applications. For instance, similarly to the drop-in tiles of the common suspended grid ceilings, the outer dimensions of luminaire 1050 may be 2'×2', 2'×4', or 1'×4' so that the luminaire may directly replace the tile panels in the grid.

Referring further to FIG. 50 luminaire 1050 includes two linear arrays of high-brightness LEDs 878 and 880, respectively, attached to the opposing edges of waveguide 4. Each LED array (or LED strip) may be mounted on a heat sink (indicated as 452 and 454) to dissipate the heat generated by LEDs 878 and 880. Each of the heat sinks 452 and 454 may be made from aluminum in the form of a rectangular block, a hollow rectangular pipe, a channel or any structural profile having the appropriate cross-section. Various conventional finned or finless heat sinks may also be employed.

Each of LEDs 878 and 880 may be provided with some kind of individual collimating or beam shaping optics. For instance, each LED may include a dome shaped lens which can aid in light input into waveguide 4 and reducing light spillage.

Luminaire 1050 may include a metal or plastic housing 462 configured to hold various luminaire components together particularly including waveguide 4, light extracting layer 20, LED strips, heat sinks, wiring (not shown), etc. When housing 462 is made from a plastic material, the material may be opaque or transmissive/translucent. Housing 462 may enclose just the perimeter area of system 2 or may also cover the non-luminous back surface of the system. In either case, especially when housing 462 is made from an opaque or poorly transmitting material, it should have an opening corresponding to the light emitting area of system 2. The dimensions of the opening should preferably be at least slightly smaller than the dimensions of waveguide 4 to ensure that system 2 and any of its components can be stored securely inside housing 462. In other words, an outline 1002 of the waveguide should be sufficiently large compared to the opening so that the waveguide won't fall through the opening under normal operation and use of luminaire 1050. Alternatively, or in addition to that, the opening may be covered by an optically transmissive sheet of plastic material. The transmissive sheet may also be provided with light diffusing properties and may be made a part of the optical assembly of system 2.

Luminaire 1050 may be provided with any number or light diffusing layers or otherwise beam-shaping layers. For example, an opaque light diffusing sheet of a reflective type may be provided on the back of waveguide 4 to recycle and homogenize stray light. A light diffusing sheet of a transmissive type may be provided on the opposing (light emitting) side of the waveguide to smooth out possible non-uniformities of the emitted beam and/or further control beam spread.

Luminaire 1050 of FIG. 50 is also shown to include an LED driver 554 representing a self-contained power supply that has outputs matched to the electrical characteristics of the strips of LEDS 400 and 880. LED driver 554 may be attached to housing 462 or it may also be incorporated into the housing. Alternatively, LED driver 554 may be located at a distance from the main body of luminaire 1050 and may be electrically connected to the LED arrays via a power cord of a suitable length.

LED driver 554 may ordinarily be current-regulated and configured to deliver a consistent current over a range of load voltages. LED driver 554 may also be configured to provide dimming of the LEDs by means of pulse width modulation (PWM) circuits or by any other suitable means. The LED driver may also have more than one channel for separate control of the opposing LED arrays or for separate control of individual LEDs or LED groups within the arrays. The respective LEDs or LED groups, in turn, may be configured to emit light in different colors or different color temperatures thus allowing for obtaining various static or dynamic illumination effects and/or for just varying the color of light emitted by luminaire 1050.

The structure of system 2 which is incorporated into luminaire 1050 of FIG. 50 may be selected from any of the foregoing embodiments of any their variations. Particularly, by employing a light-collimating embodiment of system 2 with planar waveguide 4, luminaire 1050 may be configured to emit a highly directional light beam into a prescribed angular range or towards a well-defined area to be illuminated.

Depending on the application, the beam angle of luminaire 1050 may be limited to any particular value which is considerably less than a full 180-degree in any plane. It will be appreciated that since system 2 may provide light collimation at least in a longitudinal plane which is parallel to axis 200 and perpendicular to the prevailing plane of waveguide 4, the directionality of such luminaire 1050 can be substantially enhanced in comparison to the conventional edge-lit lighting panels which typically emit light according to a highly diffuse, lambertian pattern. As it has been illustrated in reference to the above-described embodiments of system 2, beam collimation may also be provided in a transversal plane (a plane perpendicular to axis 200), for example by using and appropriately configuring the collimating elements which may be associated with individual LEDs (see, e.g., FIG. 28 and FIG. 29). Accordingly, the edge-lit luminaire 1050 employing system 2 and fewer LEDs may be configured to provide highly directional, wide-area beam patterns normally attainable only by using direct-lit LED panels having large two-dimensional arrays of discrete light sources with individual optics. It is essential that system 2 may be configured to emit substantially all of the light extracted from waveguide 4 into functional directions with minimum or no light rejection.

Considering that, in many practical applications, the light beam emitted by system 2 and/or luminaire 1050 may not have sharply defined boundaries, the beam angle may be defined as two times the vertical angle at which the intensity is 90% of the maximum beam intensity. In turn, the vertical angle may be defined as an angle between the center of the emitted directional beam and the direction in which the beam intensity is evaluated. For example, with the luminaire 1050 pointed downward, a vertical angle of 0° may thus describe the center of a directional beam emitted along the surface normal.

By way of example and not limitation, the beam angle of directional luminaire 1050 may be limited at least in one plane to less than 120 degrees. By way of further non-limiting examples, the beam angle may be limited to 90 degrees, 75 degrees, 60 degrees, 45 degrees, 30 degrees, or 15 degrees. It is noted, however, that any other practical limits for the beam angle may be also established depending on the desired illumination pattern and system 2 can be configured accordingly. It will also be understood that the beam angle may be controlled independently in each of the longitudinal and transversal planes which are orthogonal with respect to each other. In one embodiment, the beam angle may be made the same or similar in both planes. In one embodiment, the beams angles may be made different in the respective planes. In one embodiment, the collimation may be provided in only one of the above planes. For example, the beam angle in the longitudinal plane may be 60 degrees and the beam angle in the transversal plane may be up to a full 180 degrees with a diffuse lambertian or gaussian pattern.

Further details of operation of waveguide illumination system 2 shown in the drawing figures as well as its possible variations and further applications will be apparent from the foregoing description of preferred embodiments. Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A daylight responsive lighting fixture for illuminating a building interior, comprising:
    an optically transmissive sheet having a first broad-area surface and an opposing second broad-area surface, the second broad-area surface having a two-dimensional pattern of light deflecting surface structures;
    a plurality of dimmable light emitting diodes (LEDs) arranged into two or more groups each configured to emit light in a different color temperature towards the optically transmissive sheet; and
    an LED driver electrically connected to the LEDs, the LED driver having two or more LED intensity control channels and one or more pulse width modulation (PWM) circuits,
    wherein the two or more LED intensity control channels are configured to independently control a light emission intensity of the two or more groups of the LEDs using the one or more PWM circuits for varying a color temperature of the emission of the lighting fixture and further configured to provide dimming of the LEDs in response to a change of an intensity of natural daylight incident onto an area of the lighting fixture.

2. The daylight responsive lighting fixture as recited in claim 1, wherein the optically transmissive sheet has a rectangular shape and is configured to guide light using optical transmission and a total internal reflection, wherein the light deflecting surface structures are discrete elements separated from each other and from edges of the optically transmissive sheet by smooth portions of the second broad-area surface and each configured for suppressing the total internal reflection at the second broad-area surface, wherein the optically transmissive sheet has two symmetrical segments each having a light input edge, wherein the plurality of LEDs comprise a first LED strip mounted to a first heat spreading substrate and a second LED strip mounted to a second heat spreading substrate, wherein the first and second LED strips are optically coupled pairwise to the respective input edges, wherein a density of the light deflecting surface structures within a first one of the two symmetrical segments increases with a distance from the first LED strip, and wherein a density of the light deflecting surface structures within a second one of the two symmetrical segments increases with a distance from the second LED strip.

3. The daylight responsive lighting fixture as recited in claim 2, wherein the first and second broad-area surfaces are configured for outputting light from the optically transmissive sheet.

4. The daylight responsive lighting fixture as recited in claim 2, comprising an optically transmissive diffuser sheet positioned on a front side of the optically transmissive sheet, a highly reflective diffuser sheet positioned on a rear side of the optically transmissive sheet, and a metal housing enclosing a perimeter area of the optically transmissive sheet and the plurality of LEDs, the metal housing having an opening located on the front side of the optically transmissive sheet, wherein the opening has a smaller area than the optically transmissive sheet.

5. The daylight responsive lighting fixture as recited in claim 4, wherein the daylight responsive lighting fixture has a form of a generally flat panel with outer dimensions of approximately 60 centimeters by 60 centimeters, and wherein the LED driver is attached to a back cover of the metal housing.

6. The daylight responsive lighting fixture as recited in claim 4, wherein the daylight responsive lighting fixture has a form of a generally flat panel with outer dimensions of approximately 60 centimeters by 120 centimeters, and wherein the LED driver is attached to a back cover of the metal housing.

7. The daylight responsive lighting fixture as recited in claim 4, wherein the daylight responsive lighting fixture has a form of a generally flat panel with outer dimensions of approximately 30 centimeters by 120 centimeters, and wherein the LED driver is attached to a back cover of the metal housing.

8. The daylight responsive lighting fixture as recited in claim 4, wherein the daylight responsive lighting fixture has a form of a generally flat panel, and wherein the LED driver is connected to the panel using a power cord and configured to be positioned at a distance from the panel.

9. The daylight responsive lighting fixture as recited in claim 1, comprising an optically transmissive diffuser sheet positioned on a front side of the optically transmissive sheet, a highly reflective diffuser sheet positioned on a rear side of the optically transmissive sheet, and a metal housing covering a back side of the lighting fixture and enclosing a perimeter area of the optically transmissive sheet and the plurality of LEDs, the metal housing having an opening located on the front side of the optically transmissive sheet, wherein the opening has a smaller area than the optically transmissive sheet, and wherein the LED driver is attached to a back cover of the metal housing.

10. The daylight responsive lighting fixture as recited in claim 1, comprising a first diffuser sheet positioned on a front side of the optically transmissive sheet, a second diffuser sheet positioned on a rear side of the optically transmissive sheet, and a metal housing enclosing a perimeter area of the optically transmissive sheet and the plurality of LEDs, the metal housing having an opening located on the front side of the optically transmissive sheet, and wherein the opening has a smaller area than the optically transmissive sheet.

11. A daylight responsive lighting fixture for illuminating a building interior, comprising:
    a plurality of dimmable light emitting diodes (LEDs) arranged into two or more groups each configured to emit light in a different color temperature;
    an optically transmissive sheet disposed in an energy receiving relationship with respect to the LEDs and having a first broad-area surface and an opposing second broad-area surface, the second broad-area surface having a two-dimensional pattern of light deflecting surface structures; and an LED driver electrically connected to the LEDs, the LED driver having two or more LED intensity control channels and one or more pulse width modulation (PWM) circuits, wherein the LED driver is configured to provide dimming of the LEDs using the one or more PWM circuits in response to a change of an intensity of natural daylight incident onto an area of the lighting fixture and further configured to vary an emission color temperature of the lighting fixture by independently controlling the amount of light emitted by each of the two or more groups of the LEDs using the two or more LED intensity control channels.

12. The daylight responsive lighting fixture as recited in claim 11, wherein the first and second broad-area surfaces are configured for outputting light from the optically transmissive sheet.

13. The daylight responsive lighting fixture as recited in claim 11, wherein the optically transmissive sheet is configured to guide light using optical transmission and a total internal reflection, wherein the light deflecting surface structures are discrete elements separated from each other and from edges of the optically transmissive sheet by smooth portions of the second broad-area surface and each configured for suppressing the total internal reflection at the second broad-area surface, wherein the optically transmissive sheet has two symmetrical segments each having a light input edge, wherein the plurality of LEDs comprise a first LED strip mounted to a first heat spreading substrate and a second LED strip mounted to a second heat spreading substrate, wherein the first and second LED strips are optically coupled pairwise to the respective light input edges, wherein a density of the light deflecting surface structures within a first one of the two symmetrical segments increases with a distance from the first LED strip, and wherein a density of the light deflecting surface structures within a second one of the two symmetrical segments increases with a distance from the second LED strip.

14. The daylight responsive lighting fixture as recited in claim 13, comprising an optically transmissive diffuser sheet positioned on a front side of the optically transmissive sheet, a highly reflective diffuser sheet positioned on a rear side of the optically transmissive sheet, and a metal housing enclosing a perimeter area of the optically transmissive sheet and the plurality of LEDs, the metal housing having an opening located on the front side of the optically transmissive sheet, wherein the opening has a smaller area than the optically transmissive sheet.

15. The daylight responsive lighting fixture as recited in claim 14, wherein the daylight responsive lighting fixture has a form of a generally flat panel with outer dimensions of approximately 60 centimeters by 60 centimeters, and wherein the LED driver is attached to a back cover of the metal housing.

16. The daylight responsive lighting fixture as recited in claim 14, wherein the daylight responsive lighting fixture has a form of a generally flat panel with outer dimensions of approximately 60 centimeters by 120 centimeters, and wherein the LED driver is attached to a back cover of the metal housing.

17. The daylight responsive lighting fixture as recited in claim 14, wherein the daylight responsive lighting fixture has a form of a generally flat panel with outer dimensions of approximately 30 centimeters by 120 centimeters, and wherein the LED driver is attached to a back cover of the metal housing.

18. The daylight responsive lighting fixture as recited in claim 14, wherein the daylight responsive lighting fixture has a form of a generally flat panel, and wherein the LED driver is connected to the panel using a power cord and configured to be positioned at a distance from the panel.

19. The daylight responsive lighting fixture as recited in claim 11, comprising an optically transmissive diffuser sheet positioned on a front side of the optically transmissive sheet, a highly reflective diffuser sheet positioned on a rear side of the optically transmissive sheet, and a metal housing covering a back side of the lighting fixture and enclosing a perimeter area of the optically transmissive sheet and the plurality of LEDs, the metal housing having an opening located on the front side of the optically transmissive sheet, wherein the opening has a smaller area than the optically transmissive sheet, and wherein the LED driver is attached to a back cover of the metal housing.

20. The daylight responsive lighting fixture as recited in claim 11, comprising a first diffuser sheet positioned on a front side of the optically transmissive sheet, a second diffuser sheet positioned on a rear side of the optically transmissive sheet, and a metal housing enclosing a perimeter area of the optically transmissive sheet and the plurality of LEDs, the metal housing having an opening located on the front side of the optically transmissive sheet, and wherein the opening has a smaller area than the optically transmissive sheet.

* * * * *